United States Patent
Ferdi et al.

(10) Patent No.: US 12,273,782 B2
(45) Date of Patent: Apr. 8, 2025

(54) METHODS, APPARATUS AND SYSTEMS FOR COMMAND AND CONTROL (C2) COMMUNICATIONS SETUP AND UPDATE

(71) Applicant: InterDigital Patent Holdings, Inc., Wilmington, DE (US)

(72) Inventors: Samir Ferdi, Kirkland (CA); Atle Monrad, Froland (NO); Guanzhou Wang, Brossard (CA); Michelle Perras, Montréal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 432 days.

(21) Appl. No.: 17/915,988

(22) PCT Filed: Apr. 2, 2021

(86) PCT No.: PCT/US2021/025512
§ 371 (c)(1),
(2) Date: Sep. 29, 2022

(87) PCT Pub. No.: WO2021/202960
PCT Pub. Date: Oct. 7, 2021

(65) Prior Publication Data
US 2023/0156554 A1 May 18, 2023

Related U.S. Application Data

(60) Provisional application No. 63/150,279, filed on Feb. 17, 2021, provisional application No. 63/063,687, (Continued)

(51) Int. Cl.
*H04W 4/00* (2018.01)
*G08G 5/21* (2025.01)
(Continued)

(52) U.S. Cl.
CPC ............ *H04W 36/30* (2013.01); *G08G 5/21* (2025.01); *G08G 5/26* (2025.01); *G08G 5/53* (2025.01);
(Continued)

(58) Field of Classification Search
CPC .......... H04W 36/30; G08G 5/55; G08G 5/57; G08G 5/26; H04L 5/0096
(Continued)

(56) References Cited

U.S. PATENT DOCUMENTS 7,852,825 B2 * 12/2010 Shaheen ............... H04W 48/18
455/450
11,754,008 B2 9/2023 Stroh et al.
(Continued)

FOREIGN PATENT DOCUMENTS

WO  WO 2019161240 A1  8/2019
WO  WO 2020033526 A1  2/2020
WO  WO 2021041143 A1  3/2021

OTHER PUBLICATIONS

Anonymous, "3rd Generation Partnership Project; Technical Specification Group Services and System Aspects; Study on Enhancement for Unmanned Aerial Vehicles", 3rd Generation Partnership Project (3GPP), Stage 1, Release 17, Document 3GPP TR 22.829 V1.0.0, Mar. 2019, 42 pages.
(Continued)

*Primary Examiner* — Marceau Milord
(74) *Attorney, Agent, or Firm* — VOLPE KOENIG

(57) ABSTRACT

Method, apparatus and systems are disclosed that may be implemented in wireless transmit/receive unit (WTRU), an unmanned aerial vehicle (UAV) and/or a UAV-controller (UAV-C). In one representative method, the UAV may switch from a first Command and Control (C2) communication link between a UAV and a first UAV-C to a second C2
(Continued)

communication link for C2 communications. The method may include determining, by the WTRU, to switch C2 communications from the first C2 communication link to the second C2 communication link based on a C2 switching condition; sending, by the WTRU to a C2 control entity, a notification indicating link information used to determine switching from the first C2 communication link to the second C2 communication link; receiving, by the WTRU from the C2 control entity, information indicating a switch; and switching, by the WTRU, C2 communications from the first C2 communication link to the second C2 communication link.

21 Claims, 25 Drawing Sheets

Related U.S. Application Data filed on Aug. 10, 2020, provisional application No. 63/004,139, filed on Apr. 2, 2020.

(51) Int. Cl.
| | | |
|---|---|---|
| *G08G 5/26* | (2025.01) | |
| *G08G 5/53* | (2025.01) | |
| *G08G 5/55* | (2025.01) | |
| *G08G 5/57* | (2025.01) | |
| *H04L 5/00* | (2006.01) | |
| *H04W 36/30* | (2009.01) | |

(52) U.S. Cl.
CPC .............. *G08G 5/55* (2025.01); *G08G 5/57* (2025.01); *H04L 5/0096* (2013.01)

(58) Field of Classification Search
USPC .......................................................... 370/331
See application file for complete search history.

(56) References Cited

U.S. PATENT DOCUMENTS

| | | | |
|---|---|---|---|
| 11,799,968 B2 | 10/2023 | Lou et al. | |
| 11,812,309 B2 | 11/2023 | Zong et al. | |
| 11,985,695 B2* | 5/2024 | Sarkis | H04W 76/14 |
| 12,022,503 B2* | 6/2024 | Park | H04L 41/0803 |
| 12,037,132 B1* | 7/2024 | Chinoy | G08G 5/0052 |
| 12,063,505 B2 | 8/2024 | Guo et al. | |
| 12,063,595 B2 | 8/2024 | Wu et al. | |
| 2006/0023712 A1* | 2/2006 | Shaheen | H04W 48/18 |
| | | | 370/466 |
| 2014/0355617 A1* | 12/2014 | Brown | H04L 12/28 |
| | | | 370/401 |
| 2017/0344000 A1* | 11/2017 | Krishnamoorthy | B64F 1/362 |
| 2019/0306835 A1* | 10/2019 | Hoang | H04W 72/53 |
| 2020/0213912 A1* | 7/2020 | Shi | H04W 36/12 |
| 2020/0344655 A1* | 10/2020 | Rommer | H04W 76/36 |
| 2021/0289403 A1 | 9/2021 | Suh et al. | |
| 2021/0385694 A1 | 12/2021 | Freda et al. | |
| 2022/0132307 A1* | 4/2022 | Perras | H04W 4/40 |
| 2023/0102300 A1* | 3/2023 | Faccin | H04W 12/06 |
| | | | 455/435.1 |
| 2024/0172330 A1 | 5/2024 | Yang et al. | |

OTHER PUBLICATIONS

Anonymous, "3rd Generation Partnership Project; Technical Specification Group Services and System Aspects; Remote Identification of Unmanned Aerial Systems", 3rd Generation Partnership Project (3GPP), Stage 1, Release 16, Document 3GPP TR 22.825 V16.0.0, Sep. 2018, 22 pages.

Anonymous, "3rd Generation Partnership Project; Technical Specification Group Services and System Aspects; Unmanned Aerial System (UAS) support in 3GPP", 3rd Generation Partnership Project (3GPP), Stage 1, Release 17, Document 3GPP TR 22.125 V17.1.0, Dec. 2019, 16 pages.

Anonymous, "3rd Generation Partnership Project; Technical Specification Group Services and System Aspects; Study on supporting Unmanned Aerial Systems (UAS) connectivity, Identification and tracking", 3rd Generation Partnership Project (3GPP), Release 17, Document 3GPP TR 23.754 V0.2.0, Jun. 2020, 83 pages.

Anonymous, "3rd Generation Partnership Project; Technical Specification Group Services and System Aspects; System Architecture for the 5G System", 3rd Generation Partnership Project (3GPP), Stage 2, Release 16, Document 3GPP TR 23.501 V16.1.0, Jun. 2019, 368 pages.

Anonymous, "3rd Generation Partnership Project; Technical Specification Group Services and System Aspects; Procedures for the 5G System", 3rd Generation Partnership Project (3GPP), Stage 2, Release 16, Document 3GPP TR 23.502 V16.1.1, Jun. 2019, 495 pages.

Anonymous, "3rd Generation Partnership Project; Technical Specification Group Services and System Aspects; Study on supporting Unmanned Aerial Systems (UAS) connectivity, Identification and tracking", 3rd Generation Partnership Project (3GPP), Release 17, Document 3GPP TR 22.754 V0.1.0, Jan. 2020, 18 pages.

Anonymous, "Connectivity setup for C2 communication and association between UAV and UAV_C", InterDigital, SA WG2 Temporary Document, SW WG2 Meeting #138, Apr. 20, 2020, eMeeting, 4 pages.

* cited by examiner

METHODS, APPARATUS AND SYSTEMS FOR COMMAND AND CONTROL (C2) COMMUNICATIONS SETUP AND UPDATE

CROSS REFERENCE TO RELATED APPLICATIONS

This application is a U.S. National Stage Application under 35 U.S.C. 371 of International Patent Application No PCT/US2021/025512, Apr. 2, 2021, which is incorporated herein by reference in its entirety.

This application claims the benefit of U.S. Patent Application Nos. 63/004,139, filed Apr. 2, 2020, 63/063,687, filed Aug. 10, 2020 and 63/150,279, filed Feb. 17, 2021, each of which is incorporated herein by reference in its entirety.

FIELD

Embodiments disclosed herein generally relate to wireless communications and, for example to methods, apparatus and systems for C2 communications setup and update.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein.

DETAILED DESCRIPTION

Example Networks for Implementation of the Embodiments

Certain embodiments may be implemented in autonomous and/or semi-autonomous vehicles, robotic vehicles, cars, IoT gear, any device that moves, or a WTRU or other communication devices, which, in turn, may be used in a communication network. The following section provides a description of some exemplary WTRUs and/or other communication devices and networks in which they may be incorporated.

Figure 1A:
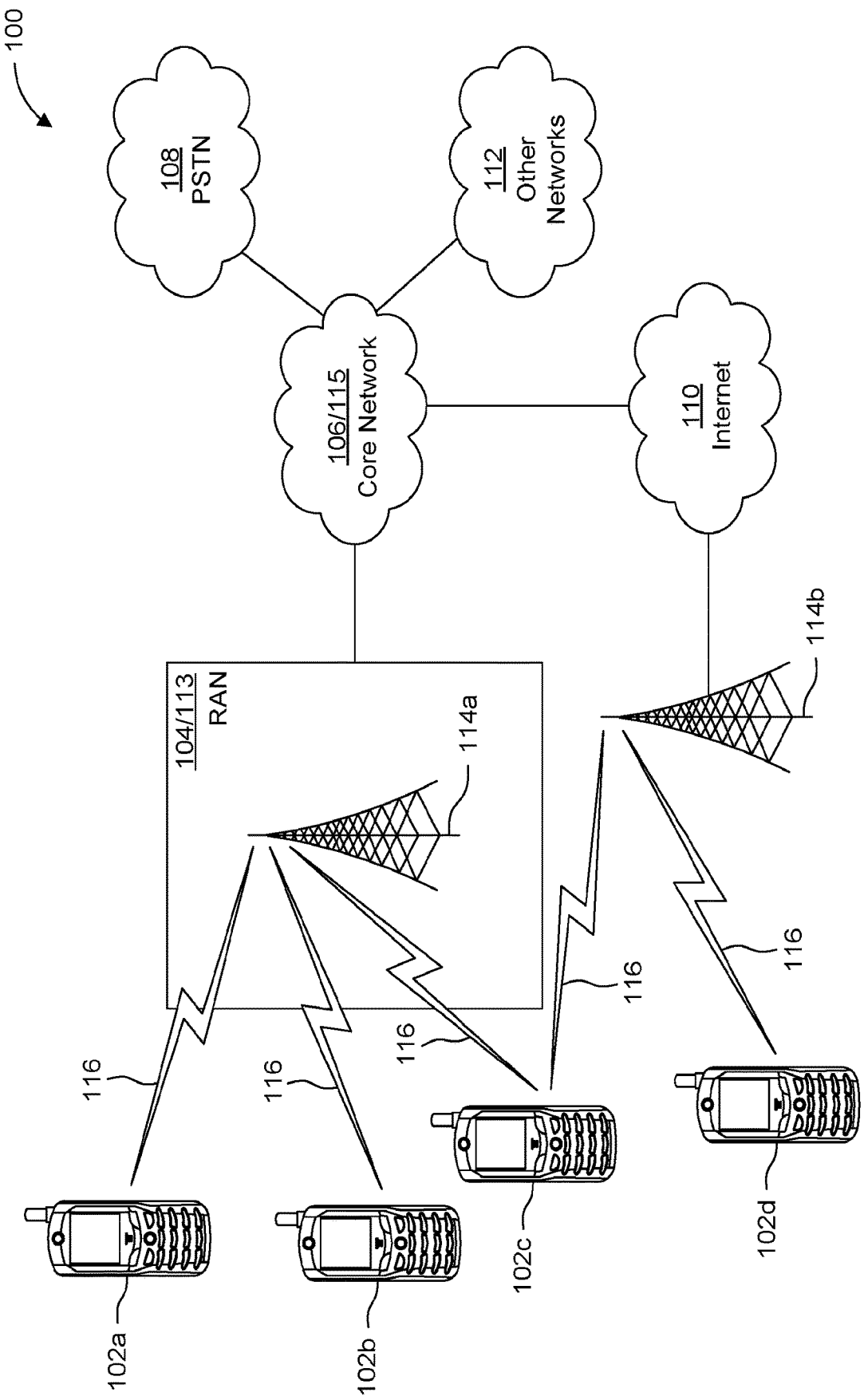
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an end and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
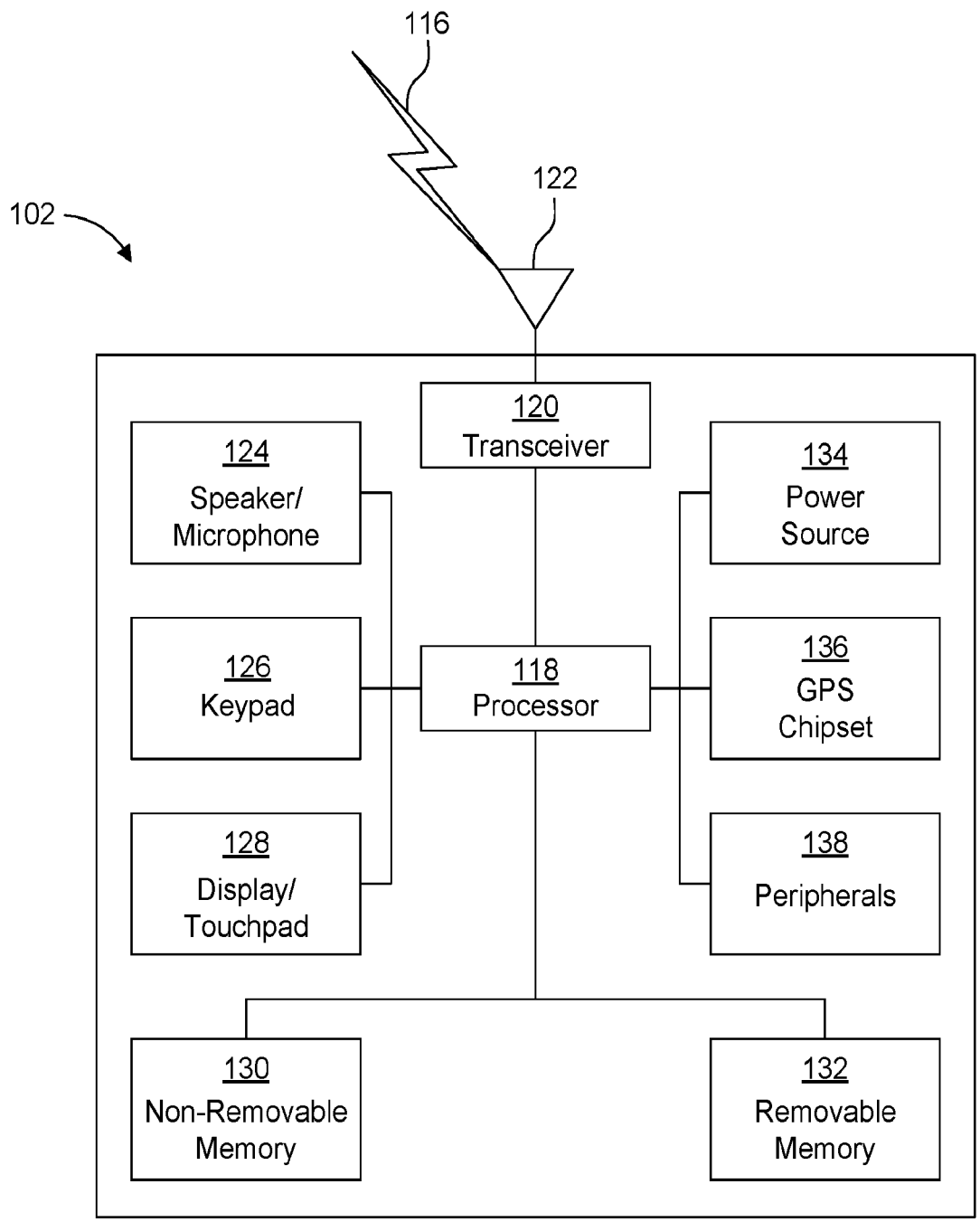
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
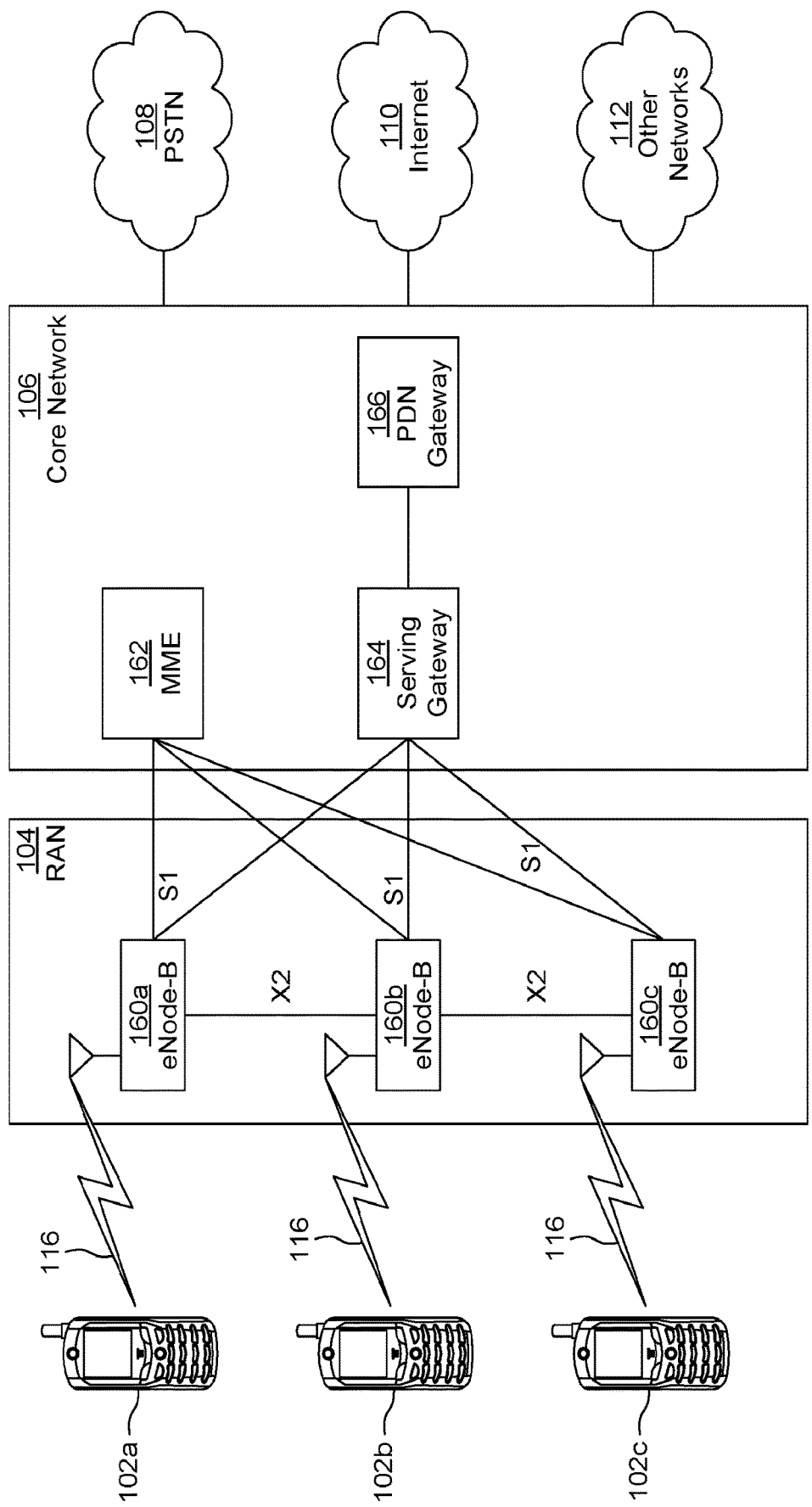
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 1C, the eNode Bs 160a, 160b, 160c may communicate with one another over an X2 interface.

The CN 106 shown in FIG. 1C may include a mobility management entity (MME) 162, a serving gateway (SGVV) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
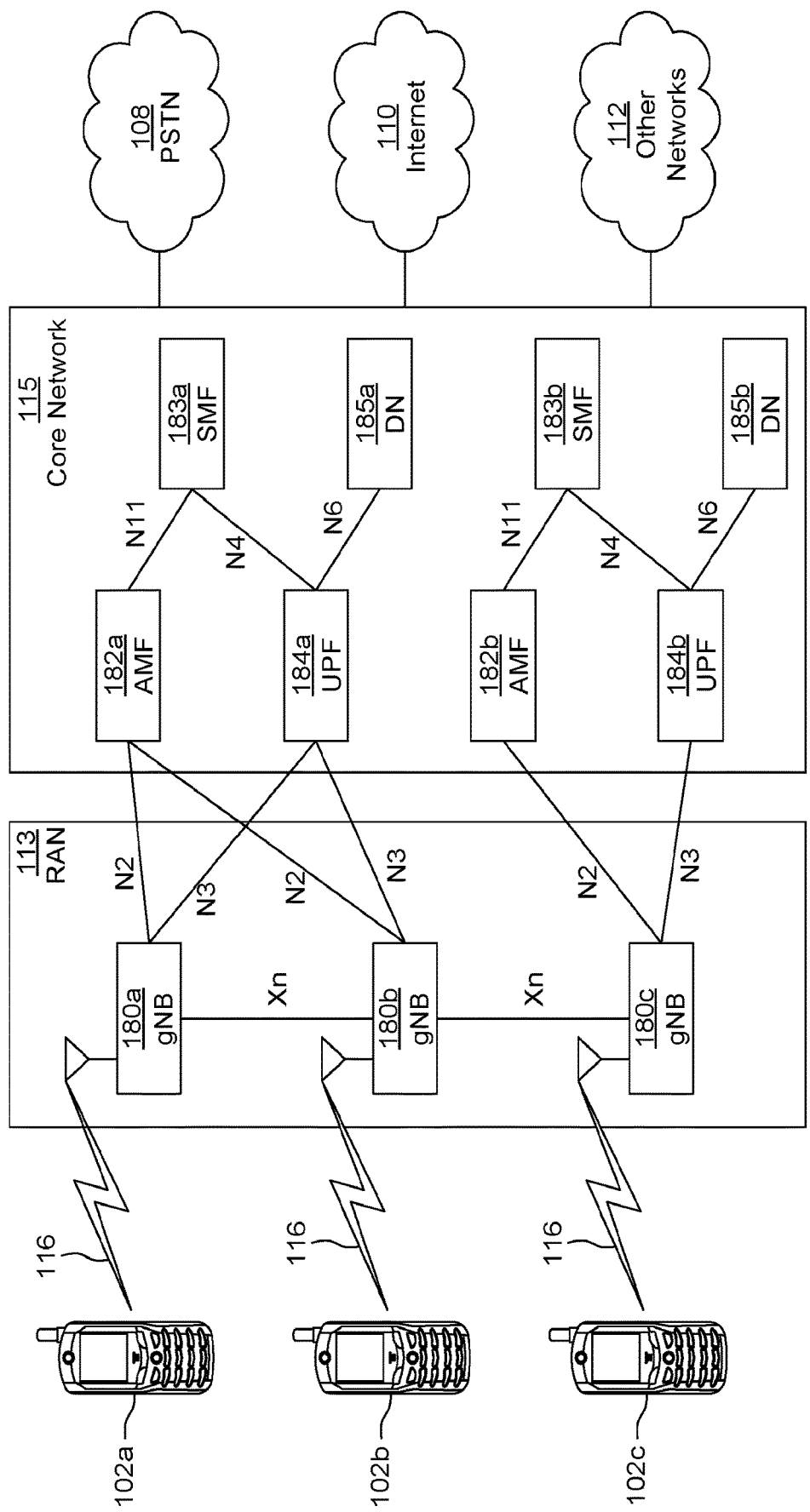
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode Bs 160a, 160b, 160c. For example, WTRUs 102a, 102b, 102c may implement DC principles to communicate with one or more gNBs 180a, 180b, 180c and one or more eNode Bs 160a, 160b, 160c substantially simultaneously. In the non-standalone configuration, eNode Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of Non-Access Stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU 102 IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description, one or more, or all, of the functions described herein with regard to one or more of: WTRU 102a-d, Base Station 114a-b, eNode B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In certain representative embodiments, methods, apparatus and systems may be implemented for C2 Communication Link Setup, for example using on demand connectivity setup procedures by a WTRU (e.g., an Unmanned Aerial Vehicle (UAV)). For example, the WTRU may perform a UAV authentication and authorization using or by an Unmanned Aerial System (UAS) Traffic Management (UTM) procedure. The WTRU may receive a UAS identifier (e.g., UAS id), for example in an authorization message from the UTM. The WTRU may send the UAS id to the network (e.g., a network entity) during a procedure to setup a PDU Session/PDN connection for C2 communications and/or may receive information/an indication (e.g., a UAS association pending indication) indicating that a UAS association is pending during the procedure. The WTRU may perform a procedure (e.g., a network triggered procedure) to update a PDU Session/PDN Connection and/or may receive information/an indication (e.g., a successful C2 Communication Link setup indication indicating that the C2 communication link setup was successful), and a peer UAV-Controller (UAV-C) Internet Protocol (IP) (e.g., IP address) during the procedure and/or the WTRU may receive a peer UAV-C IP address in an authorization message from the UTM. The WTRU may engage in and/or communicate (e.g., send and/or receive) C2 communications with the peer UAV-C.

In certain representative embodiments, methods, apparatus and systems may be implemented for C2 Communication Link Setup using a pre-established (e.g., standby) Connectivity Procedure, by a WTRU/UAV. The WTRU/UAV may perform a UAV authentication and authorization, for example, by or using a UTM procedure. The WTRU may send an indication/information (e.g., a UAV communication indication) to the network (e.g., a network entity) during a procedure to setup a PDU Session/PDN connection (e.g., a standby PDU Session/PDN connection) for C2 communications and/or may receive an indication/information (e.g., a UAS association pending indication) during the procedure. The WTRU/UAV may perform a procedure (e.g., a network triggered procedure) to update a PDU Session/PDN Connection and/or may receive an indication/information (e.g., a successful C2 Communication Link setup indication), a UAS id and/or an authorized UAV-C IP (e.g., IP address) during the procedure and/or WTRU may receive the UAS Id and the peer UAV-C IP address in an authorization message from the UTM. The WTRU/UAV may engage in and/or communicate (e.g., send and/or receive) C2 communications with the peer UAV-C.

In certain representative embodiments, methods, apparatus and systems may be implemented for a C2 Communication Link Update, for example due to a UAV-C Change Procedure, by a WTRU (e.g., a UAV). The WTRU/UAV may perform C2 communications with a first UAV-C (e.g., a UAV-C #1). The pair UAV, UAV-C #1 may be identified as a UAS id #1. The WTRU/UAV may perform a procedure (e.g., a network triggered procedure), for example to update a PDU Session/PDN Connection to communicate with a second UAV-C (e.g., a peer UAV-C #2) and/or may receive information/an indication (e.g., C2 Communication Link update indication), a new UAS id #2 and/or a new peer UAV-C IP #2 during the procedure and/or the WTRU may receive the UAS Id #2 and/or the UAV-C IP #2 in an authorization message from the UTM. The WTRU/UAV may engage in C2 communications (e.g., may communicate) with the peer UAV-C #2.

In certain representative embodiments, methods, apparatus and systems may be implemented for C2 Communication Link Switch, for example due to a UAV-C Change Procedure by a WTRU/UAV. The WTRU/UAV may perform C2 communications with a first UAV-C (e.g., a UAV-C #1) over a first network connection (e.g., a network connection #1). The WTRU/UAV may establish another connection (e.g., a second and/or standby connection #2) for a potential C2 Communication Link switch to another UAV-C (e.g., a second, peer UAV-C #2). The WTRU/UAV may perform a procedure (e.g., a network triggered procedure) to update the PDU Session/PDN Connection (e.g., for connection #2), The WTRU/UAV may receive information/an indication (e.g., a C2 Communication Link switch indication), a new UAS id #2, an old UAS id #1 and/or a new authorized peer UAV-C IP #2 during the procedure and/or the WTRU may receive a new UAS id #2, an old UAS id #1 and/or a UAV-C IP #2 in an authorization message from the UTM. The WTRU/UAV may engage in C2 communications (e.g., may communicate) with the new UAV-C (e.g., the UAV-C#2) over the connection #2. The WTRU/UAV may release the old connection (e.g., the connection #1) associated with the UAS id #1.

In certain representative embodiments, methods, apparatus and systems may be implemented for a Network/UTM assisted C2 Communication Link Update, for example to change a UAV/UAV-C IP address.

In certain representative embodiments, methods, apparatus and systems may be implemented for a C2 Communication Link Setup, for example for UTM navigation.

In certain representative embodiments, methods, apparatus and systems may be implemented for C2 Communication Path Switching from direct communications (e.g., a direct link) to network-assisted communications or from network assisted communications to direct communications (e.g., a direct link). For example, a UAV may establish redundant direct/network assisted C2 connections based on authorization parameters received from the network/USS/UTM (e.g., the network entity).

In certain examples, a UAV may receive QoS threshold parameters from the network/USS/UTM (e.g., the network entity) to monitor the direct link quality and may trigger a switch from direct communications to network assisted communications on condition that or when the direct link quality becomes unacceptable based on those QoS threshold (e.g., the direct link quality is less than a threshold level).

In certain representative embodiments, methods, apparatus and systems may be implemented for C2 Communication Path Switching from direct communications (e.g., a direct link) or network-assisted communications to UTM-navigated communications. For example, during a link switch, the UAV may receive from network/USS/UTM (e.g., the network entity) an indication (e.g., a policy) on how to handle the old connection (e.g., to maintain or to release the old connection). The UAV may receive from the network/ USS/UTM (e.g., the network entity) an indication of the C2 communication type to be used on the new connection (e.g., a Direct type, a Network-Assisted type or a UTM-navigated type).

Procedures to Support UASs

Figure 2:
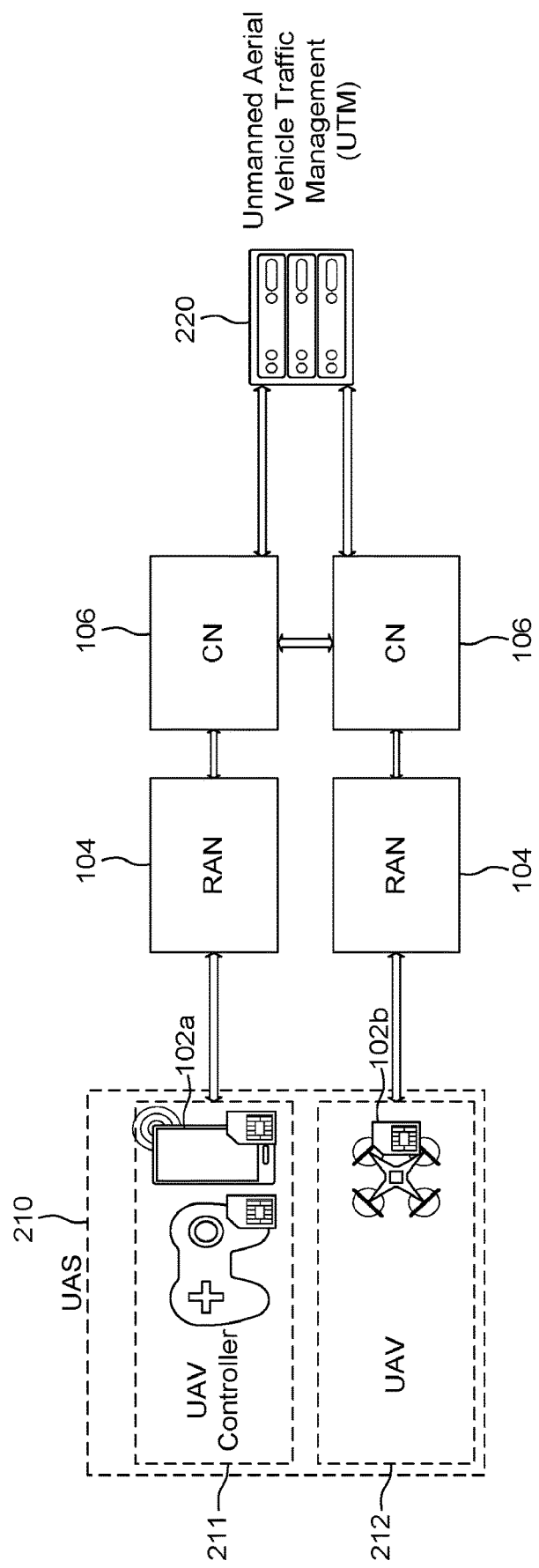
FIG. 2 is a diagram illustrating a representative UAS and the interaction with a network and an Unmanned Aerial System (UAS) Traffic Management (UTM) for authorization.

FIG. 2 is a diagram illustrating a representative UAS 210 and the interaction with the network and the UTM 220 for authorization.

3GPP has identified use cases and potential requirements for UAS support including requirements for UAS remote identification and authorization. Additional enhancements for UAS support may include: (1) UAS Command and Control (C2) communications; (2) Unmanned Aerial Vehicle (UAV) navigation by a UAV Controller (UAV-C) or by a UAS Traffic Management (UTM); and (3) a change of UAV-C during a flight mission. Referring to FIG. 2, a UAS 210 may refer to a combination of a UAV 211 (e.g., a drone) and a UAV-C 212. The communication system/network (e.g., the network entity) may provide the communications capabilities between the UAV 211 and UAV-C 212 which may communicate through the same or different RAN nodes and/or via different Public Land Mobile Networks (PLMNs). The UAV-C 212 may be connected over a 3GPP access and/or a non-3GPP access. The UTM 220 may provide UAS identification and/or tracking, authorization, enforcement, and/or regulation of UAS operations. The UTM 220 may store the data required/used for one or more UAS 210 to operate.

A plurality of C2 communication types (e.g., 3 types) may include (1) direct communications (e.g., UAV-C and UAV use a direct C2 Communication Link (e.g., a D2D link and/or a PC5 link) to communicate with each other); (2) network-assisted communications, for example in which a UAV-C 212 and a UAV 211 use unicast C2 Communication Links (e.g., a Uu link and/or a WLAN link) with the network to communicate with each other (e.g., unlike the direct C2 communications, flying the UAV 211 beyond visual line of sight (BVLOS) may be possible with such a network-assisted communications); (3) UTM-navigated communications, for example in which a UAV 211 with autonomous flying capabilities may be able to fly according to a pre-scheduled flight plan under the supervision of a UTM 220 (e.g., the C2 communication link between UAV 211 and UTM 220 that may be used for flight monitoring, dynamic route updates, and/or occasional navigation).

Connectivity to enable the exchange of C2 traffic (between the UAV 211 and the UAV-C 212 or the UTM 220) may be authorized by the Mobile Network Operator (MNO) on the condition that: (1) the UAV 211 and/or the UAV-C 212 has been authorized for aerial operations by the MNO/ UTM 220; (2) the UAV 211 and UAV-C 212 association has been authorized by the UTM 220 (e.g., for a particular flight mission). The implementations may apply to both the EPS and the 5GS, and may enable/support any of the following: (1) the UAV-C 212 in the same PLMN or under a different PLMN than the UAV; (2) the UAV-C 212 not equipped with a WTRU 102; (3) a change of the UAV-C 212 (e.g., during an active C2 communications, mid-flight and/or during flight of the UAV, among others); (4) a change of the UAV 211 and/or the UAV-C IP address (e.g., during active C2 communications, mid-flight and/or during flight of the UAV, among others); (5) a change of C2 communication path between a UAV 211 and a UAV-C 212 (e.g., from direct to network-assisted or vice versa); (6) a change of C2 communication path from UAV—UAV-C (e.g., direct or network-assisted) to UAV—USS/UTM (e.g., UTM-navigated), among others.

A UAV 211 may be equipped with a WTRU 102a (e.g., a 3GPP UE) with UAS communications capabilities. The terms UE/WTRU and UAV may be used interchangeably herein. A UAV-C communication may be enabled via the 3GPP UE 102b component or another type of communication module (e.g., landline communications). In the case of a UAV-C 212 equipped with its own 3GPP UE 102b, the terms UAV-C and UE/WTRU may be used interchangeably.

A UAV/UAV-C id may identify a UAV/UAV-C capable device (e.g., a drone) and may be an external identifier provided by the UAS Service Supplier (USS)/UTM and/or assigned when registered with a local authority (e.g., the FAA) or a Manufacturer Serial Number (e.g., a Permanent Equipment Identifier (PEI) (e.g., an IMEI and/or a MAC address, among others), provisioned/known by the UAV device.

A UAV/UAV-C WTRU id may identify the cellular subscription of a UAV/UAV-C (e.g., an International Mobile Subscriber Identity (IMSI) and/or a Mobile Station International Subscriber Directory Number (MSISDN) or Generic Public Subscription Identifier (GPSI), among others.

A UAS id may identify a UAS 210, e.g., a UAV-UAV Controller association and may be allocated by the USS/ UTM (e.g., which may be external to 3GPP network).

For simplification, the UTM 220 may be referred to generally as the ecosystem in charge of UAS operations control (e.g., UAV remote identification and/or air traffic control, among others) that may be outside of the 3GPP system and the corresponding functionality may be equally referred to as the USS or a USS/UTM.

In certain representative embodiments, a UAV Control Function (UCF), which is a 3GPP network function may be used. The UCF may interact with the UTM/USS, for example to support UAV related procedures. The communication between the UAV/UAV-C and the UCF may be relayed using or in NAS messages via other network functions (e.g., an AMF). UAV related information exchanged between the UAV/UAV-C and the UCF may be put in a UAV information container and may be carried in NAS messages. In certain embodiments, the communication between the UAV/UAV-C and the UCF may be performed over User Plane communications.

Representative Procedures for Network-Assisted C2 Communications

As set forth herein, authorization signaling communications between the WTRU (e.g., UAV 211 and/or UAV-C 212) and UTM 220 may use User Plane (UP) and/or Control Plane (CP) transport and may be established according to certain representative embodiments (e.g., during a network-assisted UAV authentication and authorization by a UTM procedure).

As set forth herein, messages between the UAV/UAV-C and the UTM 220 for C2 communication establishment and/or modification may be exchanged over the UP and/or the CP. For example, the UAS control messages may be carried as UAS containers using NAS transport.

The UAV 211 and the UAV-C 212 may be served by different PLMNs and/or the UAV-C 212 may be connected by other connections or other procedures/mechanisms than through a 3GPP network (e.g., landline and/or a non-3GPP network, among others). The network/network entities may include or consist of an E-UTRAN connected to a 5G Core (5GC) and/or an EPC and/or NG-RAN/NR connected to a 5GC and the network entity of these networks.

Representative Procedures for C2 Communication Link with UAV-C Setup, for Example for On-Demand Connectivity The UAV/UAV-C may establish connectivity with a network to enable C2 communications with the UAV-C, on the condition of or after reception with a peer UAV-C 212 of an authorization message from the UTM 220 indicating the UAS id associating the UAV. The WTRU may send the UAS id to the network (e.g., a network entity, a network node and/or a network function) during the procedure to establish a new PDU Session/PDN connection and may receive a message from the network (e.g., the network entity, the network node and/or the network function) including an indication (e.g., a UAS association pending indication), for example during the procedure. The WTRU may engage in C2 communications with the peer UAV-C 212 on the condition of or after reception from the network (e.g., the network entity, the network node and/or the network function) of a success indication (e.g., a successful C2 Communication Link setup indication) and/or a peer UAV-C IP, for example during a procedure to update the PDU Session/PDN connection.

As disclosed herein, the term "network" may be interchangeable with the terms "network entity", "network node" and/or "network function".

Representative Behaviors of the WTRU/UAV for on Demand Connectivity

In certain representative embodiments, the WTRU may perform a network-assisted UAV authentication and authorization by or using a UTM procedure. The WTRU may receive a UAS id in a message from the UTM 220 (e.g., a UAS association authorization message). The WTRU may receive the message directly from the UTM 220 (e.g., via user plane) and/or via the UCF. The WTRU may send information/an indication (e.g., a C2 communications indication) and/or the UAS id to the network (e.g., a network entity, network node and/or network function) in a message to setup a PDU Session/PDN connection, for example to enable C2 communications. The indication may specify a type of C2 communication (e.g., network assisted C2 with UAV-C 212 or UTM-navigated C2). The WTRU may receive information/an indication (e.g., a UAS association pending indication) in a message from the network (e.g., the network entity, the network node and/or the network function) indicating a successful setup of the PDU Session/PDN connection. The WTRU may receive any of: (1) a success indication (e.g., a successful C2 Communication Link setup indication); (2) a peer UAV-C IP address; (3) a UAV-C id (e.g., a PEI and/or MAC address, among others) in a message from the network (e.g., during a procedure to update the PDU Session/PDN Connection and/or during a WTRU Configuration Update (UCU) procedure.) In addition, or alternatively, the WTRU may receive any of: (1) a peer UAV-C IP address; and/or (2) a UAV-C id, for example in a message (e.g., a C2 communication authorization message) from the UTM 220, among others. The WTRU may receive the message directly from the UTM 220 and/or via the UCF. The WTRU may engage in C2 communications (e.g., communicate) with the peer UAV-C 212 (e.g., using the UAV-C IP (e.g., the IP address).

Representative Behavior for UAV Serving Network for on Demand Connectivity

In certain representative embodiments, the network (e.g., a network entity, a network node and/or a network function) may perform a network-assisted UAV authentication and authorization by a UTM procedure. The network (e.g., the network entity, the network node and/or the network function) may receive a WTRU id and/or a UAS id in a message (e.g., a UAS association authorization message) from the UTM 220. The network (e.g., a network entity etc.) may update the WTRU context with UAS authorization information from the UTM 220, for example including an assigned UAS id. The network (e.g., the network entity) may receive a C2 communications indication and/or a UAS id in a message from the WTRU to setup a PDU Session/PDN connection, for example to enable C2 communications. For example, the network (e.g., the network entity) may allocate resources for the PDU Session/PDN Connection. Traffic over the PDU Session/PDN Connection may be restricted (e.g., no traffic may be allowed to/from external data networks), until authorization for C2 communications is established. The network (e.g., the network entity) may send information/an indication (e.g., a UAS association pending indication) to the WTRU in a message indicating successful setup of the PDU Session/PDN connection. The network (e.g., the network entity) may send any of: (1) a WTRU id; (2) a UAS id; (3) a UAV IP address; (4) a UAV id (e.g., a PEI and/or a MAC address, among others), a current location of the UAV 211 (e.g., the take-off location) in a message (e.g., a UAS association authorization acknowledgment (ACK) message) to the UTM 220. The network (e.g., the network entity) may receive any of: (1) a WTRU id; (2) a UAS id; (3) a UAV-C IP address; (4) a UAV-C id (e.g., a PEI and/or a MAC address, among others) in a message (e.g., a C2 communication authorization message) from the UTM 220. The network (e.g., the network entity) may update the PDU Session/PDN Connection, for example to allow exchange of C2 traffic (e.g., the traffic to/from the UAV-C IP address/ DN). The WTRU may receive the message directly from the UTM 220 and/or via the UCF. The network (e.g., the network entity) may send any of: (1) information/an indication (e.g., a successful C2 Communication Link setup indication); (2) a peer UAV-C IP address; (3) a UAV-C id (e.g., a PEI and/or a MAC address, among others) in a message to the WTRU (e.g., via a procedure to update the PDU Session/PDN Connection and/or during a UCU procedure). The network (e.g., the network entity) may send or forward the C2 traffic between the UAV 211 and the UAV-C 212.

Representative Procedures for C2 Communication Link with UAV-C Setup, for Example for Pre-established Connectivity The UAV/UAV-C may pre-establish connectivity with the network (e.g., a network entity) to enable C2 communications with a UAV-C/UAV. The WTRU may send a C2 communication indication (e.g., with the UAV-C 212) to the network (e.g., a network entity) during the procedure, for example to establish a new PDU Session/PDN connection and may receive information/an indication (e.g., a UAS association pending indication) during the procedure. The WTRU may engage in C2 communication (e.g., communicate) with the peer UAV-C 212 on condition of a reception from the network (e.g., a network entity) of a message including any of: (1) a success indication (e.g., a successful C2 Communication Link setup indication); (2) a UAS id; and/or (3) a peer UAV-C IP during a procedure to update the PDU Session/PDN connection.

Representative Behavior of the WTRU/UAV for Pre-Established Connectivity

In certain representative embodiments, the WTRU may perform a network-assisted UAV authentication and authorization by or using a UTM procedure. The WTRU may send information/an indication (e.g., a C2 communications indication) to the network (e.g., a network entity) in a message, for example to setup a PDU Session/PDN connection to establish the C2 communications. This connection may sometimes be referred to herein as a standby connection. The WTRU may receive information/an indication (e.g., a UAS association pending indication) in a message from the network (e.g., a network entity), for example to indicate successful setup of the PDU Session/PDN connection. The WTRU may refrain from sending C2 application traffic over that connection until the WTRU receives a subsequent indication (e.g., a C2 communication Link Setup indication) from the network (e.g., a network entity). The WTRU may receive any of: (1) a successful C2 Communication Link setup indication; (2) a UAS id; (3) a peer UAV-C IP address; and/or (4) a UAV-C id (e.g., a PEI and/or a MAC address, among others) in a message from the network (e.g., a network entity) (for example via a procedure to update the PDU Session/PDN Connection and/or during a UCU procedure). In addition, or alternatively, the WTRU may receive any of: (1) a UAS id; (2) a peer UAV-C IP address; and/or (3) a UAV-C id in a message (e.g., a C2 communication authorization message) from the UTM 220. The WTRU may receive this message directly from the UTM 220 and/or via the UCF. The WTRU may engage in C2 communications (e.g., may communicate) with the peer UAV-C 212 (e.g., using the UAV-C IP).

Representative Behavior of the UAV Serving Network for Pre-Established Connectivity The network (e.g., a network entity) may perform a network-assisted UAV authentication and authorization by a UTM procedure. The network (e.g., a network entity) may receive information/an indication (e.g., a C2 communications indication) in a message from the WTRU, for example to setup a PDU Session/PDN connection to establish C2 communications. For example, the network (e.g., a network entity) may allocate resources for a PDU Session/PDN Connection (e.g., the standby PDU Session/PDN Connection). Traffic over the PDU Session/PDN Connection may be restricted (e.g., no traffic may be allowed to/from, for example external data networks, until authorization for C2 communication is established). The network (e.g., a network entity) may register the IP address of the PDU Session/PDN Connection with the UTM 220 (during or after the PDU Session/PDN Connection establishment.) The network (e.g., a network entity) may send information/an indication (e.g., a UAS association pending indication) to the WTRU in a message indicating, for example successful setup of the PDU Session/PDN connection. The network (e.g., a network entity) may receive any of: (1) a WTRU id; (2) a UAS id; (3) a UAV-C IP address; (4) a UAV-C id (e.g., a PEI and/or a MAC address, among others) in a message (e.g., a C2 communication authorization message) from the UTM 220. The network (e.g., a network entity) may update the PDU Session/PDN Connection, for example to allow exchange of C2 traffic (e.g., to/from the UAV-C IP address/DN). The network (e.g., a network entity) may send any of: (1) a successful C2 Communication Link setup indication; (2) a peer UAV-C IP address; (3) a UAV-C id (e.g., a PEI and/or MAC address, among others) in a message to the WTRU (e.g., via a procedure to update the PDU Session/PDN Connection and/or during a UCU procedure). The network (e.g., a network entity) may forward C2 traffic between the UAV 211 and the UAV-C 212.

Representative Procedures for C2 Communication Link Update with Change of UAV-C

The WTRU may be engaged in C2 communications with a UAV-C 212 (e.g., a UAV-C #1). A first pair of a first UAV 211 and a first UAV-C 212 (e.g., UAV and UAV-C #1) may be identified by an identifier UAS id #1. The WTRU may engage in C2 communication with a new UAV-C #2 212 on a condition of receiving from the network (e.g., a network entity) a message including any of: (1) a success indication (e.g., a successful C2 Communication Link update indication), (2) a new UAS id #2 (that may identify a second pair of the first UAV 211 and a second UAV-C 212 (e.g., UAV and UAV-C #2); and/or (3)a new UAV-C #2 IP, for example during a procedure to update the PDU Session/PDN connection.

Representative Behaviors of WTRU/UAV

The WTRU/UAV 211 may be exchanging C2 traffic with a first UAV-C 212 (e.g., UAV-C #1) over a network connection. The first pair (e.g., UAV, UAV-C #1) may be identified as UAS id #1. The WTRU may receive any of: (1) a success indication (e.g., a successful C2 Communication Link update indication); (2) a new UAS id #2; (3) a new peer UAV-C #2 IP address; and/or (4) a new UAV-C #2 id (e.g., a PEI and/or a MAC address) in a message from the network (e.g., via a procedure to update the PDU Session/PDN Connection and/or during a UCU procedure). In addition, or alternatively, the WTRU may receive any of: (1) a new UAS id #2; (2) a new peer UAV-C#2 IP address; and/or (3) a new UAV-C #2 id in a message (e.g., a C2 communication update authorization message) from the UTM 220. The WTRU may receive this message directly from the UTM 220 and/or via the UCF. The WTRU may engage in C2 communications (e.g., communicate) with the peer UAV-C 212 (e.g., UAV-C #2) over the network connection (e.g., using the new UAV-C#2 IP).

Representative Behaviors of UAV Serving Network

In certain representative embodiments, the network (e.g., a network entity) may forward C2 traffic between a first pair (e.g., a first UAV 211 and a first UAV-C 212 (e.g., a UAV-C #1)) over a network connection established as described herein. The first pair (e.g., UAV, UAV-C #1) may be identified as UAS id #1. The network (e.g., a network entity) may receive any of: (1) a WTRU id; (2) a UAS id #1; (3) an old UAS id #1; (4) a new UAS id #2; (5) a new UAV-C #2 IP address; and/or (6) a new UAV-C #2 id (e.g., a PEI and/or a MAC address, among others) in a message (e.g., a C2 communication update authorization message) from the UTM 220. The network (e.g., a network entity) may update the connection, for example to allow exchange of C2 traffic between the first UAV 211 and a second UAV-C 212 (e.g., UAV-C #2) (e.g., to/from UAV-C #2 IP address/DN) and/or to block the exchange of C2 traffic between the first UAV 211 and the first UAV-C 212 (e.g., UAV-C#1). The network (e.g., a network entity) may send any of: (1) a success indication (e.g., a successful C2 Communication Link update indication); (2) a new UAS id #2; (3) a new peer UAV-C#2 IP address; and/or (4) a new UAV-C #2 id (e.g., a PEI and/or a MAC address, among others) in a message to the WTRU (e.g., via a procedure to update the PDU Session/PDN Connection and/or during a UCU procedure). The network (e.g., a network entity) may forward C2 traffic between the first UAV 211 and the second UAV-C 212 (e.g., UAV-C #2) over the network connection.

Representative Procedures for C2 Communication Link Switch with Change of UAV-C

The WTRU/UAV 211 may be engaged in C2 communications with a first UAV-C #1 212 over a first network connection #1. The first pair of the first UAV 211 and the first UAV-C #1 212 may be identified by an identifier UAS id #1.

The WTRU/UAV 211 may establish a second connection (e.g., a standby connection #2) for a potential C2 Communication Link switch to another UAV-C 212 (e.g., UAV-C #2). The WTRU may engage in C2 communication with a second UAV-C 212 (e.g., UAV-C #2) on a condition of reception from the network (e.g., a network entity) of a message including any of: (1) a success indication (e.g., a successful C2 Communication Link switch indication); (2) a new UAS id #2 (e.g., to identify a second pair of the first UAV 211 and the second UAV-C 212 (e.g., UAV-C #2)); (3) an old UAS id #1; and a new UAV-C #2 IP during a procedure to update the PDU Session/PDN connection for the second connection #2.

The WTRU also receives an indication (e.g., one or more policies/rules) on how to handle the existing connection. In certain embodiments, the indication may indicate to maintain connection #1 (e.g., as a backup, with a lower priority than connection #2). In that case connection #1 may not be released and C2 packets may be exchanged over connection #2 (as connection #2 has the higher priority). The WTRU or the network may later set the connection #1 with a higher priority and switch the C2 traffic back to the connection #1. In certain examples, the WTRU may be requested to release connection #1 associated with UAV-C #1/UAS id #1 based on an indication (e.g., when or on condition that authorization for C2 communications with UAV-C #1 is revoked). The WTRU may receive a timer that may control when the old connection (e.g., connection #1) may be released.

A similar procedure may be used to switch the C2 communication path from UAV-UAV-C#1 (e.g., direct or network-assisted communications) to UAV-USS/UTM (UTM-navigated communications). In this scenario, the USS/UTM may play a role (e.g., may function/operation) analogous to that of the new UAV-C 212 (UAV-C #2).

Representative Behaviors for WTRU/UAV for C2 Communication Link Switch (for Example with Change of UAV-C)

The WTRU/UAV 211 may be exchanging C2 traffic with a first UAV-C 212 (e.g., UAV-C #1) over a first network connection (e.g., network connection #1). The first pair of the first UAV 211 and the first UAV-C 212 (e.g., UAV, UAV-C #1) may be identified as UAS id #1. The WTRU may have a pre-established and/or standby connection (e.g., a second network connection #2) as described herein. In certain embodiments, connection #1 may be using a direct link (e.g., in which the UAV-C 212 in proximity is using a PC5 link).

The WTRU may receive any of: (1) a success indication (e.g., a successful C2 Communication Link switch indication); (2) an old UAS id #1; (3) a new UAS id #2; (4) a new peer UAV-C #2 IP address (e.g., a USS/UTM IP address if the C2 is switched to UTM-navigated); and/or (5) a new UAV-C #2 id (e.g., a PEI and/or a MAC address) and/or (6) an indication of the communication type (e.g., direct, network assisted, and/or UTM-navigated, among others), an indication on how to handle existing connection #1 (e.g., to maintain or to release the existing connection #1) in a message from the network (e.g., via a procedure to update the network connection (e.g., a PDU Session/PDN Connection and/or the network connection #2)) and/or during a UCU procedure. In addition, or alternatively, the WTRU may receive any of: (1) an old UAS id #1; (2) UAS id #2; (3) a new peer UAV-C #2 IP address; and/or (4) a new UAV-C #2 id in a message (e.g., a C2 communication switch authorization message) from the UTM 220. The WTRU may receive the message directly from the UTM 220 and/or via the UCF. The WTRU may engage in C2 communications (e.g., communicate) with the peer UAV-C 212 (e.g., UAV-C #2) over the standby and/or second network connection (e.g., the network connection #2). For a switch to direct C2 communications (e.g., to enable a takeover by law enforcement officer in proximity) the UAV 211 may establish a direct link (connection #3) with the UAV-C #2 in addition or alternatively to using the standby connection #2 above. The WTRU may be instructed to establish a direct link with the UAV-C #2 based on an indication and/or direct communication parameters received along with the link switch indication as described herein. In certain examples, the WTRU may have been provisioned with a policy indicating what connection to use when switching to/from (direct only, direct+standby network-assisted, only standby network-assisted) connection types.

The WTRU may release or may maintain the first network connection (e.g., the network connection #1) based on the existing connection handling indication (e.g., one or more policies/rules) from the network/USS/UTM 220 and/or a connection release timer. If connection #1 is maintained, the WTRU may send and may receive C2 packets via connection #2. The WTRU may discard any packets received via connection #1. The WTRU may revert back to C2 communications via connection #1, for example when or on condition that the WTRU is instructed via a subsequent link switching command from the network (e.g., the control is handed over/back to the original UAV-C).

Representative Behaviors for UAV Serving Network for C2 Communication Link Switch (for Example with Change of UAV-C)

The network (e.g., a network entity) may forward C2 traffic between the UAV 211 and the first UAV-C 212 (e.g., UAV-C #1). The first pair (e.g., UAV, UAV-C #1) may be identified as UAS id #1. The network (e.g., a network entity) may have allocated resources for a second and/or standby network connection (e.g., network connection #2), as described herein. The network (e.g., a network entity) may receive any of: (1) a WTRU id; (2) a UAS id #1; (3) an old UAS id #1; (4) a new UAS id #2; (5) a new UAV-C #2 IP address (USS/UTM IP address if C2 is switched to UTM-navigated), and/or (6) a new UAV-C #2 id (e.g., a PEI and/or a MAC address, among others), an indication of the communication type (e.g., network assisted, UTM-navigated), an indication on how to handle existing connection #1 (e.g., maintain, release) in a message (e.g., a C2 communication update authorization message) from the UTM 220.

The network (e.g., a network entity) may update the second and/or standby network connection (e.g., the PDU Session/PDN Connection and/or the network connection #2), for example to allow exchange of C2 traffic between the UAV 211 and the second UAV-C 212 (e.g., the UAV-C #2) (e.g., to/from the UAV-C #2 IP address/DN) and may block exchange of C2 traffic between the UAV 211 and the first UAV-C 212 (e.g., UAV-C #1), for example over the first network connection (e.g., the network connection #1). The network (e.g., a network entity) may send any of: (1) a success indication (e.g., a successful C2 Communication Link switch indication); (2) a new UAS id #2, a new peer UAV-C #2 IP address; and/or (3) a new UAV-C #2 id (e.g., a PEI and/or a MAC address) in a message to the WTRU (e.g., via a procedure to update the second/standby network connection (e.g., a PDU Session/PDN Connection and/or network connection #2)) or during a UCU procedure. The network (e.g., a network entity) may forward the C2 traffic between the UAV 211 and the second UAV-C 212 (e.g., the UAV-C #2) over the second/standby network connection (e.g., the network connection #2). The network may initiate the release of the first network connection (e.g., the network connection #1). For example, the network may trigger the release of connection #1 based on the existing connection handling indication (e.g., one or more policies/rules) from the USS/UTM 220.

Representative Procedures for C2 Communication Link Update (for Example with Change of UAV/UAV-C IP Address)

The WTRU/UAV 211 may be engaged in C2 communication (e.g., communicate) with a UAV-C 212. The network (e.g., a network entity) may decide/determine that the WTRU is to be or may be served by another User Plane Function (UPF) (e.g., because of WTRU/UAV mobility), for example that may be possibly closer to the WTRU/UAV 211. The WTRU/UAV 211 may obtain a new IP address associated with this new serving UPF.

In certain representative embodiments, apparatus, systems and/or procedures may be implemented for network-assisted UAV change of IP address. For example, the UAV-C 212 may use the new UAV IP address during C2 communications on a condition of or after reception from the network (e.g., a network entity) of a message including information/an indication (e.g., a C2 Communication Link update indication, and/or a new UAV IP address, among others). The WTRU/UAV 211 may use the new UAV IP address during C2 communications on a condition of or after reception from the network (e.g., the network entity) of a message including a success indication (e.g., a successful C2 Communication Link update indication).

Representative Behaviors for UAV for C2 Communication Link Update (for Example with Change of UAV/UAV-C IP Address)

The operations/behaviors/actions of the WTRU/UAV 211 may include any of: (1) the WTRU/UAV 211 obtaining a new IP address; (2) the WTRU/UAV 211 triggering the C2 Communication link update toward the UAV-C 212; (3) the WTRU/UAV 211 receiving an indication from the network that the C2 Communication link update is successful; and/or (4) the WTRU/UAV 211 starting to use the new IP address (e.g., its new IP address) for C2 communication, among others.

The operations/behaviors/actions of the UAV-C 212 may include any of: (1) the UAV-C 212 receiving an indication from the network (e.g., a network entity) to update the C2 Communication link with a new UAV IP address; (2) the UAV-C 212 updating the internal C2 Communication link information (e.g., its link information); (3) the UAV-C 212 acknowledging a reception of the new IP address of the UAV 211 and/or the C2 Communication link update; and/or (4) the UAV-C 212 starting to use the new IP address of the UAV 211 for C2 communications, among others.

The operations/behaviors/actions of the network (e.g., a network entity) may include any of: (1) the network (e.g., a network entity) receiving a trigger from the UAV 211 to update the C2 Communication link with its new IP address (e.g., alternatively, the network (e.g., a network entity) may trigger the update of the C2 Communication link); (2) the network (e.g., a network entity) sending information/an indication (e.g., a connection modification indication) of the UAV 211 to the UTM 220, (for example, the information may include a new IP address of the UAV); and/or (3) the network (e.g., a network entity) updating an internal state of the PDU Session with authorization for C2 communications with UAV-C 212 at or after a reception of a connection modification response (e.g., a successful connection modification response) of the UAV 211 from the UTM 220, and/or (4) the network (e.g., the network entity) sending an indication to the UAV, for example to allow the usage of the new IP address for C2 communications.

In certain representative embodiments, apparatus, systems and/or procedures may be implemented for network UTM assisted UAV change of an IP address. For example, the WTRU/UAV 211 may send an indication (e.g., a C2 Communication Link update indication), and/or a new UAV IP address to the UTM 220. The WTRU/UAV 211 and/or the UTM 220 may send the indication to the UAV-C 212. The WTRU/UAV 211 may receive a confirmation that the C2 Communication Link update is successful. The UAV 211 and the UAV-C 212 may start using the new IP address of the WTRU/UAV 211 for C2 communications.

The operations/behaviors/actions of the WTRU/UAV 211 may include any of: (1) the WTRU/UAV 211 obtaining a new IP address; (2) the WTRU/UAV 211 sending a C2 Communication link update including the new IP address of the WTRU/UAV 211 to the UTM 220; (3) the WTRU/UAV 211 receiving an indication from the UTM 220 that the C2 Communication link update is successful; and/or (4) the WTRU/UAV 211 starting to use the new IP address of the WTRU/UAV 211 for C2 communications, among others.

The operations/behaviors/actions of the UAV-C 212 may include any of: (1) the UAV-C 212 receiving an indication from the UTM 220 or from the UAV 211 to update the C2 Communication link with the new IP address of the UAV; (2) the UAV-C 212 updating internal C2 Communication link information of the UAV-C 212; (3) the UAV-C 212 acknowledging a reception of the new IP address of the UAV 211 and/or the C2 Communication link update; and/or (4) the UAV-C 212 starting to use the new IP address of the UAV 211 for C2 communications, among others.

The operations/behaviors/actions of the UTM 220 may include any of: (1) the UTM 220 receiving an indication from UAV 211 to update the C2 Communication link with the new IP address of the UAV; (2) the UTM 220 sending information/an indication (e.g., a C2 Communication link update indication) to the UAV-C 212 (for example the information may include the new IP address of the UAV); and/or (3) the UTM 220 sending an indication to the UAV 211 to allow the usage of the new IP address of the UAV 211 for C2 communications, for example upon or after reception of a success indication (e.g., a successful C2 Communication link update indication) from the UAV-C 212.

It is contemplated that the UAV-C 212 may update the IP address of the UAV-C 212 and one of skill understands that the UAV-C 212 may use the same or a similar procedure/mechanism to update the C2 Communication Link with the one or more peer UAVs of the UAV-C 212.

Representative Procedures for UTM Setup of C2 Communication Link (e.g., for UTM Based Navigation)

In certain representative embodiments, the UAV 211 and/or the UAV-C 212 may pre-establish connectivity with the network (e.g., a network entity), for example to enable C2 communications with the UTM 220. The WTRU/UAV 211 may send information/an indication (e.g., a C2 communication indication, with a UTM based navigation mode) to the network (e.g., a network entity), for example during the procedure to establish a new PDU Session/PDN connection and may receive a pending indication (e.g., a UAS association pending indication), for example during the procedure. The WTRU may engage in C2 communications with the UTM 220 on a condition or after reception from the network (e.g., a network entity) of a message including any of: (1) a success indication (e.g., a successful C2 Communication Link setup indication); (2) a UAS id; and/or (3) a UTM IP, for example during a procedure to update the PDU Session/PDN connection.

One of skill in the art understands that the WTRU/UAV 211 and network operations/behaviors for UTM setup of the C2 Communication Link are the same or similar to procedure for C2 Communication Link Setup with the UAV-C 212 as set forth herein. Certain differences are disclosed herein.

The operations/behaviors/actions of the WTRU/UAV 211 may include any of: (1) the WTRU/UAV 211 being authenticated and authorized as a WTRU/UAV 211 by the network and/or the UTM 220; (2) the WTRU/UAV 211 establishing a standby network connection to establish C2 communications as described herein, (e.g., during the network connection establishment, the WTRU may indicate that the connection is for C2 communications and may specify a C2 communication type (e.g., UTM-navigated); (3) the WTRU/UAV 211 receiving any of: a success indication (e.g., a successful C2 Communication Link setup indication), a UAS id, and/or a UTM IP address in a message from the network (e.g., a network entity) (for example, in addition, or alternatively, the WTRU/UAV 211 may receive any of: a UAS id, a UTM IP address, and/or a port number in a message (e.g., a C2 communication authorization message) from the UTM 220. The WTRU may receive the message directly from the UTM 220 and/or via the UCF); and/or (4) the WTRU/UAV 211 engaging in C2 communications (e.g., communicating) with the UTM 220.

The operations/behaviors/actions of the UAV 211 Serving Network may include any of: (1) the network (e.g., a network entity) having authenticated and/or authorized the UAV 211 by the UTM 220; (2) the network (e.g., a network entity) having allocated resources for a second and/or standby connection as described herein; (3) the network (e.g., a network entity) receiving a WTRU id, an indication (e.g., a C2 communications indication (e.g., for UTM navigation)), a UAS id, a UTM IP address, and/or a port number in a message from the UTM 220, among others; (4) the network (e.g., a network entity) updating the PDU Session/PDN Connection, for example to allow exchange of C2 traffic (e.g., to/from the UTM IP address/DN); (5) the network (e.g., a network entity) sending any of: a success indication (e.g., a successful C2 Communication Link setup indication), and/or a UTM IP address in a message to the WTRU/UAV 211; and/or (6) the network (e.g., a network entity) sending or forwarding C2 traffic between the UAV 211 and the UAV-C 212, among others.

In certain representative embodiments, procedures, apparatus and/or systems may be implemented for navigation by the UAV-C 212. For example, the UAV-C id and/or UAV id may be communicated to the USS/UTM as set forth herein and the USS/UTM may not provide/expose the peer UAV-C IP address and/or the UAV IP address to the WTRU/UAV 211. The USS and/or the UTM 220 (e.g., which may act as an application server) may forward (e.g., may transparently forward/send) traffic between the UAV 211 and the UAV-C 212. The USS/UTM may enable a change (e.g., a transparent change) of the UAV-C 212 to the UAV 211, a change (e.g., a transparent change) of UAV IP address to the respective UAV-C 212, and/or a change (e.g., a transparent change) of UAV-C IP address to the respective UAV 211.

Representative Procedures for C2 Communication Link with UAV-C Setup (e.g., Using the Same PLMN)

One of skill in the art understands that the WTRU/UAV 211 and/or network operations/behavior/actions are the same or similar to those of other C2 Communication Link Setup procedures using/with the UAV-C 212 set forth herein.

Certain differences may include that the network (e.g., a network entity) may not be required/used to expose the UAV IP/MAC address and/or the UAV-C IP/MAC address to the UTM 220, for example to enable the UAV 211 and UAV-C 212 to establish a C2 communication link with each other.

The operations/behaviors/actions of the UAV Serving Network may include any of: (1) the network (e.g., a network entity) having authenticated and/or authorized the WTRU, as a UAV, and/or the respective UAV-C 212 with the UTM 220; (2) the network (e.g., a network entity) having allocated resources for a second/standby connection for the UAV 211 and/or the respective UAV-C 212, as described herein; (3) the network receiving a UAS id, a UAV WTRU id, and/or a UAV-C WTRU id in a message from the UTM 220 (for example, the network may select an available second/standby PDU Session/PDN Connection for C2 communications with the UAV-C/respective UAV. The network may update the PDU Session/PDN Connection, for example to allow exchange of C2 traffic with the UAV-C/respective UAV); (4) the network sending any of: a success indication (e.g., a successful C2 Communication Link setup indication), a UAV-C IP address, and/or a respective UAV IP address in a message to the UAV/respective UAV-C; and/or (5) the network forwarding/sending C2 traffic between the UAV 211 and the UAV-C 212.

Representative Procedures for C2 Communication Path Switching (e.g., from Direct to Network-Assisted or Network-Assisted to Direct)

The UAV 211 may be authorized by a USS/UTM via the network (e.g., a network entity, and/or a UCF) for UAV operations. During or following the UAV authorization procedure, the UAV 211 may receive from the network (e.g., a network entity) and/or the USS one or more parameters allowing the UAV 211 to establish C2 communications with a UAV-C 212. The parameters may include any of: (1) one or more USS-assigned identities (e.g., one or more UAS ids, and/or one or more CAA level UAV ids, among others), (2) one or more UAV-C identities (e.g., one or more WTRU ids, and/or one or more IP addresses, among others), (2) one or more types of C2 communications that the UAV 211 are or may be authorized to use (e.g., a direct type, a network assisted type, and/or a UTM-navigated type, among others) and an indication whether or not redundant C2 connections are allowed, preferred and/or required/used.

The UAV 211 may use the received parameters (e.g., the UAS id, and/or the UAV-C WTRU id, among others), for example to discover and/or to establish a direct link (e.g., over the PC5 or another direct link using another Radio Access Technology (e.g., Bluetooth, and/or WiFi, among others) with a UAV-C 212 for direct C2 communications. In certain representative embodiments, based on the types of C2 communication allowed and the redundant C2 connection policy/rule, the UAV 211 may establish a PDU Session for backup network assisted C2 communications. The UAV 211 and the UAV-C 212 may inform each other over the direct link, or the network assisted link (e.g., whichever link is established first) whether other one has a backup (e.g., redundant) network connection ready. In addition, or alternatively, the UAV 211 and the UAV-C 212 may negotiate over the direct link or the network assisted link whether to establish a backup network connection based on their respective redundant C2 connection policy or policies. During or after the direct link establishment, the UAV 211 and UAV-C 212 may exchange and/or may negotiate one or more QoS parameters including C2 communications threshold values (e.g., a range and/or distance limit, delay, a packet loss, signal strength) associated with the quality of the direct link, among others).

During direct C2 communications, if UAV/UAV-C detects that the direct link quality has decreased below a threshold/limit based on one or more of these thresholds being crossed (e.g., the UAV 211 may move beyond a given range), the UAV/UAV-C may switch the C2 communication path from direct to network-assisted (e.g., subsequent C2 packets may be transmitted/received over the Uu instead of the PC5). During network-assisted C2 communications, if the UAV 211 and/or the UAV-C detects that the direct link quality improves (e.g., based on one or more C2 communication threshold values) for example if the UAV 211 moves back within the range limit, the UAV 211 and/or UAV-C 212 may switch back the C2 communication path from network-assisted to direct. When the UAV 211 and/or the UAV-C 212 determines to switch the C2 communication path, the UAV 211 or UAV-C 212 may notify its peer device of the determination/decision so that the peer device may switch the C2 communication path, correspondingly. If the switch notification is lost over its current communication path (e.g., direct link), and the peer device receives the C2 messages from the other path (e.g., a backup/redundant network connection), the peer device may determine that the communication path has been switched. The UAV 211 and/or UAV-C 212 may notify the USS/UTM (e.g., via higher layer messaging and/or application layer messaging) when the C2 communication path has been switched to direct or network-assisted. This notification information may be used by the USS/UTM to determine whether or not the current communication path allows for the UAV 211 to be operated in BVLOS.

In certain representative embodiments, the WTRU may communicate with the Core Network Functions (NFs) using NAS messages. Examples of such Core NFs are AMF/SMF in 5GC, and MME/PGW-C in EPC. The Core NFs may communicate with the UTM 220 via a UCF or Network Exposure Function (NEF) and/or the UPF in 5GC, via a Policy and Charging Rules Function (PCRF) in EPC. For example, the UAV 211 may connect through a PLMN. The UAV-C 212 may connect through the same or a different PLMN or no PLMN at all (e.g., using a landline).

Figure 3A:
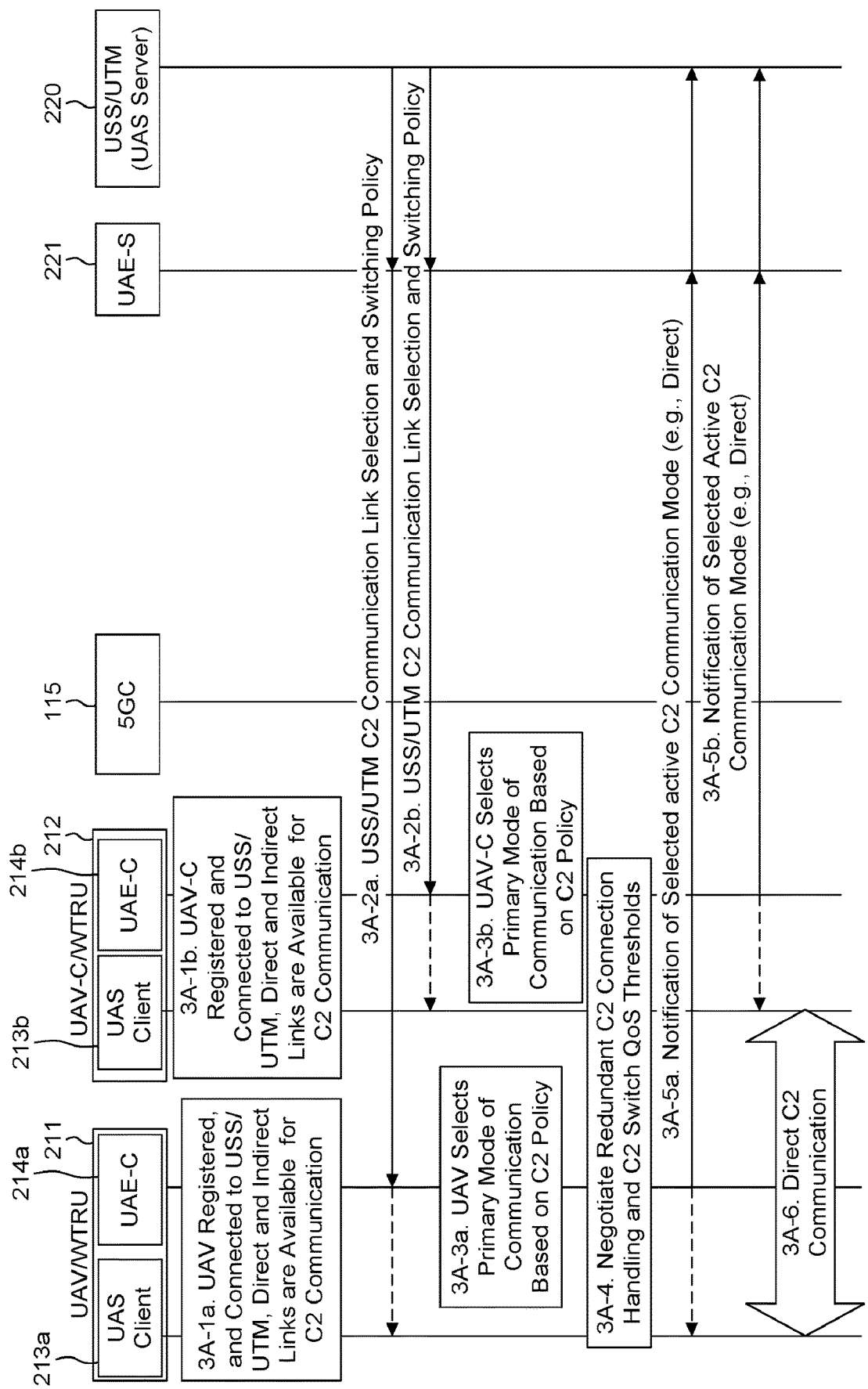
FIG. 3A is a diagram illustrating a representative procedure for an initial C2 communication mode selection based on USS (UAS Service Supplier)/UTM policy.

FIG. 3A is a diagram illustrating a procedure for an initial C2 communication mode selection using WTRU (UAE-C as UAS Application Enabler Client) assistance with network (UAE-S 221 as UAS Application Enabler Server) control based on a network entity policy (e.g., USS/UTM 220). The initial C2 mode of communication selected may be direct or indirect (e.g., network-assisted). Referring to FIG. 3A, for illustrative purposes direct C2 communication is selected first.

At operation 3A-1a, the WTRU (e.g., the UAV) may have been authorized by the network entity (e.g., the USS/UTM 220). At operation 3A-1b, the WTRU (e.g., the UAV-C 212) may have been authorized by the network entity (e.g., the USS/UTM 220). Both direct and indirect links may be available for C2 communication.

At operation 3A-2a, the WTRU (e.g., the UAV) may receive a C2 communication link selection and switching policy from the network entity (e.g., the USS/UTM 220) (e.g., via a UAS Application Enabler (UAE) layer). At operation 3A-2b, the WTRU (e.g., the UAV-C 212) may receive a C2 communication link selection and switching policy from the network entity (e.g., the USS/UTM 220) (e.g., via UAE layer). The content of the policy may be as described herein.

At operation 3A-3a, the WTRU (e.g., the UAV) may select a primary mode of communication based on C2 communication link selection and switching policy. At operation 3A-3b, the WTRU (e.g., the UAV-C 212) may select a primary mode of communication based on C2 communication link selection and switching policy.

At operation 3A-4, the WTRU (e.g., the UAV 211 and/or the UAV-C 212) may negotiate (e.g., over the primary link) with its peer: usage of redundant C2 links and/or C2 link QoS thresholds as described herein based on the received policy.

At operation 3A-5a, the WTRU (e.g., the UAV) may notify the network entity (e.g., the USS/UTM 220) (e.g., via the UAE layer) about the current active C2 communication mode. At operation 3A-5b, the WTRU (e.g., UAV-C 212) may notify the network entity (e.g., the USS/UTM 220) (e.g., via the UAE layer) about the current active C2 communication mode.

At operation 3A-6, the WTRU (e.g., the UAV 211 or/and the UAV-C 212) may perform C2 communication (e.g., direct or indirect) with its peer, while monitoring the current C2 link against the negotiated QoS thresholds for C2 switching.

Figure 3B:
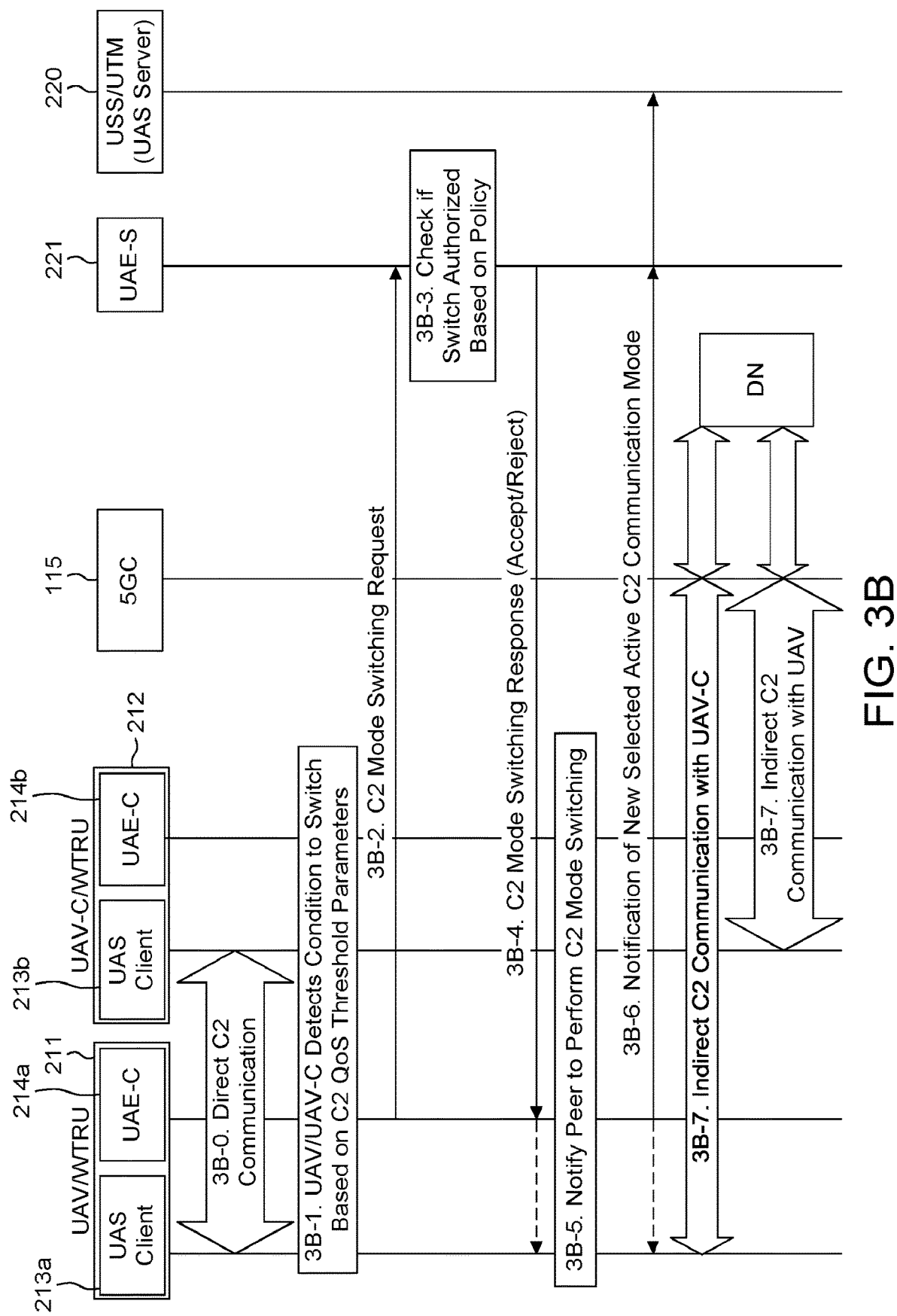
FIG. 3B is a diagram illustrating a representative procedure for C2 communication mode switching based on USS/UTM policy.

FIG. 3B is a diagram illustrating a procedure for an C2 communication mode switching using UE (UAE-C as UAS Application Enabler Client) assistance with network (UAE-S 221 as UAS Application Enabler Server) control, based on the network entity (e.g., the USS/UTM 220) policy. The UAE layer (UAE-C and UAE-S) provides an adaptation layer for the application layer one the WTRU side as a UAE-C and on the server side as a UAE-S. Referring to FIG. 3B, for illustrative purposes, the initial mode of C2 communication selected is direct and the WTRU switches to an indirect mode of C2 communication. It is understood that the reverse scenario (e.g., indirect to direct) is also possible using similar steps.

At operation 3B-0, the WTRU (e.g., UAV 211 and/or UAV-C 212) may perform C2 communication (e.g., direct) with its peer.

At operation 3B-1, the WTRU (e.g., UAV 211 and/or UAV-C 212) may detect that C2 switching conditions are met on current C2 link, for example based on C2 link QoS threshold parameters (e.g., low signal strength) for the UAV 211 to switch to another mode of C2 communication (e.g., indirect).

At operation 3B-2, the WTRU (e.g., the UAV 211 and/or the UAV-C 212) may send a request message to a UAS server (e.g., via the UAE layer) to perform C2 mode switching. The request message may include information related to the switching conditions/context such as current C2 link QoS parameters, target C2 link and/or QoS parameters.

At operation 3B-3, the UAS server may check that/determine whether the WTRU (e.g., UAV 211 and/or UAV-C 212) is authorized to switch to the target C2 link, based on the network entity (e.g., the USS/UTM 220) policy and C2 links QoS parameters received from the WTRU.

At operation 3B-4, the UAS server may send a response message to the WTRU (e.g., the UAV 211 and/or the UAV-C 212) authorizing or rejecting the C2 mode switching.

At operation 3B-5, if authorized by the UAS server, the WTRU (e.g., the UAV 211 and/or the UAV-C 212) may notify its peer (e.g., via the UAE layer) about the switch to the new active C2 communication mode.

At operation 3B-6, the WTRU (e.g., UAV 211 and/or UAV-C 212) may notify the network entity (e.g., the USS/UTM 220) (e.g., via the UAE layer) about the new active C2 communication mode.

At operation 3B-7, the WTRU (UAV 211 and/or UAV-C 212) may switch to the target C2 communication mode (e.g., a network-assisted mode).

In certain representative embodiments, following a C2 communication switch in one direction, the WTRU (e.g., the UAV 211 and/or the UAV-C 212) may decide/determine to perform a switch back to the original C2 communication mode, on condition that its quality meets the one or more negotiated C2 communication QoS thresholds following a similar procedure as described above.

Representative Procedures for C2 Communication Link with UAV-C Setup (e.g., using On-Demand Connectivity)

Figure 3C:
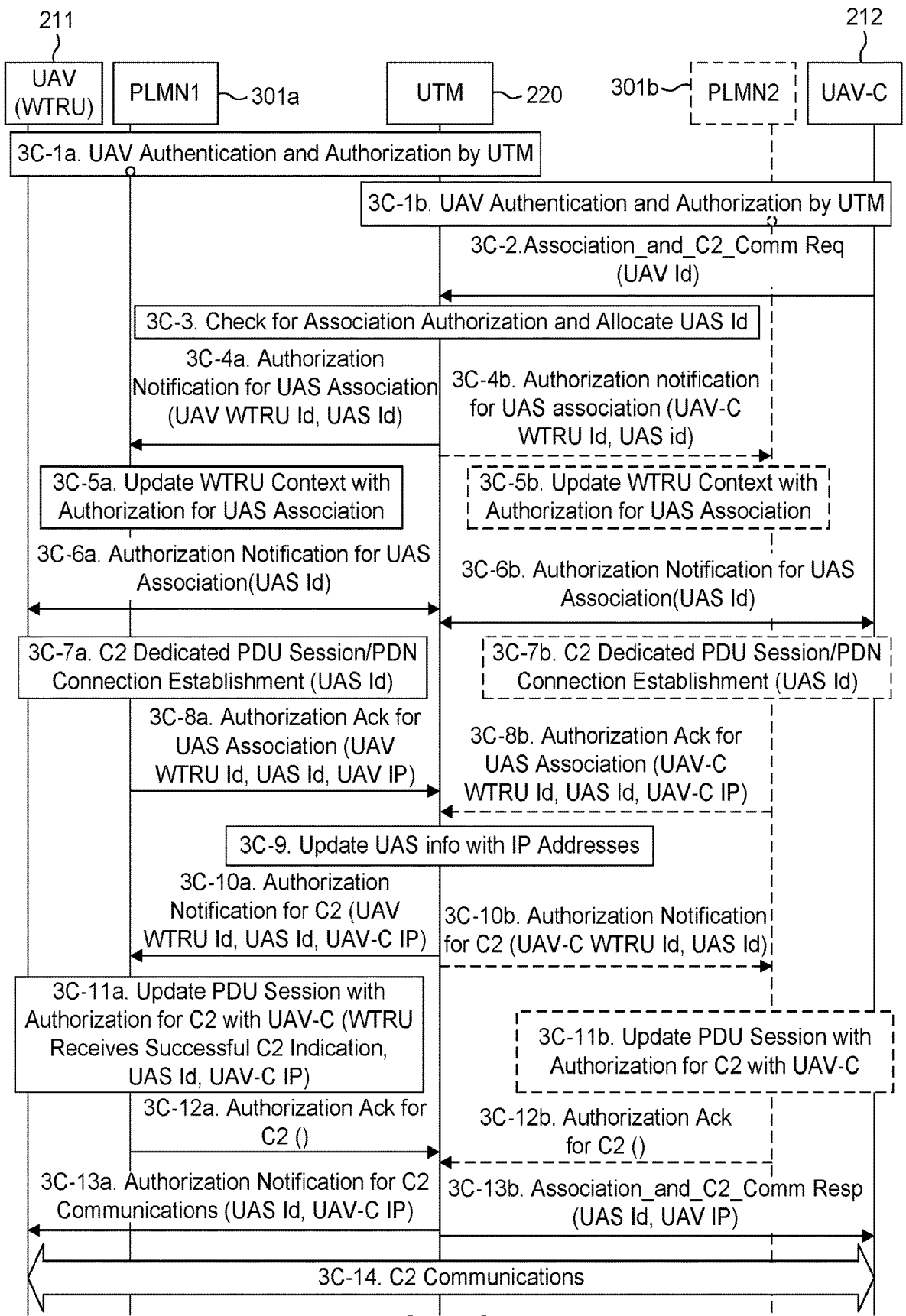
FIG. 3C is a diagram illustrating a representative procedure for C2 Communication Link with UAV-C Setup using on-demand network connectivity establishment.

FIG. 3C is a diagram illustrating a procedure for C2 Communication Link with UAV-C Setup using on-demand network connectivity establishment. Referring to FIG. 3C, the procedure may include, at operation 3C-1a, the WTRU/UAV 211 performing a network-assisted UAV authentication and/or authorization by and/or using a UTM procedure. Similarly, at operation 3C-1b, the UAV-C 212 may be authenticated and/or authorized by the UTM 220 with network assistance. For each of the UAV 211 and the UAV-C 212, the UTM 220 may maintain a context that may include UAV and UAV-C identities (e.g., their respective identities such as UAV id, UAV WTRU id, UAV-C id, and/or UAV-C WTRU id, among others). At operation 3C-2, the UAV-C 212 may send to the UTM 220, a request message for association with a UAV, for example to establish C2 communications. The request message may include the identifier of the target UAV 211 (e.g., the UAV id). In certain embodiments, the UAV Id may be provided by the UAV-C 212 to the USS/UTM 220 earlier (e.g., if available, during the authentication and/or authorization by the UTM 220). In that case, the message may be skipped and/or the USS/UTM 220 may perform a pairing authorization based on internal logic and/or a different trigger. For example, the USS/UTM 220 may detect when both the UAV 211 and the UAV-C 212 become present online and/or a ready operational status of the UAV 211 (e.g., sufficient battery level) etc.

The UAV-C 212 may send the message to the UTM 220 via the user plane directly or via a UCF, or the UAV-C 212 may send a request in a NAS message (e.g., a UAV Info Container which may include the UAV related message put and/or embedded in a NAS message) which may be forwarded by the AMF to the UCF. The UCF may locate the UTM/USS 220 and may forward the request to the UTM/USS 220. When the UAV-C 212 sends the request via the UCF, the UAV-C 212 may provide both its own UAV identifier and/or the target UAV identifier. The operations, methods and ways described herein for how the UAV/UAV-C may communicate with the UTM 220 may equally apply to other operations, methods and ways of communication in this and other representative embodiments disclosed herein.

At operation 3C-3, the UTM 220 may check if the UAV-C 212 is authorized to be associated with or control the UAV 211 identified by the UAV id. For example, the UTM 220 may check that the UAV id requested by the UAV-C 212 corresponds to a UAV 211 that is authorized/available and that whose owner/pilot certificate match that of the UAV-C 212. The USS/UTM 220 may allocate a new UAS id associating the UAV 211 and the UAV-C 212, upon successful authorization. The UAS id may be used as a Remote ID, for example for identification and/or tracking. The UAS id may include the identity of the assigning entity (e.g., a specific USS) and may randomize the identity, for example to preserve UAV operator/pilot privacy. For example, the UAS id may be allocated as "random number@USS domain name".

At operation 3C-4a, the UTM 220 may send a message to the UAV serving PLMN 301a (e.g., the PLMN1) that may include the UAV WTRU id and/or the UAS id, which may identify the authorized UAS association, if UAV-C 212 is connected through a PLMN. At operation 3C-4b, the UTM 220 may send, to the UAV-C serving PLMN 301b (e.g., the PLMN2), a notification message (e.g., the same or a similar notification message) that may include the UAV-C WTRU id and/or the UAS id. For example, in a representative 5GC deployment, the message may be forwarded/sent to the serving AMF for the WTRU/UAV 211 and/or UAV-C 212 via a NEF or a UCF and/or via the SMF using an existing N4 session with the UTM 220 (e.g., using an N4 session that may be established during operation 3C-1).

At operation 3C-5a, a NF (e.g., an AMF or an MME) in the serving PLMN 301a of the UAV 211 may update the context (e.g., the WTRU/UAV context), for example to authorize the UAS association identified by the UAS id. At operation 3C-5b, the serving PLMN 301b of the UAV-C 212 (if any) may perform the same or a similar procedure with the UAV-C 212 (e.g., to perform context updates). At operations 3C-6a and/or 3C-6b, the UTM 220 may send one or more messages to the UAV 211 and/or UAV-C 212 that may include the UAS id identifying the authorized UAS association.

At operation 3C-7a, the WTRU/UAV 211 may establish a PDU Session/PDN Connection with the serving PLMN 301a (e.g., AMF/SMF) of the WTRU/UAV. The WTRU/UAV 211 may send the UAS id to the serving PLMN 301a of the WTRU/UAV 211 during the procedure (e.g., in a PDU Session Establishment Request message). The WTRU may receive an indication (e.g., a UAS association pending indication) from the serving PLMN 301a (e.g., AMF/SMF) during the procedure (e.g., in a PDU Session Establishment Accept message). At operation 3C-7b, the UAV-C 212 may perform the same or a similar procedure with its PLMN 301b (if any).

At operation 3C-8a, the UAV serving PLMN 301a may send a message to the UTM 220 in response to or after the one or more messages in operation 3C-4a. The message may include any of: (1) a UAV WTRU id; (2) a UAS id; and/or (3) a UAV IP/MAC address. The UAV serving PLMN 301a may also provide location information of the UAV 211 (e.g., a take-off location) at this time. Location tracking may be initiated during or after UAV authentication and authorization by the USS/UTM 220. At operation 3C-8b, the UAV-C serving PLMN 301b (if any) may perform the same or a similar procedure, the UAV-C serving PLMN 301b may send a message to the UTM 220 in response to or after the one or more messages in operation 3C-4b. The message may include any of: (1) a UAV-C WTRU id; (2) a UAS id; and/or (3) a UAV-C IP/MAC address. At operation 3C-9, the UTM 220 may update the UAV context with the peer UAV-C addresses, and the contexts may be linked together through a UAS association identified by the UAS id. The UTM 220 may update the respective UAV-C context with the UAV addresses and the contexts may be linked together through the UAS association identified by the UAS id.

At operation 3C-10a, the UTM 220 may send a message to the UAV serving PLMN 301a that may include any of: (1) a UAV WTRU id; (2) a UAS id; and/or (3) a UAV-C IP/MAC address, for example to authorize C2 communications. At operation 3C-10b, the UTM 220 may send a notification message (e.g., the same or a similar notification message) to the UAV-C serving PLMN 301b (if any) that may include any of: (1) the UAV-C WTRU id; (2) the UAS id; and/or (3) the UAV IP/MAC address. The UAV serving PLMN 301a may trigger a modification of the PDU Session/PDN Connection established in operations 3C-7a and/or 3C-7b.

At operation 3C-11a, the WTRU/UAV 211 may receive any of: (1) a success indication (e.g., successful C2 communication indication); and/or (2) a UAV-C IP/MAC address from the serving PLMN 301a of the WTRU/UAV 211 during the procedure (e.g., in a PDU Session Command message). At operation 3C-11b, the UAV-C serving PLMN 301b (if any) may perform the same or a similar procedure with the UAV-C 212. At operation 3C-12a, the UAV serving PLMN 301a may send a message to the UTM 220 in response to and/or after the message in operation 3C-10a. At operation 3C-12a, the UAV-C serving PLMN 301b may send the same or a similar message to the UTM 220 in response to and/or after the message in operation 3C-10b.

At operation 3C-13a, the UTM 220 may send a message to the WTRU/UAV 211 that may include any of: (1) a UAS id; and/or (2) a UAV-C IP/MAC address for example for authorizing C2 communications. At operation 3C-13b, the UTM 220 may send the same or a similar notification message to the UAV-C 212 that may include any of: (1) a UAS id; and/or (2) a UAV IP/MAC address, among others. At operation 3C-14, the UAV 211 and UAV-C 212 may exchange C2 traffic.

Representative Procedures for C2 Communication Link with UAV-C Setup (e.g., Using Pre-Established Connectivity)

Figure 4:
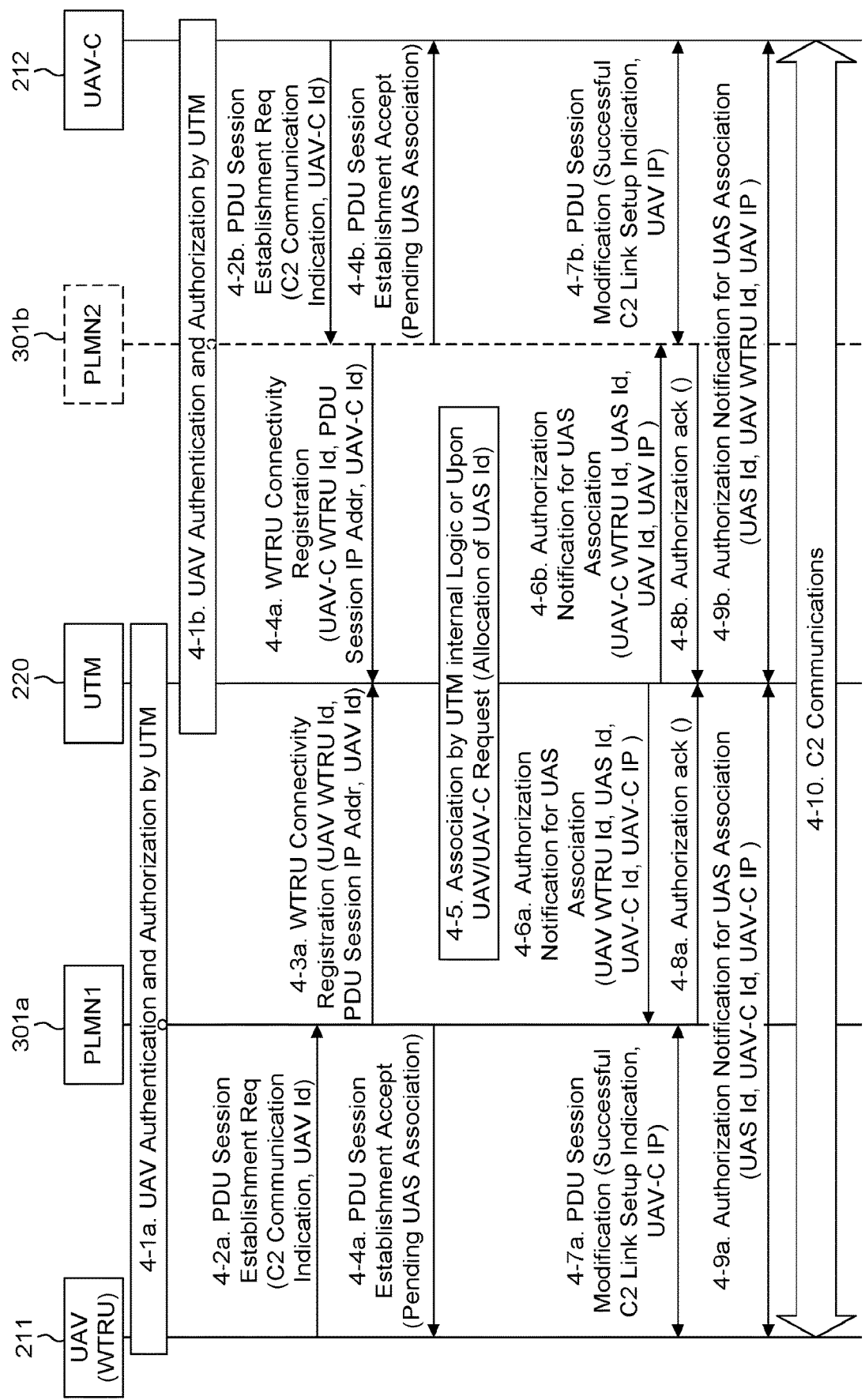
FIG. 4 is a diagram illustrating a representative procedure for C2 Communication Link with UAV-C Setup, for example using pre-established network connectivity.

FIG. 4 is a diagram illustrating a representative procedure for C2 Communication Link with UAV-C Setup, for example using pre-established network connectivity. Referring to FIG. 4, the representative procedure may include, at operations 4-1a and 4-1b, a UAV/UAV-C performing a network-assisted authentication and/or authorization by a UTM procedure as described herein. At operation 4-2a, the WTRU/UAV 211 may trigger an establishment of a PDU Session/PDN Connection with the serving PLMN 301a (e.g., the PLMN1) of the WTRU/UAV, for example to establish C2 communications. For example, the WTRU/UAV 211 may send to the serving PLMN 301a of the WTRU/UAV, a PDU Session Establishment Request message including any of: (1) an indication (e.g., a C2 communications indication); and/or (2) a UAV id, among others. At operation 4-2b, the UAV-C 212 may perform the same or a similar procedure with the PLMN 301b (e.g., PLMN2, if any) of the UAV-C 212. At operation 4-3a, the PLMN1 301a may register the PDU Session IP address with the UTM 220. The PLMN1 301a may send a message that may include any of: the UAV WTRU id, the PDU Session IP Address, the UAV id, and/or the UAV current location, among others. The message may be sent after the operation 4-2a (e.g., after the PDU Session IP Address is allocated over the User Plane). At operation 4-3b, the PLMN2 301b (if any) may perform the same or a similar procedure (e.g., may send a UAV-C WTRU id instead of the UAV WTRU id and/or a UAV-C id instead of the UAV id). At operation 4-4a, the PLMN1 301a may send to the WTRU/UAV 211, a PDU Session Establishment Accept message that may include a pending indication (e.g., a pending UAS association indication). At operation 4-4b, the PLMN 2 301b (if any) may perform the same or a similar procedure with the UAV-C 212.

At operation 4-5, the UTM 220 may perform the authorization for the UAS association and/or may allocate a new UAS id based on internal logic and/or based on a UAV-C/UAV request as described herein. At operation 4-6a, the UTM 220 may send to the PLMN1 301a, a message, for example for authorizing C2 communications. The message may include any of: (1) a UAV WTRU id; (2) a UAS id, for example to identify the authorized UAS association; (3) the UAV-C IP address; and/or (4) a UAV-C id. At operation 4-6b, the UTM 220 may send to the PLMN2 301b (if any), a message that may include any of: (1) the UAV-C WTRU id, (2) the UAS id, for example to identify the authorized UAS association, (3) the UAV IP address, and/or (4) a UAV id.

At operations 4-7a and 4-7b, the PLMN1/PLMN2 301 may trigger a modification of the PDU Session/PDN Connection established at operations 4-2a and 4-2b. A modification command may include any of: (1) a success indication (e.g., a successful C2 communication link setup indication); (2) a UAS id; (3) a peer UAV-C IP address; (4) a UAV-C id, and/or (5) a peer UAV IP address, among others. The PLMN1/PLMN2 301 may modify the data forwarding rules in the UP gateways or functions, for example to ensure authorized C2 traffic may be or will be routed to/from the peer device of the PLMN1/PLMN2 301.

At operations 4-8a and 4-8b, the PLMN1/PLMN2 301 may send a message to the UTM 220 in response to and/or after the message in operations 4-6a and 4-6b, to acknowledge those messages. At operation 4-9a, the UTM 220 may send message to the WTRU/UAV 211 that may include any of: (1) a UAS id; (2) a UAV-C id; and/or (3) a UAV-C IP/MAC address, for example to authorize C2 communications, among others. At operation 4-9b, the UTM 220 may send the same or a similar notification message to the UAV-C 212 that may include any of: (1) a UAS id, (2) a UAV WTRU id, and/or (3) a UAV IP/MAC address, among others. At operation 4-10, the UAV 211 and the UAV-C 212 may exchange C2 traffic.

Representative Procedures for C2 Communication Link Update (e.g., with a Change of UAV-C)

Figure 5:
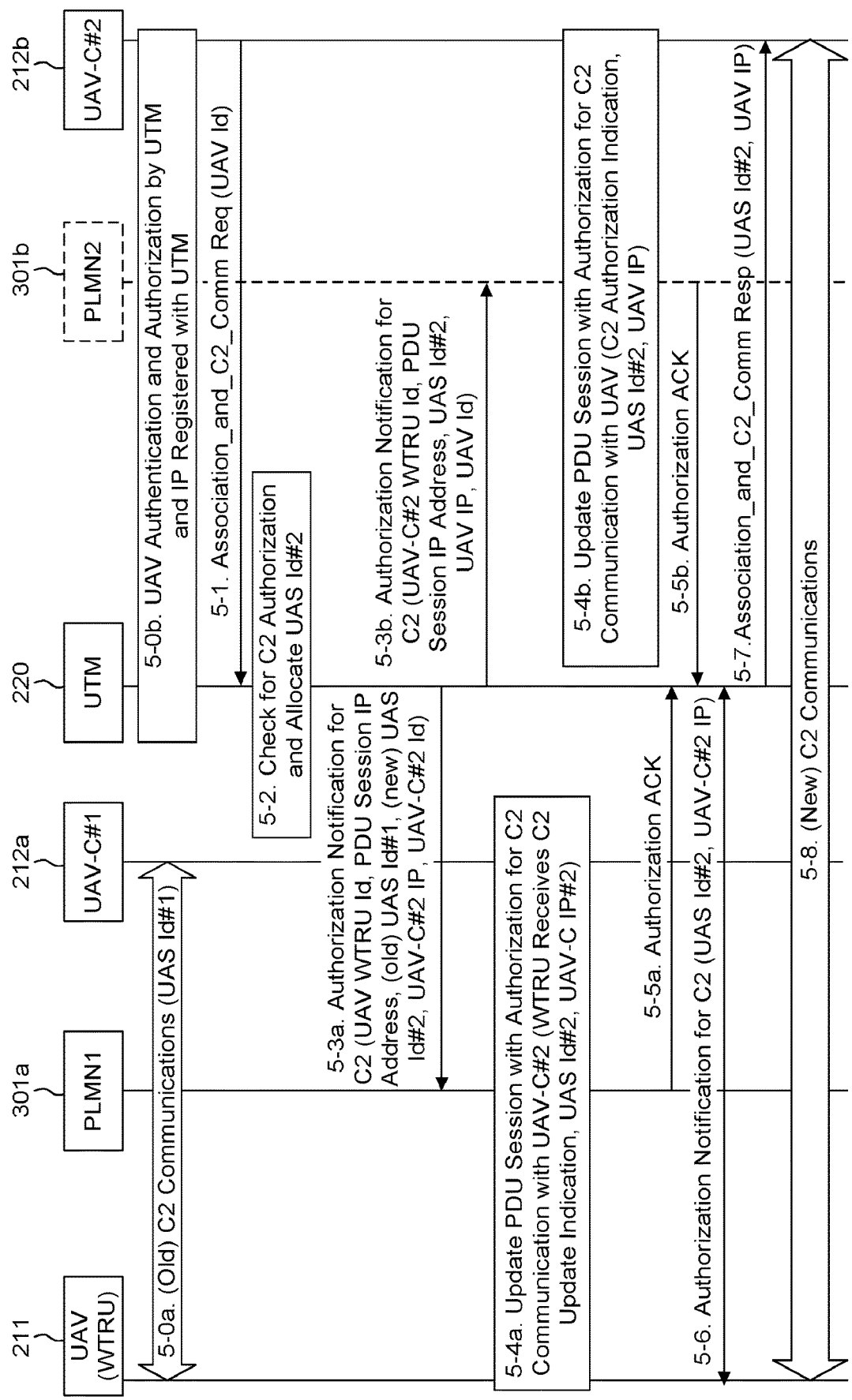
FIG. 5 is a diagram illustrating a procedure for C2 Communication Link Update, for example triggered by a change of UAV-C.

FIG. 5 is a diagram illustrating a procedure for the C2 Communication Link Update triggered by a change of UAV-C 212. Referring to FIG. 5, the representative procedure may include, at operations 5-0a and 5-0b, the WTRU/UAV 211 exchanging C2 traffic with a first UAV-C 212a (e.g., UAV-C #1) over a network connection. The pair UAV, UAV-C #1 may be identified as UAS id #1. A second UAV-C 212b (e.g., the UAV-C #2) may have performed authentication and/or authorization by a UTM procedure (for example may be assisted by a PLMN2 301b) as described herein. At operation 5-1, the second UAV-C 212b may send to the UTM 220, a request message for association with the WTRU/UAV, for example to establish C2 communications (e.g., due to emergency take over). The request message may include a target UAV id.

At operation 5-2, the UTM 220 may check that the UAV-C 212b (e.g., the UAV-C #2) is authorized to take control of the UAV 211 identified by the UAV id (e.g., the UAV-C operated by Law Enforcement officer or otherwise). The UTM 220 may allocate a new UAS id #2 associating the UAV 211 and the UAV-C #2 212b, upon or after successful authorization.

At operation 5-3a, the UTM 220 may send to a first PLMN 301a (e.g., the PLMN1), a message that may authorize C2 communications and may include any of: (1) a UAV WTRU id; (2) an old UAS id #1; (3) a new UAS id #2; (4) a PDU Session IP; (5) a UAV-C #2 IP/MAC address; and/or (6) a UAV-C #2 id, among others. At operation 5-3b, the UTM 220 may send the same or a similar notification message to a second PLMN 301b (e.g., PLMN2) (if any) that may include any of: (1) a UAV-C #2 WTRU id; (2) a UAS id #2; (3) a PDU Session IP; (4) a UAV IP/MAC address; and/or (5) a UAV id, among others. At operation 5-4a, the PLMN1 301a may trigger a modification of the PDU Session/PDN Connection used for C2 communications with the UAV-C #1 212a (e.g., established at operations 5-0a and 5-0b). The WTRU/UAV 211 may receive any of: (1) a success indication (e.g., a successful C2 communication update indication); (2) a UAV-C #2 IP/MAC address; and/or (3) a UAS id #2 from the first PLMN 301a (e.g., the PLMN1) during the procedure (e.g., in a PDU Session Command message). At operation 5-4b, the second PLMN 301b (e.g., PLMN2) (if any) may perform the same or a similar procedure with the UAV-C #2 212b. The WTRU (e.g., the WTRU associated with the UAV-C #2 212b) may receive any of: (1) the success indication (e.g., the successful C2 communication authorization indication); (2) the UAV IP/MAC address; and/or (3) the UAS id #2 from the second PLMN 301b (e.g., PLMN2) during the procedure. At operations 5-5a and 5-5b, the PLMN1/PLMN2 301 may send a message to the UTM 220 in response to and/or after the message in operations 5-3a and 5-3b, to acknowledge those messages.

At operation 5-6, the UTM 220 may send, to the UAV, a message that may authorize C2 communications and/or may include any of: (1) the UAS id #2; and/or (2) the UAV-C #2 IP/MAC address, among others. At operation 5-7, the UTM 220 may send, to the UAV-C 212b, a message that may authorize C2 communications and/or may include any of: (1) the UAS id #2; and/or (2) the UAV IP/MAC address (e.g., in response to or after the message in operation 5-1). At operation 5-8, the WTRU/UAV 211 may engage in C2 communications with a new peer UAV-C #2 212b over a network connection (e.g., using the new UAV-C #2 IP).

Figure 6:
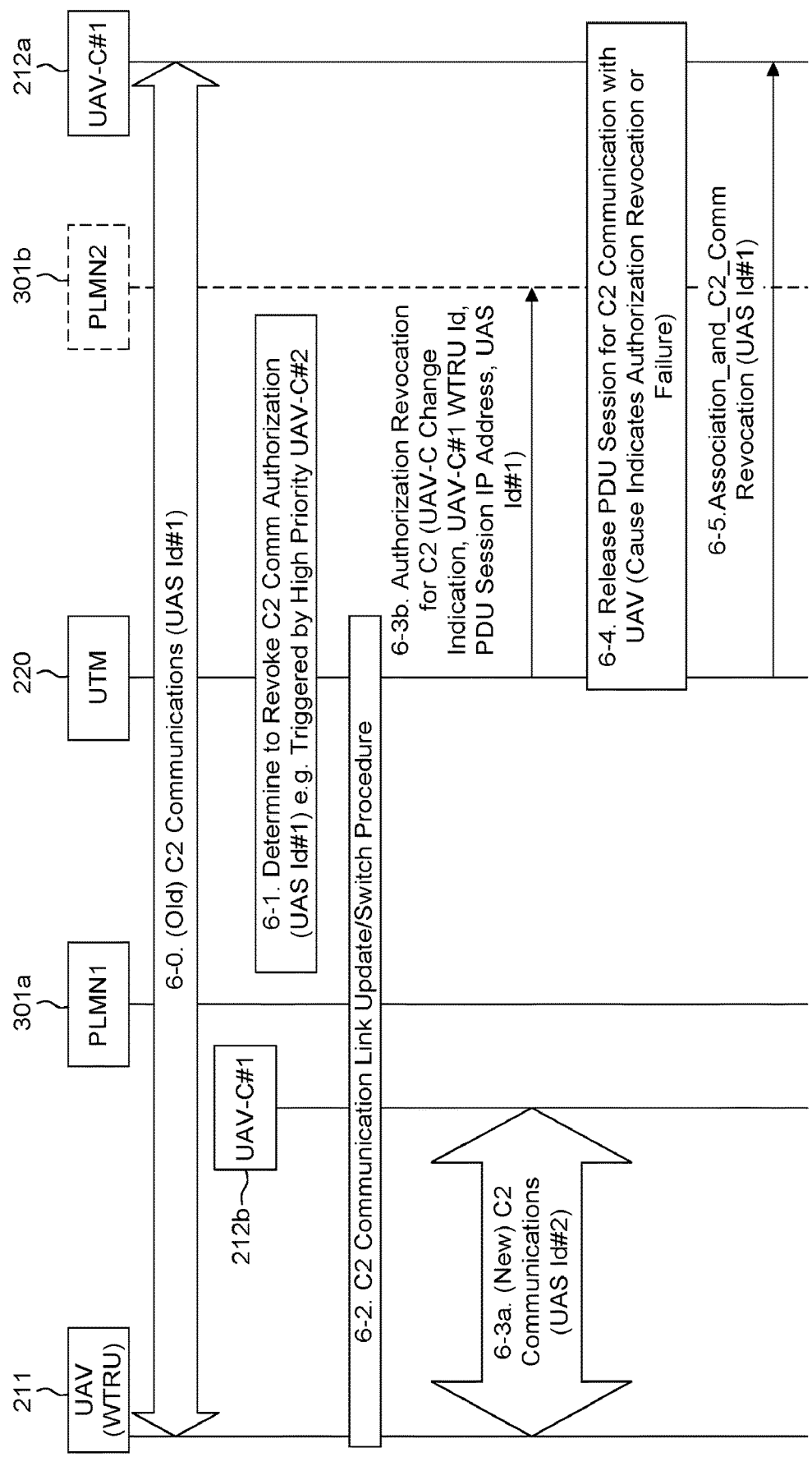
FIG. 6 is a diagram illustrating a representative procedure for C2 Communication Authorization revocation for a first UAV-C in the context of a change of UAV-C (e.g., via a takeover by a high priority second UAV-C)

FIG. 6 is a diagram illustrating a representative procedure for C2 Communication Authorization revocation for a first UAV-C 212a (e.g., the UAV-C #1) in the context of a change of UAV-C (e.g., via a takeover by a high priority, second UAV-C 212b (e.g., the UAV-C #2). Referring to FIG. 6, the procedure may include, at operation 6-0, the WTRU/UAV 211 exchanging C2 traffic with the first UAV-C 212a over a network connection. The pair of the UAV 211 and the first UAV-C#1 212a may be identified by a UAS id (e.g., UAS id #1). At operation 6-1, the UTM 220 may determine that the second UAV-C #2 212b is authorized to take over the control of the UAV 211 identified by the UAV id (e.g., the UAV-C operated by Law Enforcement officer or otherwise). The UTM 220 may allocate a new UAS id #2 associating the UAV 211 and the second UAV-C #2 212b, upon or after successful authorization.

At operation 6-2, the UAV, the UTM 220, the PLMN1 301a and the UAV-C #2 212b (that may or may not be served by a PLMN) may perform a C2 Communication Link Update/Switch Procedure as described herein. At operation 6-3a, the WTRU/UAV 211 may engage in C2 communications with a new peer UAV-C #2 212b. At operation 6-3b, the UTM 220 may send, to the UAV-C #1 serving PLMN 301b (if any) (e.g., the PLMN #2), a message that may revoke an authorization for C2 communications and/or may include any of: (1) the UAS id #1; (2) the UAV-C#1 WTRU id; (3) a PDU session IP address; and/or (4) a change indication (e.g., a UAV-C change indication). At operation 6-4, the PLMN2 301b may release the PDU Session providing a cause of authorization revocation and/or a failure for the C2 communications. In certain representative embodiments, the PLMN2 301b may trigger a modification of the PDU Session/PDN Connection used for C2 communications with the UAV 211 (e.g., established at operation 6-0). The WTRU (e.g., associated with the UAV-C #1 212a) may receive a release indication (e.g., a C2 communication release indication) from the PLMN2 301b during the procedure (e.g., in a PDU Session Modification Command message). The WTRU may delete/remove the stored information (e.g., any stored, authorized C2-related information, for example the UAS id, the UAV address and/or the UAV id, among others). At operation 6-5, the UTM 220 may send, to the first UAV-C 212a (e.g., UAV-C #1), a message that may include the UAS id #1, for example to revoke the authorization for C2 communications with the UAV.

Representative Procedures for C2 Communication Link Switch (e.g., with a Change of UAV-C)

Figure 7:
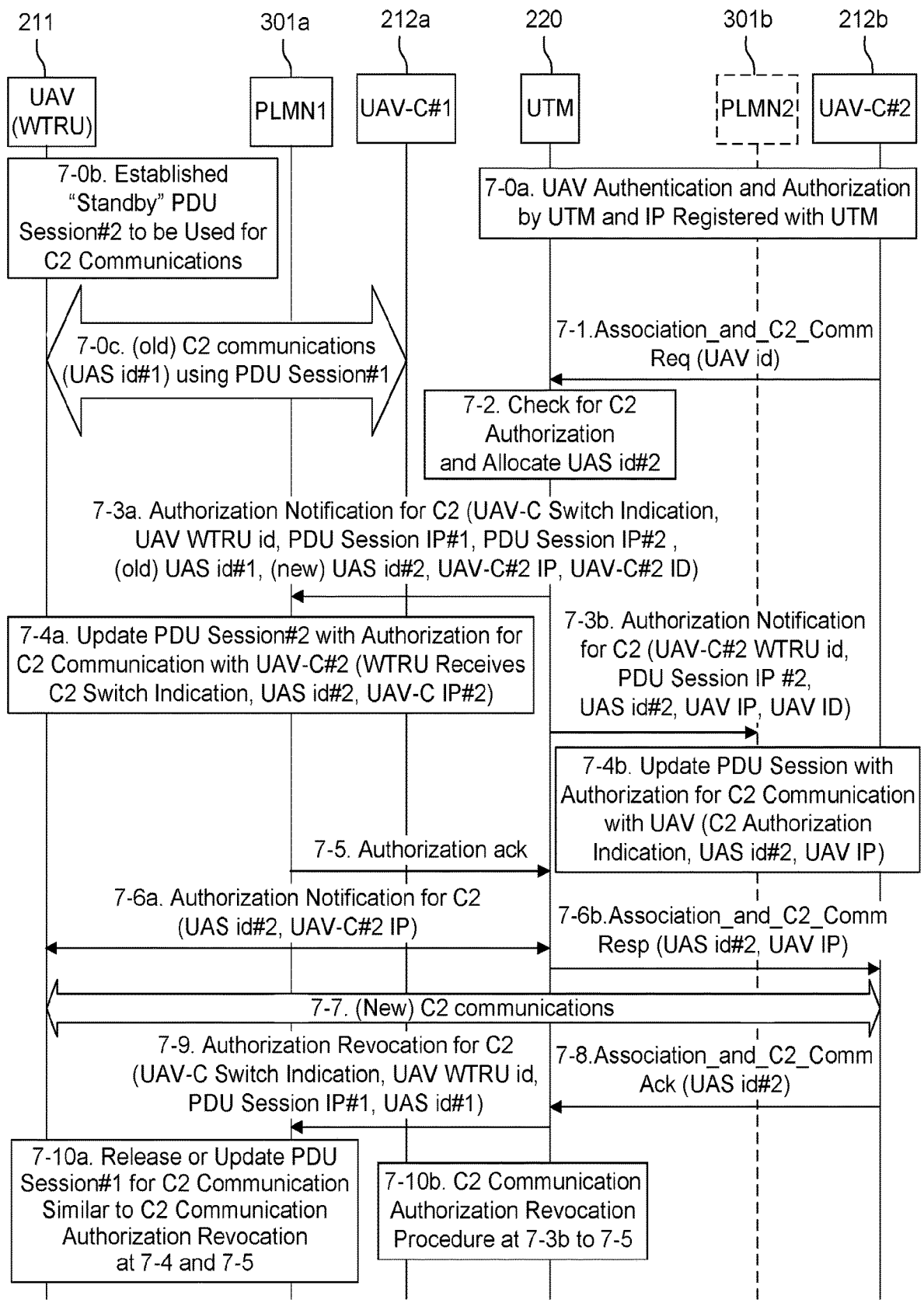
FIG. 7 is a diagram illustrating a representative procedure for C2 Communication Link Switch, for example triggered by a change of UAV-C.

FIG. 7 is a diagram illustrating a representative procedure for C2 Communication Link Switch, for example triggered by a change of a UAV-C 212. At operation 7-0b, the WTRU/UAV 211 may establish or may have established a first PDU Session (e.g., the PDU Session #1) and a second and/or standby PDU Session (e.g., the PDU Session #2) to be used for C2 communications. In certain examples, if the PDU Session #1 was established using Session and Service Continuity (SSC) Mode 3, the WTRU/UAV 211 may or may not establish the second/standby PDU Session #2, at that time. The WTRU/UAV 211 may determine to establish the second/standby PDU Session or establish the initial PDU Session using SSC Mode 3, for example to enable "make-before-break" switching of C2 communications with another UAV-C 212. This determination may be performed based on UAV application requirements, established on a per UAV, per flight and/or mission type basis. Such application requirements may be communicated to the network and the UAV 211 by the USS/UTM 220 during earlier UAV authentication and authorization or C2 pairing/communication authorization operations. At operation 7-0c, the WTRU/UAV 211 may be exchanging C2 traffic with a first UAV-C 212a (e.g., UAV-C #1) over a network connection (e.g., the first PDU Session #1). The pair of the UAV 211 and the first UAV-C#1 212a may be identified by a UAS id (e.g., the UAS id #1). At operation 7-0a, a second UAV-C 212b (e.g., UAV-C #2) may have performed authentication and/or authorization by a UTM procedure (for example assisted by a second PLMN 301b (e.g., the PLMN #2)) as described herein.

Referring to FIG. 7, the representative procedure may include, at operation 7-1, the UTM 220 receiving from the second UAV-C 212b (e.g., the UAV-C #2) a request message for an association with the UAV, for example to establish C2 communications. The request message may include the identifier of the target UAV 211 (e.g., a UAV id). At operation 7-2, the UTM 220 may check that the second UAV-C 212b is authorized to be associated with or to control the UAV 211 identified by UAV id. The UTM 220 may allocate a new UAS id #2 associating the UAV 211 and the second UAV-C #2 212b, upon or after successful authorization. At operation 7-3a, the UTM 220 may send an authorization notification message to the serving PLMN 301a of the UAV. The authorization notification message may include any of: (1) an indication that the UAV-C is to be switched; (2) the UAV WTRU id; (3) the old UAS id #1; (4) the new UAS id #2; (5) the IP of the PDU session #1; (6) the IP of the PDU session #2; (7) the UAV-C #2 id and/or (8) the IP of the second UAV-C #2, among others. At operation 7-3b, if the second UAV-C #2 212b is connected through a PLMN 301b (e.g., the PLMN2), the UTM 220 may send, to the serving PLMN 301b of the second UAV-C #2 212b, the same or a similar notification message that may include any of: (1) a UAV-C WTRU id; (2) a PDU Session #2 of the UAV; (3) a UAS id #2; (4) the IP/MAC address of the UAV; and/or (5) the UAV id, among others.

At operation 7-4a, the first PLMN 301a (e.g., the PLMN1) may initiate a modification of the PDU Session/PDN Connection #2. The modification command may include any of: (1) a switch indication (e.g., a C2 switch indication); (2) a UAS id #2; and/or (3) a UAV-C #2 IP/MAC address, among others. At operation 7-4b, the second PLMN 301b (e.g., the PLMN2) may modify the PDU session of the UAV-C #2 212b for C2 communications. The modification command may include any of: (1) an authorization indication (e.g., a C2 authorization indication); (2) a UAS id #2; and/or (3) a UAV IP/MAC address, among others. If the PDU Session #2 is not available yet, and the PDU Session #1 supports SSC Mode 3, the PLMN1 301a may initiate a PDU Session Modification procedure for the PDU Session #1 to trigger the establishment of the second PDU Session #2. The PLMN1 301a may specify a remaining lifetime of the PDU Session #1. At operation 7-5, the PLMN1 301a may acknowledge the authorization notification in operation 7-3a. At operation 7-6a, the UTM 220 may send a message to the UAV 211 that may include any of: (1) a UAS id #2; and/or (2) a UAV-C #2 IP/MAC address authorizing C2 communications. The UTM 220 may indicate that the UAV 211 may, should or is to start using the IP/MAC address of the PDU Session #2 for C2 communications. At operation 7-6b, the UTM 220 may send the same of a similar notification message to the second UAV-C #2 212b that may include any of: (1) a UAS id #2; and/or (2) a UAV IP/MAC address, among others.

At operation 7-7, the UAV 211 and the UAV-C #2 212b may exchange C2 traffic over the new connection. At operation 7-8, the second UAV-C #2 212b may acknowledge the authorization notification in operation 7-6b. The acknowledge message may include the UAS id #2. At operation 7-9, the UTM 220 may send an authorization revocation message to the PLMN1 301a. The authorization revocation message may include any of: (1) a switch indication (e.g., a UAV-C switch indication); (2) the UAV WTRU id; (3) the IP of the PDU session #1; and/or (4) the UAS id #1, among others. At operation 7-10a, the PLMN1 301a may release or update the PDU Session #1. If the PLMN1 301a has specified a remaining lifetime of the PDU Session #1, the UAV 211 may release the PDU Session #1 after the remaining lifetime has expired and the PLMN1 301a may not (e.g., need to) explicitly release the UAV. At operation 7-10b, the UTM 220 may revoke the authorization for UAV-C #1 212a, for example as described in FIG. 6.

Representative Procedures for C2 Communication Link Update (e.g., with Change of UAV/UAV-C IP Address)

In certain representative embodiments, procedures, apparatus and systems may be implemented for C2 Communication Link Update triggered by a change of a UAV IP address/UAV-C IP address.

Representative Procedures for Network-Assisted UAV-C Change of IP Address

The allocation of a new UPF for a WTRU/UAV 211 which has an existing PDU Session, (e.g., that is moving), may be handled differently depending on the PDU Session type. In a first example, the existing PDU session may be terminated and a new PDU Session may be established with a newly selected UPF. In another example, the existing PDU Session may be updated with a new IP/MAC address, which may be associated with the new UPF.

Figure 8:
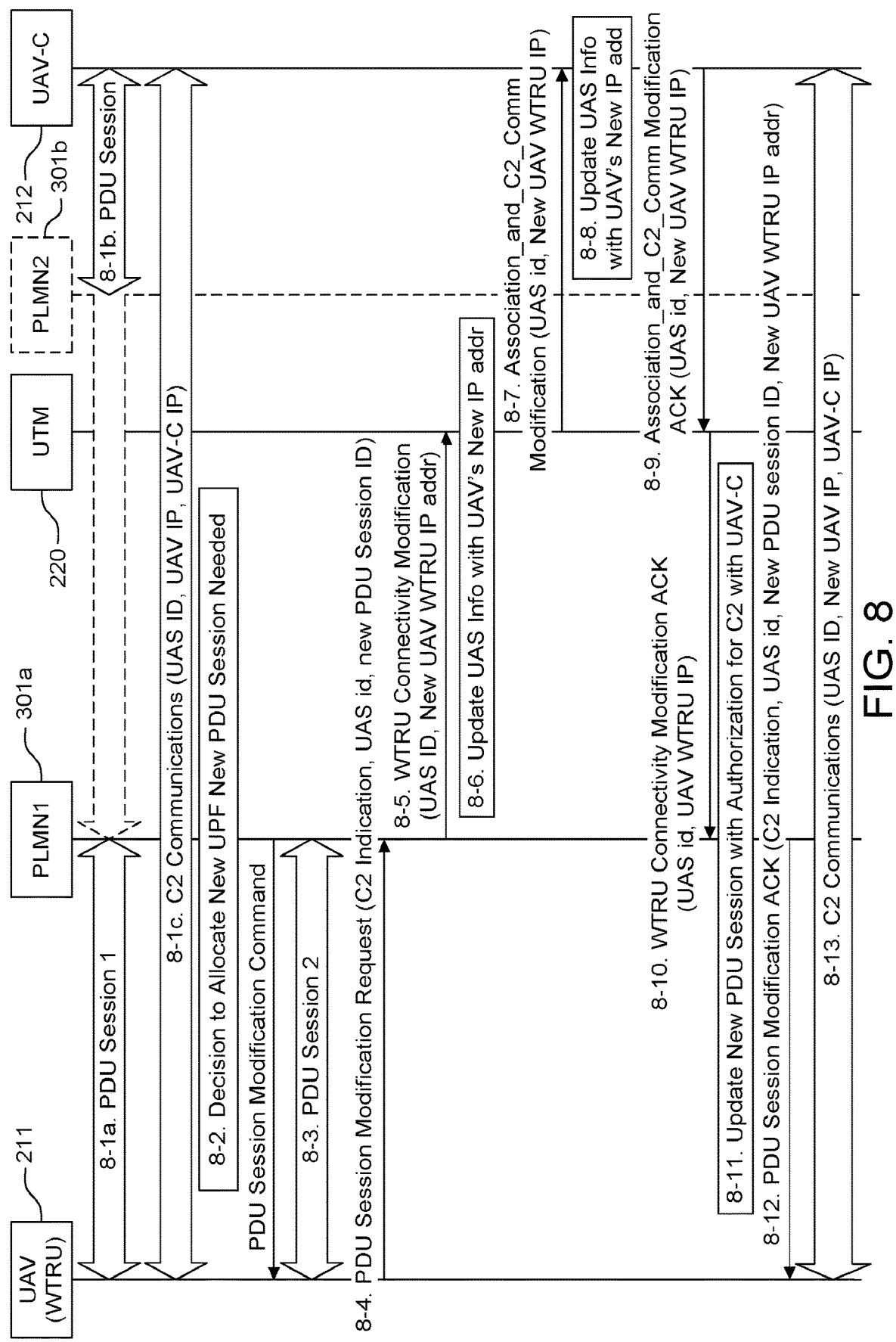
FIG. 8 is a diagram illustrating a representative procedure for C2 Communication updated with a new IP address (e.g., to establish a new PDU session)

FIG. 8 is a diagram illustrating a representative procedure for C2 communications updated with a new IP address (e.g., to establish a new PDU session). Referring to FIG. 8, the representative procedure may include, at operation 8-1a, the UAV 211 having a PDU Session established with the network and, at operation 8-1b, the UAV-C 212 having a PDU Session established with the same PLMN or a different PLMN. At operation 8-1c, the UAV 211 may be exchanging C2 traffic with a UAV-C 212 over a network connection, (e.g., a C2 communication link). The UAV 211 and the UAV-C 212 may each use an IP address of their peer for C2 communications. At operation 8-2, the network (e.g., a network entity) may determine that the serving UPF and/or the SMF may (e.g., need to) be changed (e.g., because of WTRU/UAV mobility). The network (e.g., the network entity) may inform the WTRU/UAV 211 by sending a PDU Session Modification Command message. At operation 8-3, the UAV 211 may establish a new PDU Session, as indicated by the network, and may obtain a new IP address/prefix associated with this new UPF. At operation 8-4, the UAV 211 may send a PDU Session Modification request to the network including any of: (1) an indication that the request is for C2 communication; (2) a UAS id; and/or (3) a new PDU Session ID, among others.

At operation 8-5, the network (e.g., a network entity) may send a connectivity modification indication to the UTM 220 of the new IP address of the UAV. At operation 8-6, the UTM 220 may keep track of and/or store the information locally. At operation 8-7, the UTM 220 may inform the UAV-C 212 associated with the UAS id of the new IP address of the UAV. At operation 8-8, the UAV-C 212 may update the UAS information with the new IP address of the UAV. At operation 8-9, the UAV-C 212 may reply to the UTM 220 that the changes have been done successfully. The reply message may include any of: (1) the UAS id; and/or (2) the new IP address of the UAV WTRU, among others.

At operation 8-10, the UTM 220 may send (e.g., send back) to the network (e.g., the network entity) an acknowledgement (ACK) for the connectivity modification and/or authorization to use the new IP address of the UAV 211 for C2 communications. The acknowledgement message may include any of: (1) the UAS id; and/or (2) the new IP address of the UAV WTRU, among others. At operation 8-11, the network may update the new PDU session with the authorization for C2 communications. At operation 8-12, the network may send a PDU Session Modification ACK to the UAV, authorizing the usage of the new PDU session for C2 communications. The acknowledgement message may include any of: (1) a communication indication (e.g., C2 indication); (2) the UAS id; (3) the new PDU session id, and/or (4) the new IP address of the UAV WTRU, among others. At operation 8-13, the UAV 211 and the UAV-C 212 may use the new IP address of the UAV 211 for C2 communications.

Figure 9:
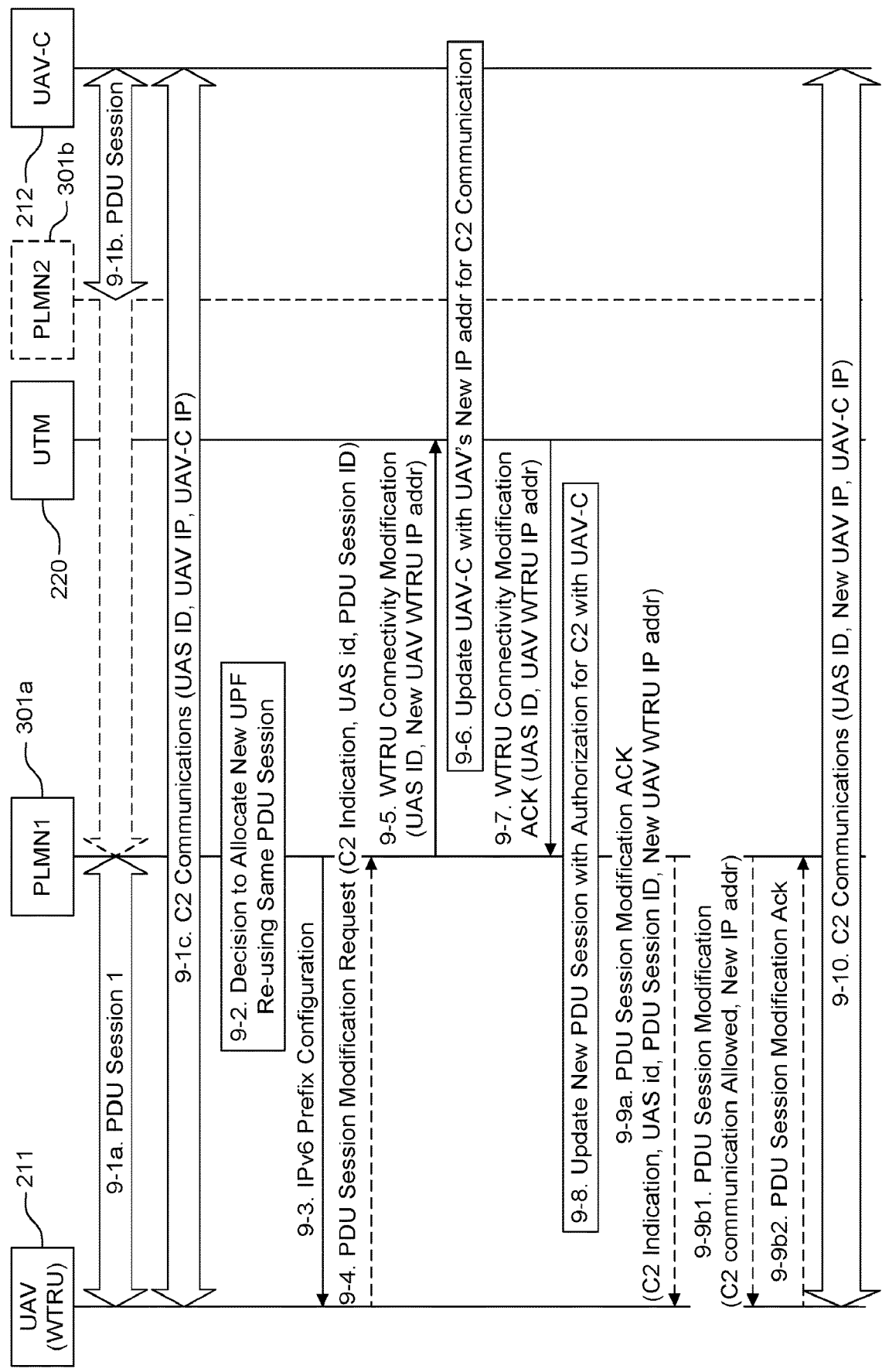
FIG. 9 is a diagram illustrating a representative procedure for C2 Communication updated with a new IP address (e.g., using an existing PDU session, which may be updated)

FIG. 9. is a diagram illustrating a representative procedure for C2 communications updated with a new IP address (e.g., using an existing PDU session, which may be updated). Referring to FIG. 9, the representative procedure may include, at operation 9-1a, the WTRU/UAV 211 having a PDU Session established with the network and, at operation 9-1b, the UAV-C 212 having a PDU Session established with the same PLMN or a different PLMN. At operation 9-1c, the UAV 211 may be exchanging C2 traffic with a UAV-C 212 over a network connection, (e.g., a C2 communication link). The WTRU/UAV 211 and the UAV-C 212 may each use an IP address of their peer for C2 communications. At operation 9-2, the network (e.g., a network entity) may determine that the serving UPF and/or the SMF may (e.g., need to) be changed (e.g., because of WTRU/UAV mobility). At operation 9-3, the network may send to the UAV 211 a new prefix (e.g., a new IPv6 prefix). At operation 9-4, the WTRU/UAV 211 may send a PDU Session Modification request to the network including any of: (1) an indication that the request is for C2 communication; (2) a UAS id; and/or (3) the new PDU Session ID, among others.

At operation 9-5, the network (e.g., a network entity), on or after the reception of the message from the UAV 211 or autonomously, may send a connectivity modification indication to the UTM 220 of the new IP address of the UAV 211 including any of: (1) the UAS id; and/or (2) the new IP address of the UAV, among others. At operation 9-6, the UTM 220 may inform the UAV-C 212 associated with the UAS id/C2 communications of the new IP address of the UAV 211 and/or may receive an ACK from the UAV-C 212 (for example as shown in FIG. 8, operations 8-7 to 8-10). At operation 9-7, the UTM 220 may send (e.g., send back), to the network, an ACK for the connectivity modification and/or authorization to use the new IP address of the UAV 211 for C2 communications. The ACK may include any of: (1) the UAS id; and/or (2) the IP address of the UAV, among others. At operation 9-8, the network (e.g., a network entity) may update the new PDU session with the authorization for C2 communications.

At operation 9-8, the network (e.g., a network entity) may authorize the usage of the new PDU session for C2 communications. For example, at operation 9-9a, the network may send a PDU Session Modification ACK to the UAV, if operation 9-4 has been done, (e.g., if the WTRU/UAV 211 has sent a PDU Session Modification request to the network). The ACK may include any of: (1) a communication indication (e.g., C2 indication); (2) the UAS id; (3) the new PDU session id, and/or (4) the new IP address of the UAV WTRU, among others. In certain or alternative embodiments, at operation 9-9b, —the network may send a PDU Session Modification indication to the WTRU/UAV 211 indicating that C2 communications using the new IP address of the UAV 211 is allowed and, at operation 9-9c, the WTRU/UAV 211 may acknowledge the PDU Session modification indication. At operation 9-10, the UAV 211 and UAV-C 212 may use the new IP address of the UAV 211 for C2 communications.

Representative Procedures for UTM Assisted/Authorized UAV (e.g., with a Change of IP Address)

Any of the examples/embodiments discussed herein may be used to establish a new PDU session or to modify an existing PDU session. In certain representative embodiments, procedures, apparatus and/or systems may be implemented to enable the UAV 211 to inform the peer UAV-C 212 of the new IP address of the UAV 211 or the UTM 220 to inform the UAV-C of the new IP address of the UAV.

Figure 10:
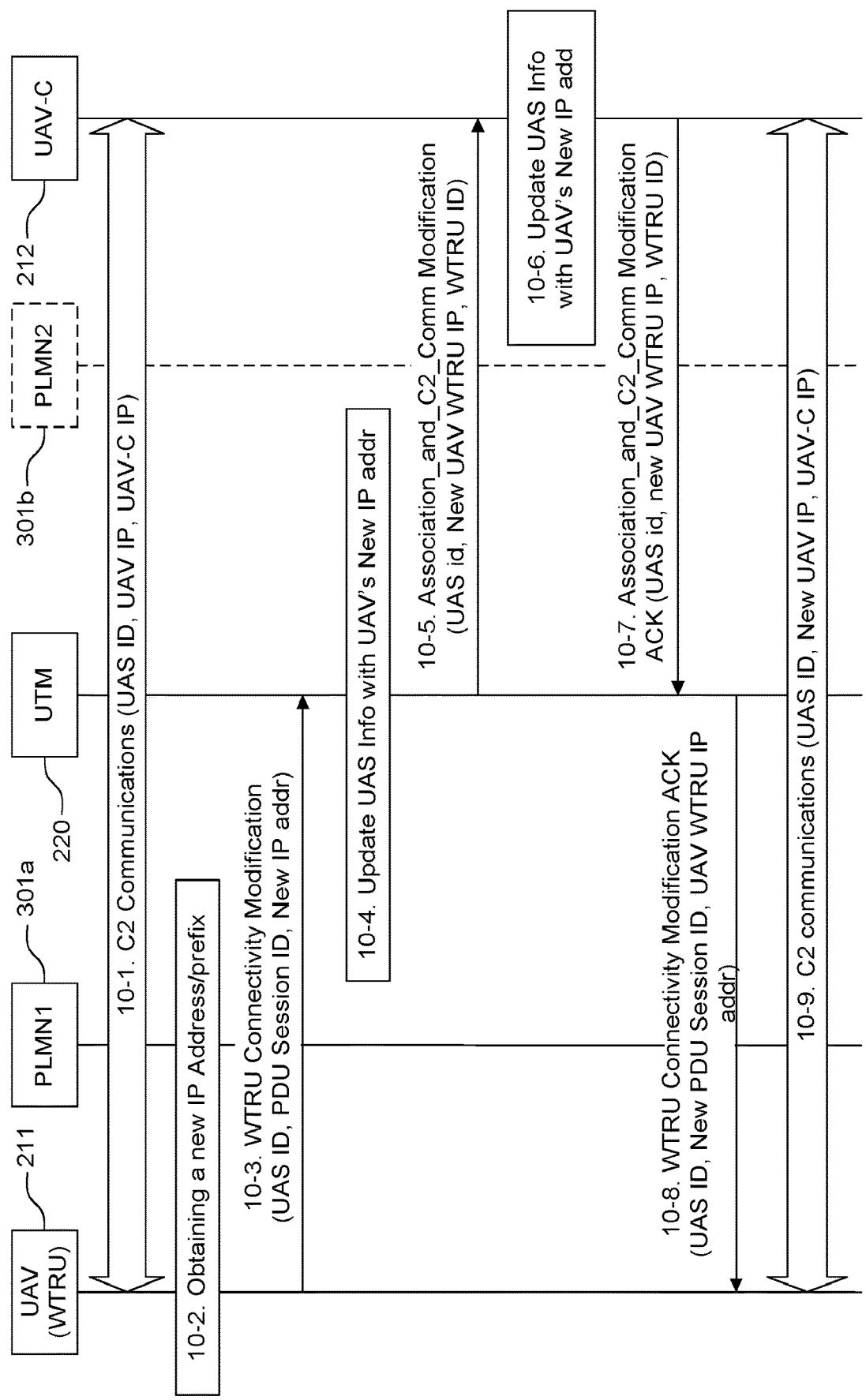
FIG. 10 is a diagram illustrating a representative procedure for C2 Communication updated with a new IP address (e.g., in which the UTM may inform the UAV-C)

FIG. 10 is a diagram illustrating a representative procedure for C2 communication updated with a new IP address (e.g., in which the UTM 220 may inform the UAV-C 212). Referring to FIG. 10, the representative procedure may include, at operation 10-1, the WTRU/UAV 211 exchanging C2 traffic with a UAV-C 212 over a network connection, (e.g., a C2 communication link). The UAV 211 and the UAV-C 212 may use the IP address of their peer for communication. At operation 10-2, the network (e.g., a network entity) may decide/determine to allocate another UPF to the UAV. The UAV 211 may obtain a new IP address associated with the new UPF. At operation 10-3, the UAV 211 may send a connectivity modification indication to the UTM 220 specifying the new IP address of the UAV. The UAV 211 may send to the UTM 220 a message that may include any of: a UAS id, a PDU Session IP Address, and/or the new IP address of the UAV, among others. At operation 10-4, the UTM 220 may keep track of this information, for example locally. At operation 10-5, the UTM 220 may inform the UAV-C 212 associated with the UAS id/C2 communications of the new IP address of the UAV. The UTM 220 may send to the UAV-C 212 a message that may include any of: the UAS id, the new IP address of the UAV, and/or the UAV WTRU id, among others. At operation 10-6, the UAV-C 212 may update the C2 communications with the new IP address of the UAV. At operation 10-7, the UAV-C 212 may reply to the UTM 220 that the changes have been done successfully. The UAV-C 212 may send to the UTM 220 a message that may include any of: the UAS id, the new IP address of the UAV, and/or the UAV WTRU id, among others. At operation 10-8, the UTM 220 may send (e.g., send back) to the UAV 211 an ACK for the connectivity modification and/or authorization to use the new IP address of the UAV 211 for C2 communications. The UTM 220 may send to the UAV 211 a message that may include any of: the UAS id, the new PDU Session IP Address, and/or the IP address of the UAV, among others. At operation 10-9, the UAV 211 and the UAV-C 212 may use the new IP address of the UAV 211 for C2 communications.

Figure 11:
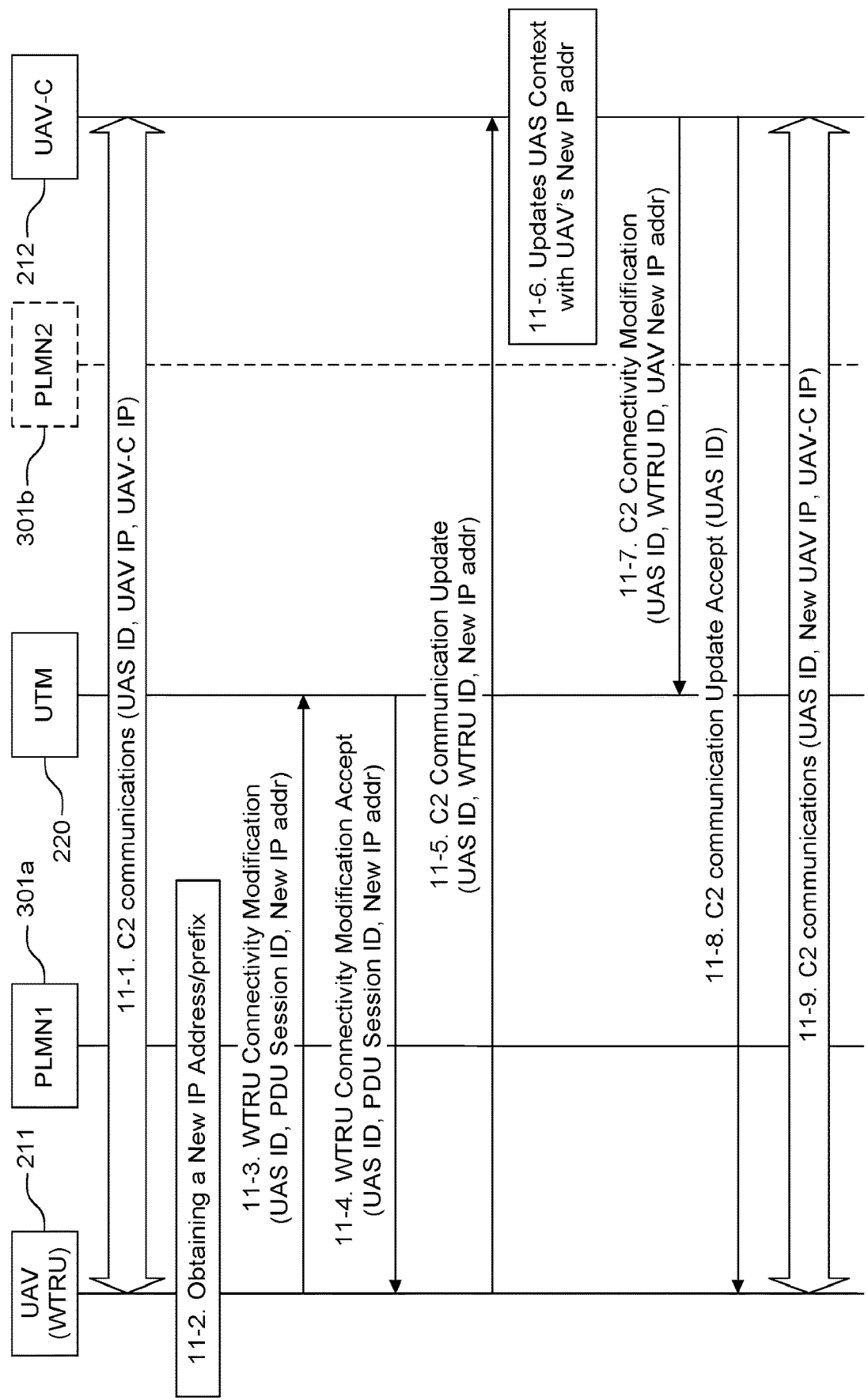
FIG. 11 is a diagram illustrating a representative procedure for C2 Communication updated with a new IP address (e.g., in which the UAV may inform the UAV-C)

FIG. 11 is a diagram illustrating a representative procedure for C2 communication updated with a new IP address (e.g., in which the UAV 211 may inform the UAV-C 212). Referring to FIG. 11, the representative procedure may include, at operation 11-1, the WTRU/UAV 211 exchanging C2 traffic with a UAV-C 212 over a network connection, (e.g., a C2 communication link). The UAV 211 and the UAV-C 212 may use the IP address of their peer for communication. At operation 11-2, the network (e.g., a network entity) may decide/determine to allocate another UPF to the UAV. The UAV 211 may obtain a new IP address associated with the new UPF. At operation 11-3, the UAV 211 may send a connectivity modification indication to the UTM 220 specifying the new IP address of the UAV. The UAV 211 may send to the UTM 220 a message that may include any of: a UAS id, a PDU Session IP Address, and/or the new IP address of the UAV, among others. At operation 11-4, the UTM 220 may send (e.g., send back) to the UAV 211 an ACK for the connectivity modification and/or authorization to use the new IP address of the UAV 211 for C2 communications. The UTM 220 may send to the UAV 211 an ACK message that may include any of: the UAS id, the PDU Session IP Address, and/or the new IP address of the UAV, among others. At operation 11-5, the UAV 211 may inform the UAV-C 212, using or over C2 communications, of the new IP address of the UAV. The UAV 211 may send to the UAV-C 212 a message that may include any of: the UAS id, the WTRU id, and/or the new IP address of the UAV, among others. At operation 11-6, the UAV-C 212 may update the C2 communications with the new IP address of the UAV. At operation 11-7, the UAV-C 212 may send a C2 communication modification indication to the UTM 220 specifying any of: (1) the WTRU/UAV id; (2) the UAS id; and/or (3) the new IP address of the UAV, among others. At operation 11-8, the UAV-C 212 may reply to the UAV 211 that C2 communications has been updated successfully, the UAV-C 212 may indicate the UAS id. At operation 11-9, the UAV 211 and the UAV-C 212 may use the new IP address of the UAV 211 for C2 communications.

Representative Procedures for C2 Communication Link with UTM Setup (e.g., with UTM Based Navigation)

Figure 12:
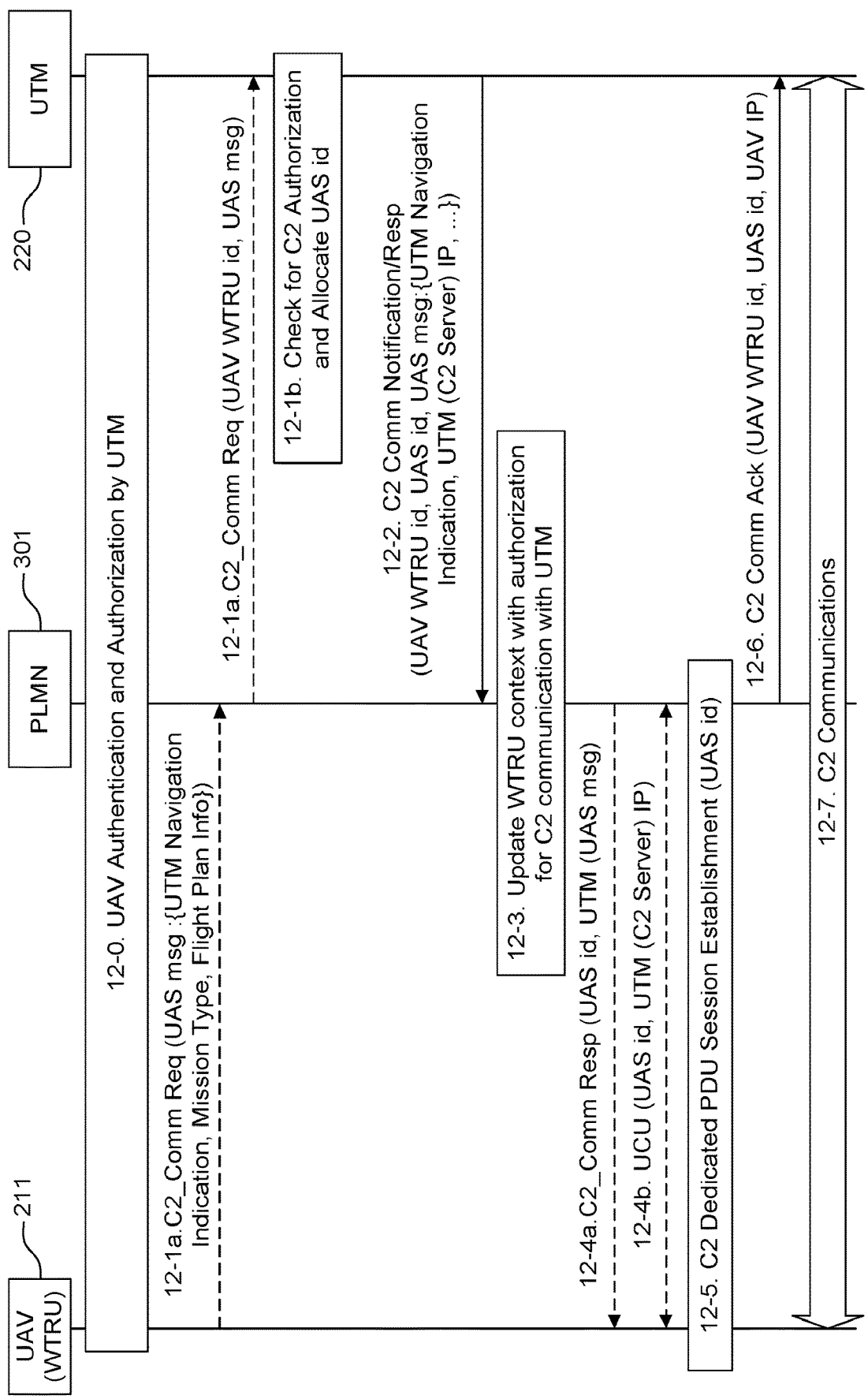
FIG. 12 is a diagram illustrating a representative procedure for C2 Communication Link with UTM Setup using on-demand network connectivity establishment.

FIG. 12 is a diagram illustrating a procedure for C2 Communication Link with UTM Setup using on-demand network connectivity establishment. Message exchange between the WTRU/UAV 211 and the UTM 220 is illustrated using CP transport. Referring to FIG. 12, the representative procedure may include, at operation 12-0, the WTRU/UAV 211 having performed a network-assisted UAV authentication and/or authorization by a UTM procedure.

The representative procedure may be triggered by: (1) at operation 12-1a, the WTRU/UAV 211 sending to or towards the UTM 220 a request message to establish C2 communications with the UTM 220 for UTM-based navigation (e.g., the C2 communication request message (e.g., a container in a NAS transport message) may include information about any of: (i) a UAV flight plan, and/or (ii) a mission type (e.g., reference to pre-authorized flight plan), among others) and the network (e.g., a network entity) may forward and/or may send the C2 communication request message to the UTM 220 (e.g., via a NEF or UCF), for example along with the UAV WTRU id; and (2) at operation 12-1b, the UTM 220 may check that the UAV 211 is authorized for UTM-based navigation based on the UAV 211 and the mission information (e.g., directly following a successful operation 12-0 and/or based on one or more other internal/external triggers). The UTM 220 may allocate a new UAS id upon or after successful authorization. At operation 12-2, the UTM 220 may send a message to the UAV serving PLMN 301a that may include any of: (1) the UAV WTRU id; (2) the UAS id identifying the authorized UAS session/mission; and/or (3) a UAS specific message (e.g., a container) that may include parameters for the mission, such as, for example: (i) the IP address for the C2 Server (e.g., may be the same or different than the UTM IP address used by the network); (ii) flight route information and/or (iii) flight route update information.

At operation 12-3, a Network Function (e.g., an AMF or an MME) in the serving PLMN 301a of the UAV 211 may update the WTRU/UAV context, for example to authorize the UAS session identified by the UAS id. At operation 12-4a, the network (e.g., a network entity) may send a message to the UAV 211 that may include any of: (1) the UAS id and/or (2) the UAS message container, among others. In certain representative embodiments, at operation 12-4b, the network (e.g., a network entity) may update the WTRU with that information using a UCU procedure (e.g., if the procedure was triggered by the UTM 220 in operation 12-1). At operation 12-5, the WTRU/UAV 211 may establish a PDU Session/PDN Connection with the serving PLMN 301a of the UAV 211 (e.g., the AMF/SMF) and may provide the UAS id. The network (e.g., the SMF or another network entity) may configure the data forwarding rules in the UP gateways and/or functions, for example to ensure authorized C2 traffic may be or is to be routed to/from the C2 server IP address. At operation 12-6, the network (e.g., a network entity) may send to the UTM 220, a response message (e.g., in response to or after the message in operation 12-2) that may include any of: (1) a UAV WTRU id; (2) a UAS id; and/or (3) a UAV IP/MAC address, among others. The response message may confirm to the UTM 220 that the UAV 211 is reachable for C2 commands and/or is ready to fly. At operation 12-7, the UAV 211 and UTM 220 may exchange C2 traffic.

Figure 13:
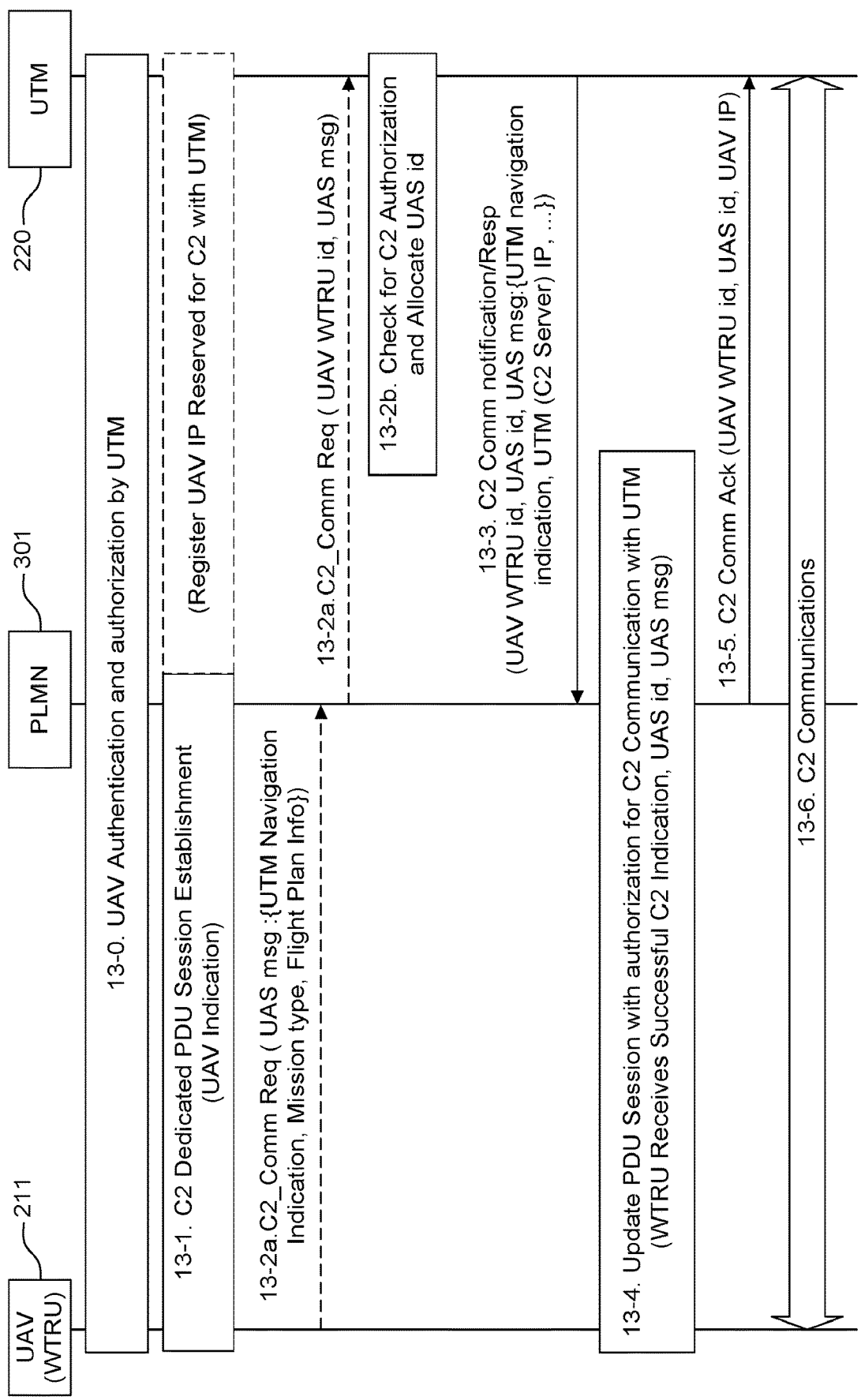
FIG. 13 is a diagram illustrating a representative procedure for C2 Communication Link with UTM Setup using pre-established network connectivity establishment.

FIG. 13 is a diagram illustrating a procedure for C2 Communication Link with UTM Setup using pre-established network connectivity establishment. Message exchange between the WTRU/UAV 211 and the UTM 220 is illustrated using CP transport. Referring to FIG. 13, the representative procedure may include, at operation 13-0, the WTRU/UAV 211 having performed a network-assisted UAV authentication and/or authorization by a UTM procedure.

At operation 13-1, the WTRU/UAV 211 may establish a second and/or standby PDU Session/PDN connection, for example to establish C2 communications with the UTM 220 as described herein. The network may register/publish the PDU Session/PDN Connection IP address with the UTM 220.

The representative procedure may be triggered by: (1) at operation 13-2a, the WTRU/UAV 211 sending to or towards the UTM 220 a request message to establish C2 communications with the UTM 220 for UTM-based navigation (e.g., the C2 communication request message (e.g., a container in a NAS transport message) may include information about any of: (i) a UAV flight plan, and/or (ii) a mission type (e.g., reference to pre-authorized flight plan), among others) and the network (e.g., a network entity) may forward and/or send the C2 communication request message to the UTM 220 (e.g., via a NEF), for example along with the UAV WTRU id; and (2) at operation 13-2b, the UTM 220 may check that the UAV 211 is authorized for UTM-based navigation based on the UAV 211 and the mission information (e.g., directly following a successful operation 12-0 and/or based on one or more other internal/external triggers). The UTM 220 may allocate a new UAS id upon or after successful authorization.

At operation 13-3, the UTM 220 may send a message to the UAV serving PLMN 301a that may include any of: (1) the UAV WTRU id; (2) the UAS id identifying the authorized UAS session/mission; and/or (3) a UAS specific message (e.g., a container) that may include parameters for the mission, such as, for example: (i) the IP address for the C2 Server (e.g., may be the same or different than the UTM IP address used by the network); (ii) flight route information and/or (iii) flight route update information. At operation 13-4, the network (e.g., a network entity) may trigger an update of the PDU Session/PDN Connection, for example to authorize traffic to/from the C2 server IP, as described herein. At operation 13-5, the network (e.g., a network entity) may send to the UTM 220 a response message (e.g., in response to or after the message in operation 13-3) that may include any of: (1) a UAV WTRU id; (2) a UAS id; and/or (3) a UAV IP/MAC address, among others. The response message may confirm to the UTM 220 that the UAV 211 is reachable for C2 commands and/or is ready to fly. The network (e.g., a network entity) may provide the UAV IP to the UTM 220 (e.g., as the IP address registered in operation 13-1 may have changed since, or if the IP address was not registered). At operation 13-6, the UAV 211 and the UTM 220 may exchange C2 traffic.

Figure 14:
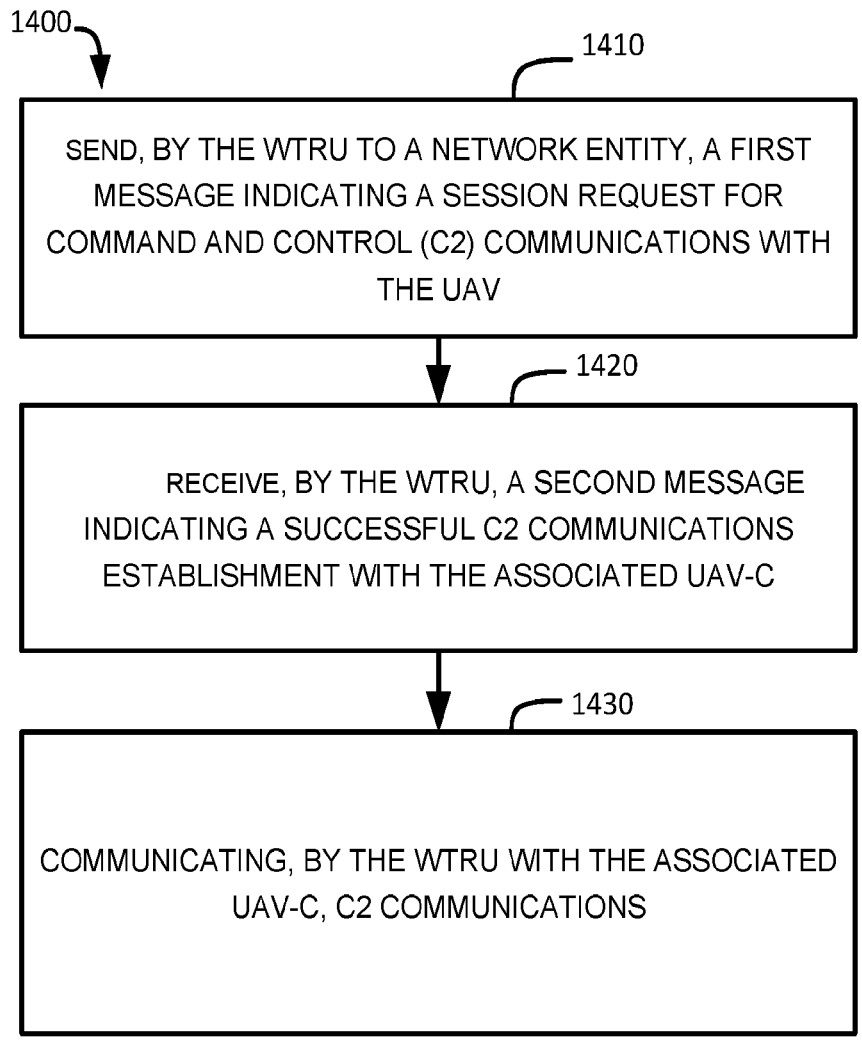
FIG. 14 is a flowchart illustrating a representative method implemented by a WTRU, of establishing C2 communications between a UAV and a UAV-C.

FIG. 14 is a flowchart illustrating a representative method implemented by a WTRU 102, of establishing C2 communications between a UAV 211 and a UAV-C 212.

Referring to FIG. 14, the representative method 1400 may include, at block 1410, sending by the WTRU 102 to a network entity, a first message indicating a session request for C2 communications with the UAV 211. At block 1420, the WTRU 102 may receive a second message indicating a successful C2 communications establishment with the associated UAV-C 212. At block 1430, the WTRU 102 may communicate with the associated UAV-C 212, C2 communications.

In certain representative embodiments, the WTRU 102 may be included in the UAV.

In certain representative embodiments, the first message may further include a UAS id.

In certain representative embodiments, the representative method 1400 may further comprise, prior to a reception of the second message, receiving, by the WTRU 102, a further message indicating that an association between a UAV-C 212 and the UAV 211 is pending.

In certain representative embodiments, the representative method 1400 may further comprise configuring, by the WTRU 102, the WTRU 102 for a C2 standby state for the C2 communications prior to a reception of the second message.

In certain representative embodiments, the representative method 1400 may further comprise establishing, by the WTRU 102, a C2 communication link using a session and routed via a network.

In certain representative embodiments, the second message may be a session modification command and may include information indicating any of: (1) an IP address of the associated UAV-C 212, (2) a UAS id, and/or (3) a UAV id.

Figure 15:
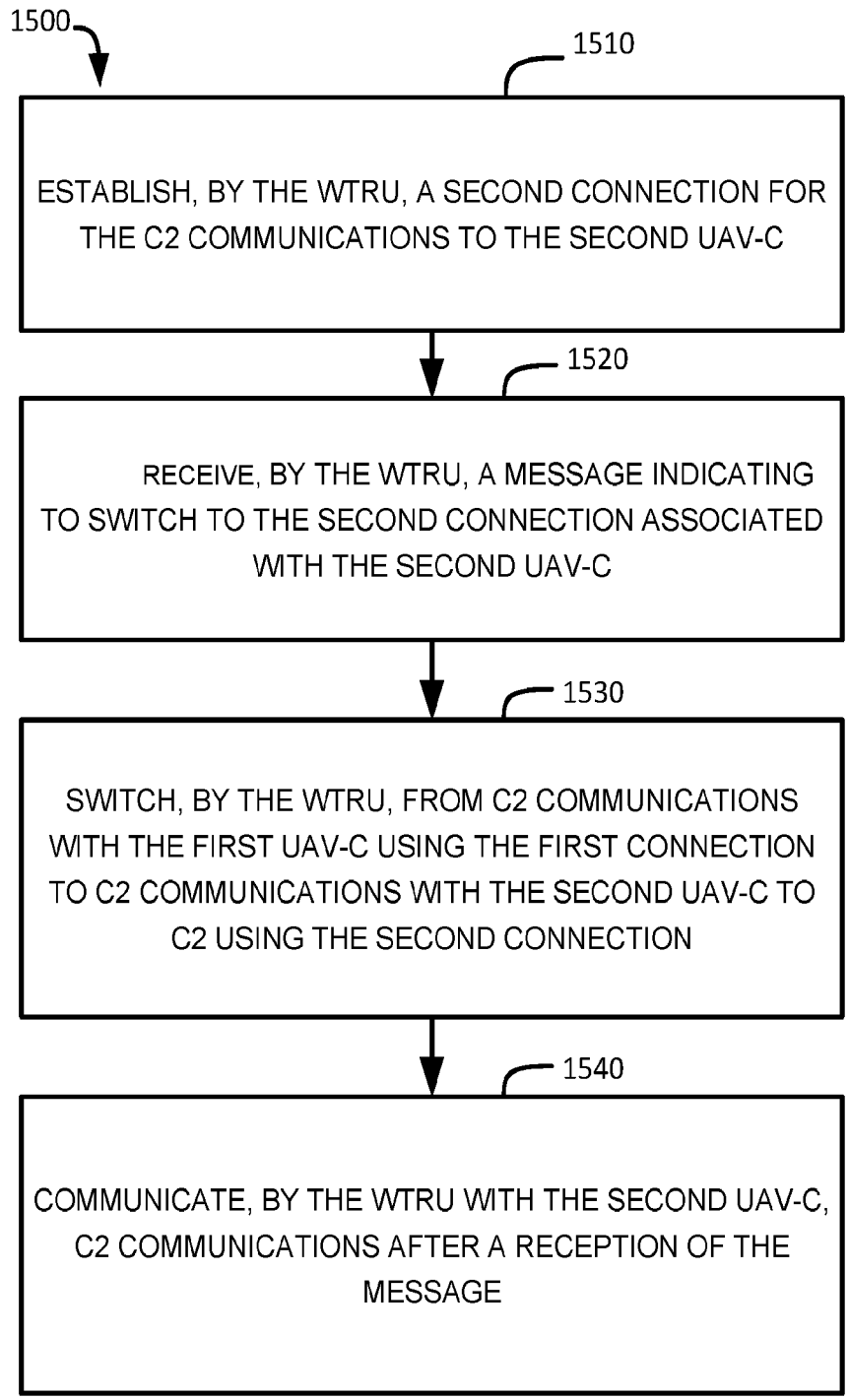
FIG. 15 is a flowchart illustrating a representative method implemented by a WTRU, of changing C2 communications from between a UAV and a first UAV-C to between the UAV and a second UAV-C.

FIG. 15 is a flowchart illustrating a representative method implemented by a WTRU 102, of changing C2 communications from between a UAV 211 and a first UAV-C 212a to between the UAV 211 and a second UAV-C 212b, the WTRU 102 communicating C2 communications with the first UAV-C 212a over a first connection.

Referring to FIG. 15, the representative method 1500 may include, at block 1510, establishing, by the WTRU 102, a second connection for the C2 communications to the second UAV-C 212b. At block 1520, the WTRU 102 may receive a message indicating to switch to the second connection associated with the second UAV-C 212b. At block 1530, the WTRU 102 may switch from C2 communications with the first UAV-C 212a using the first connection to C2 communications with the second UAV-C 212b to C2 using the second connection. At block 1540, the WTRU 102 may communicate with the second UAV-C 212b, C2 communications after a reception of the message.

In certain representative embodiments, the second connection may be established prior to the receiving, as a standby connection.

In certain representative embodiments, the message may include information indicating any of: (1) a UAS id associated with the first UAV-C 212a; (2) a new UAS id associated with the second UAV-C 212b; (3) an IP address associated with the second UAV-C 212b; and/or (4) a new UAV-C id associated with the second UAV-C 212b.

In certain representative embodiments, the WTRU 102 may be included in the UAV.

In certain representative embodiments, the representative method 1500 may further comprise configuring, by the WTRU 102, the WTRU 102 for C2 communication: (1) via a first session prior to the switching, and (2) via a second session after the switching.

In certain representative embodiments, the representative method 1500 may further comprise establishing, by the WTRU 102, a C2 communication link using the second session and routed via a network.

In certain representative embodiments, the representative method 1500 may further comprise releasing, by the WTRU 102, the first connection.

Figure 16:
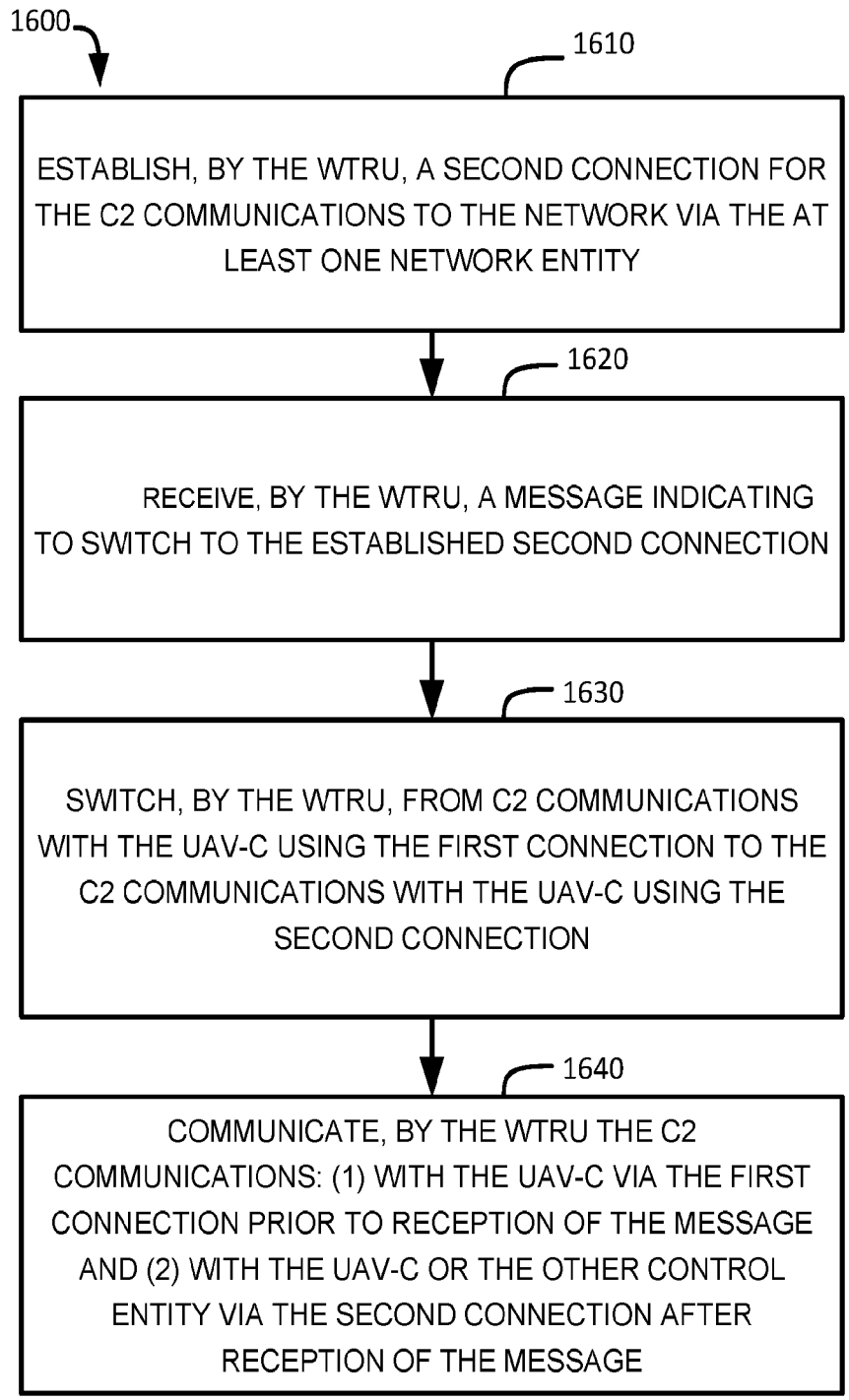
FIG. 16 is a flowchart illustrating a representative method implemented by a WTRU, of managing C2 communications established directly between a UAV and a UAV-C via a first connection.

FIG. 16 is a flowchart illustrating a representative method implemented by a WTRU 102, of managing C2 communications established directly between a UAV 211 and a UAV-C 212 via a first connection, the UAV-C 212 or another control entity having an established network connection to a network via at least one network entity.

Referring to FIG. 16, the representative method 1600 may include, at block 1610, establishing, by the WTRU 102, a second connection for the C2 communications to the network via the at least one network entity. At block 1620, the WTRU 102 may receive a message indicating to switch to the established second connection. At block 1630, the WTRU 102 may switch from C2 communications with the UAV-C 212 using the first connection to the C2 communications with the UAV-C 212 using the second connection. At block 1640, the WTRU 102 may communicate C2 communications: (1) with the UAV-C 212 via the first connection prior to reception of the message and (2) with the UAV-C 212 or the other control entity via the second connection after reception of the message.

Figure 17:
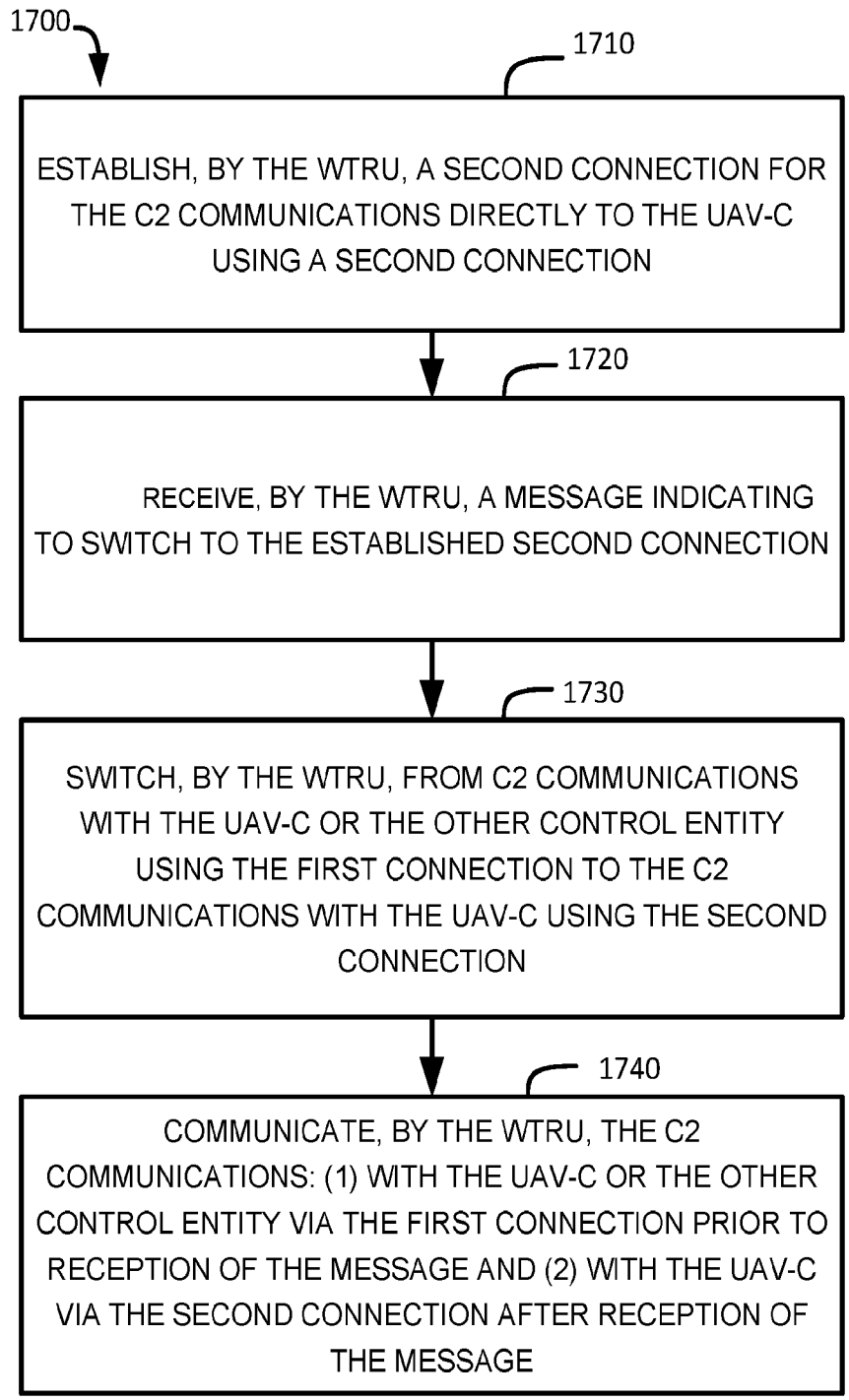
FIG. 17 is a flowchart illustrating a representative method implemented by a WTRU, of managing C2 communications established between a UAV and a UAV-C or another control entity via a first connection.

FIG. 17 is a flowchart illustrating a representative method implemented by a WTRU 102, of managing C2 communications established between a UAV 211 and a UAV-C 212 or another control entity via a first connection to a network using at least one network entity, the UAV controller or the other control entity having an established network connection.

Referring to FIG. 17, the representative method 1700 may include, at block 1710, establishing, by the WTRU 102, a second connection for the C2 communications directly to the UAV-C 212 using a second connection. At block 1720, the WTRU 102 may receive a message indicating to switch to the established second connection. At block 1730, the WTRU 102 may switch from C2 communications with the UAV-C 212 or the other control entity using the first connection to the C2 communications with the UAV-C 212 using the second connection. At block 1740, the WTRU 102 may communicate C2 communications: (1) with the UAV-C 212 or the other control entity via the first connection prior to reception of the message and (2) with the UAV-C 212 via the second connection after reception of the message.

In certain representative embodiments, the representative method 1600 or 1700 may further comprise receiving, by the WTRU 102, one or more authorization parameters indicating whether to maintain the first connection after the switching; determining, based on the authorization parameters, to maintain the first connection, as a redundant connection; and/or maintaining the first connection, as the redundant connection in accordance with the determination.

In certain representative embodiments, the representative method 1600 or 1700 may further comprise receiving, by the WTRU 102, one or more QoS threshold parameters; measuring the QoS associated with the first connection; determining, based on the measured QoS associated with the first connection and the received QoS threshold parameters, whether to trigger: (1) an establishment of a new connection and a switch to the new connection or (2) a switch to a preestablished redundant connection; and/or triggering, the establishing of the second connection and the switching to the second connection in accordance with the determination.

In certain representative embodiments, the representative method 1600 or 1700 may further comprise receiving, by the WTRU 102 in the message, information indicating a C2 communication type to be used to configure the second connection. For example, the C2 communications type may include one of: (1) a direct C2 communications type, (2) a network-assisted C2 communications type, or (3) a UTM-navigated C2 communications type.

In certain representative embodiments, the representative method 1600 or 1700 may further comprise receiving, by the WTRU 102, information indicating one or more QoS threshold parameters; measuring the QoS associated with the first connection; determining, based on the measured QoS associated with the first connection and the indicated one or more QoS threshold parameters, whether to switch to the second connection; and/or on condition that the WTRU 102 is to switch to the second connection, sending, by the WTRU 102 to a control entity, a switching request message indicating a request to switch to the second connection. For example, the received message indicating to switch to the established second connection may be a switching response message indicating an authorization to switch to the second connection.

In certain representative embodiments, the switching request message may include information on any of: (1) the measured QoS associated with the first connection and/or (2) the indicated QoS threshold parameters.

In certain representative embodiments, the control entity may be associated with a UAE-S 221.

Figure 18:
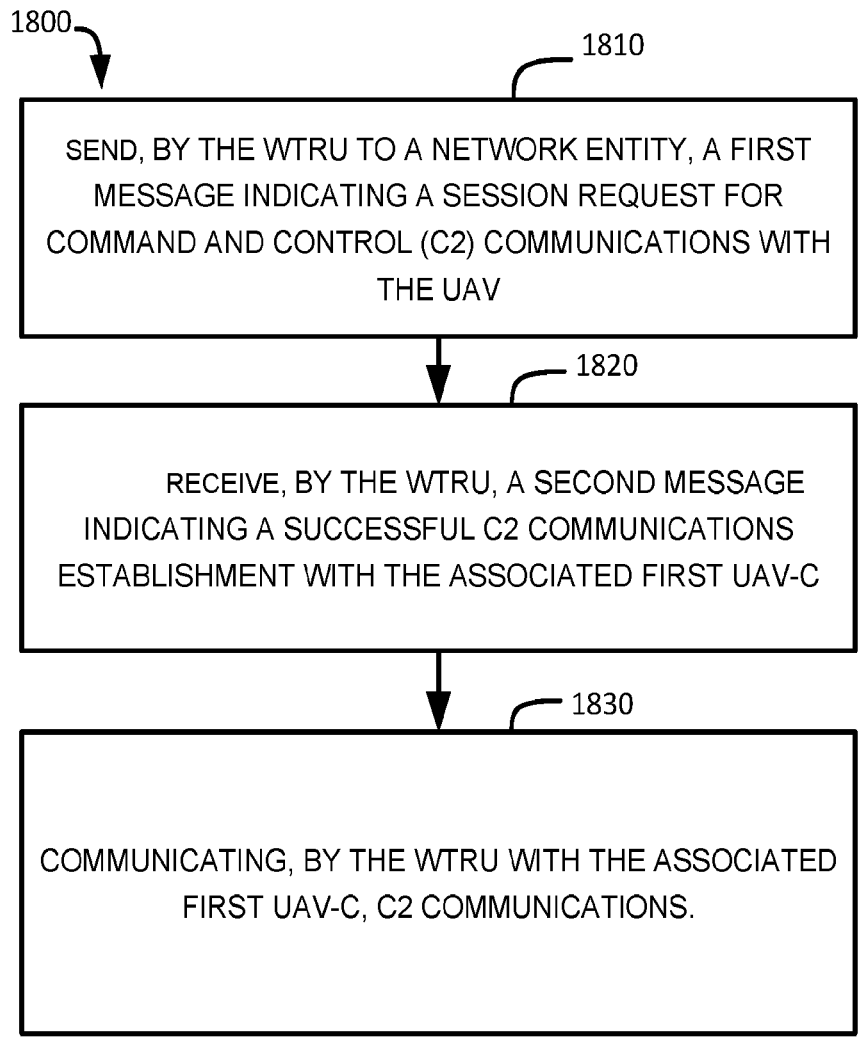
FIG. 18 is a flowchart illustrating a representative method implemented by a WTRU, of establishing C2 communications between a UAV and a first UAV-C.

FIG. 18 is a flowchart illustrating a representative method implemented by a WTRU 102, of establishing C2 communications between a UAV 211 and a first UAV-C 212*a*.

Referring to FIG. 18, the representative method 1800 may include, at block 1810, sending by the WTRU 102 to a network entity, a first message indicating a session request for C2 communications with the UAV. At block 1820, the WTRU 102 may receive a second message indicating a successful C2 communications establishment with the associated UAV-C 212. At block 1830, the WTRU 102 may communicate, with the associated UAV-C 212, C2 communications.

In certain representative embodiments, the representative method 1800 may further comprise switching, by the WTRU 102, from the first UAV-C 212*a* to a second UAV-C 212*b* for the C2 communications; and/or communicating, by the WTRU 102, with the second UAV-C 212*b*, the C2 communications.

In certain representative embodiments, prior to the switching, the C2 communications may be routed using a first C2 communication link to the first UAV-C 212*a*; and after the switching, routing the C2 communications using a second C2 communication link to the second UAV-C 212*b*.

In certain representative embodiments, the representative method 1800 may further comprise configuring, by the WTRU 102, the second C2 communication link for C2 communication between the UAV 211 and the second UAV-C 212*b*.

In certain representative embodiments, the representative method 1800 may further comprise determining, by the WTRU 102, to switch the C2 communications, from a first C2 communication link to a second C2 communication link for the C2 communications with the UAV 211 based on a C2 switching condition; sending, by the WTRU 102 to a C2 control entity, a notification indicating link information used to determine a switch from the first C2 communication link to the second C2 communication link; receiving, by the WTRU 102 from the C2 control entity, information indicating the switch to the second C2 communication link; and/or switching, by the WTRU 102, C2 communications from the first C2 communication link to the second C2 communication link.

In certain representative embodiments, prior to the switching, the C2 communications is routed using the first C2 communication link to the first UAV-C 212*a*; and after the switching, routing the C2 communications using the second C2 communication link to the first UAV-C 212*a*.

In certain representative embodiments, the representative method 1800 may further comprise, prior to the switching, the C2 communications is routed using the first C2 communication link to the first UAV-C 212*a*; and after the switching, routing the C2 communications using the second C2 communication link to a second UAV-C 212*b*.

In certain representative embodiments, the C2 switching condition may be determined in accordance with C2 communication link criteria.

In certain representative embodiments, the C2 switching condition may be determined in accordance with a command received from the C2 control entity.

In certain representative embodiments, the first C2 communication link may be a direct C2 communication link and the second C2 communication link may be a network-assisted C2 communication link.

In certain representative embodiments, the second C2 communication link may be a direct C2 communication link and the first C2 communication link may be a network-assisted C2 communication link.

In certain representative embodiments, the first C2 communication link may be one of: (1) a direct C2 communication link; or (2) a network-assisted C2 communication link and the second C2 communication link may be a UTM-navigated C2 communication link.

In certain representative embodiments, the second C2 communication link may be one of: (1) a direct C2 communication link; or (2) a network-assisted C2 communication link and the first C2 communication link may be a UTM-navigated C2 communication link.

In certain representative embodiments, C2 communication link criteria may be based on one or more QoS threshold parameters.

In certain representative embodiments, the representative method 1800 may further comprise measuring the QoS associated with the first C2 communication link; and/or determining, based on the measured QoS associated with the first C2 communication link and QoS threshold parameters, whether to switch to the second C2 communication link. For example, the received information indicating the switch to the second C2 communication link may indicate an authorization to switch to the second C2 communication link.

In certain representative embodiments, the notification indicating link information may indicate measured QoS information associated with the first C2 communication link and QoS threshold information.

In certain representative embodiments, the C2 control entity may be associated to a UAE-S 221.

In certain representative embodiments, the WTRU 102 may be included in the UAV.

In certain representative embodiments, the representative method 1800 may further comprise sending, by the WTRU 102 to a C2 management entity, information indicating the switch to the second C2 communication link.

In certain representative embodiments, the C2 management entity may be associated with a UTM 220.

In certain representative embodiments, the representative method 1800 may further comprise disabling the first C2 communication link after the switching.

Figure 19:
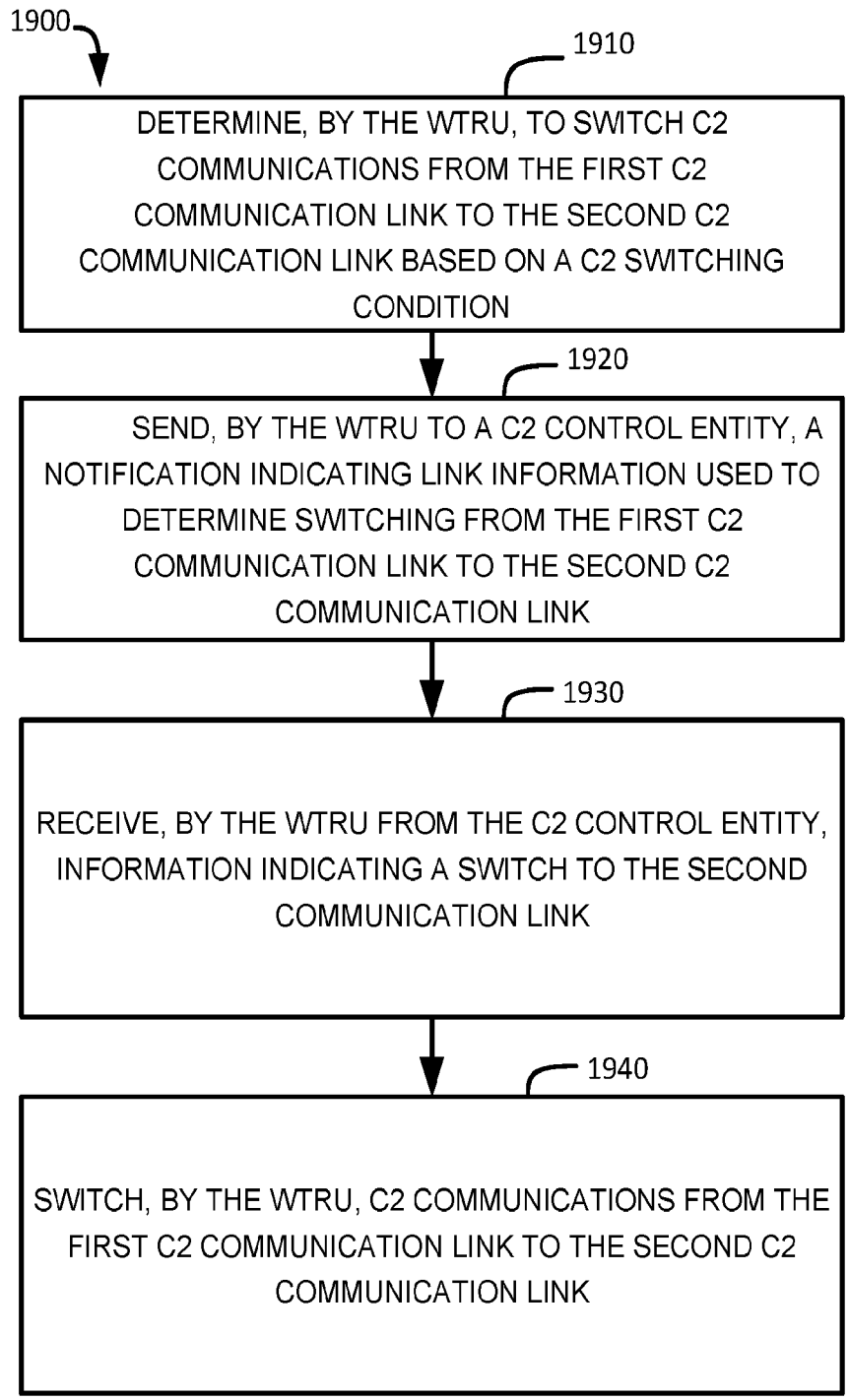
FIG. 19 is a flowchart illustrating a representative method implemented by a WTRU, of switching from a first C2 communication link to a UAV-C for C2 communications with a UAV to a second C2 communication link to the UAV-C.

FIG. 19 is a flowchart illustrating a representative method implemented by a WTRU 102, of switching from a first C2 communication link to a UAV-C 212 for C2 communications with a UAV 211 to a second C2 communication link to the UAV-C 212.

Referring to FIG. 19, the representative method 1900 may include, at block 1910, determining, by the WTRU 102, to switch C2 communications from the first C2 communication link to the second C2 communication link based on a C2 switching condition. At block 1920, the WTRU 102 may send to a C2 control entity, a notification indicating link information used to determine switching from the first C2 communication link to the second C2 communication link. At block 1930, the WTRU 102 may receive from the C2 control entity, information indicating a switch to the second communication link. At block 1940, the WTRU 102 may switch C2 communications from the first C2 communication link to the second C2 communication link.

In certain representative embodiments, the C2 switching condition may be determined in accordance with C2 communication link criteria.

In certain representative embodiments, the C2 switching condition may be determined in accordance with a command received from the C2 control entity.

In certain representative embodiments, the first C2 communication link may be a direct C2 communication link and the second C2 communication link may be a network-assisted C2 communication link.

In certain representative embodiments, the second C2 communication link may be a direct C2 communication link and the first C2 communication link may be a network-assisted C2 communication link.

In certain representative embodiments, C2 communication link criteria may be based on one or more QoS threshold parameters.

In certain representative embodiments, the representative method 1900 may further comprise measuring the QoS associated with the first C2 communication link; and/or determining, based on the measured QoS associated with the first C2 communication link and QoS threshold parameters, whether to switch to the second C2 communication link. For example, the received information indicating the switch to the second C2 communication link may indicate an authorization to switch to the second C2 communication link.

In certain representative embodiments, the notification indicating link information may indicate measured QoS information associated with the first C2 communication link and QoS threshold information.

In certain representative embodiments, the C2 control entity may be associated to a UAE-S 221.

In certain representative embodiments, the WTRU 102 may be included in the UAV.

In certain representative embodiments, the representative method 1900 may further comprise sending, by the WTRU 102 to a C2 management entity, information indicating the switch to the second C2 communication link.

In certain representative embodiments, the C2 management entity may be associated with a UTM 220.

In certain representative embodiments, the representative method 1900 may further comprise communicating C2 information such that (1) prior to the switching, the C2 information is communicated between the UAV 211 and the UAV-C 212 using the first C2 communication link; and (2) after the switching, the C2 information is communicated between the UAV 211 and the UAV-C 212 using the second C2 communication link.

In certain representative embodiments, the representative method 1900 may further comprise disabling the first C2 communication link after the switching.

Figure 20:
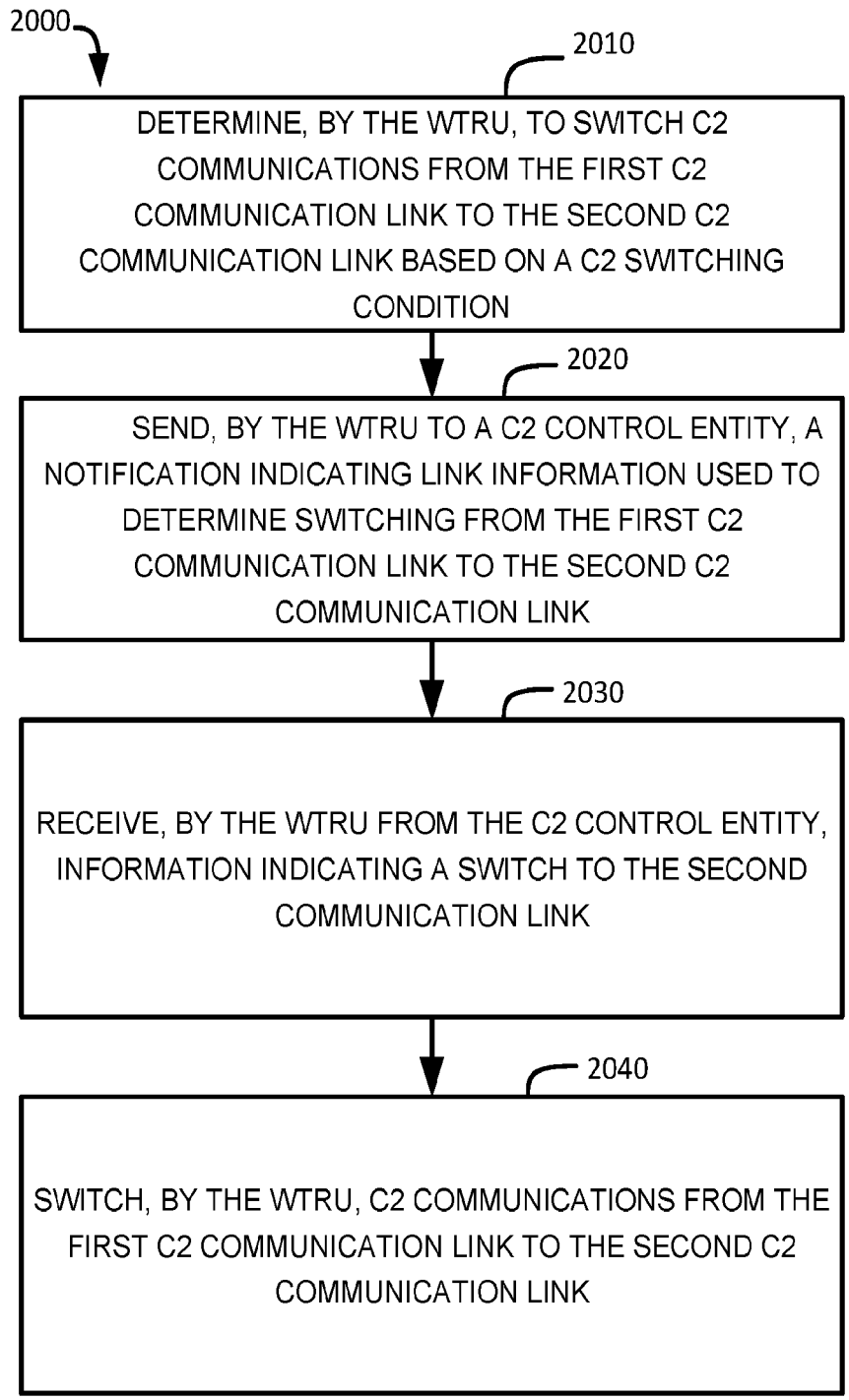
FIG. 20 is a flowchart illustrating a representative method implemented by a WTRU, of switching from a first C2 communication link to a second C2 communication link for C2 communications between a UAV and a UAV-C.

FIG. 20 is a flowchart illustrating a representative method implemented by a WTRU 102, of switching from a first C2 communication link to a second C2 communication link for C2 communications between a UAV 211 and a UAV-C 212.

Referring to FIG. 20, the representative method 2000 may include, at block 2010, determining, by the WTRU 102, to switch C2 communications from the first C2 communication link to the second C2 communication link based on a C2 switching condition. At block 2020, the WTRU 102 may send to a C2 control entity, a notification indicating link information used to determine switching from the first C2 communication link to the second C2 communication link. At block 2030, the WTRU 102 may receive from the C2 control entity, information indicating a switch to the second communication link. At block 2040, the WTRU 102 may switch C2 communications from the first C2 communication link to the second C2 communication link.

In certain representative embodiments, prior to the switching, the C2 communications may be routed between the UAV 211 and a first UAV-C 212a using the first C2 communication link; and after the switching, routing the C2 communications between the UAV 211 and the first UAV-C 212a using the second C2 communication link.

In certain representative embodiments, prior to the switching, the C2 communications may be routed between the UAV 211 and a first UAV-C 212a using the first C2 communication link; and after the switching, routing the C2 communications between the UAV 211 and a second UAV-C 212b using the second C2 communication link.

In certain representative embodiments, the first C2 communication link may be a direct C2 communication link and the second C2 communication link may be a network-assisted C2 communication link.

In certain representative embodiments, the second C2 communication link may be a direct C2 communication link and the first C2 communication link may be a network-assisted C2 communication link.

In certain representative embodiments, the first C2 communication link may be one of: (1) a direct C2 communication link; or (2) a network-assisted C2 communication link and the second C2 communication link may be a UTM-navigated C2 communication link.

In certain representative embodiments, the second C2 communication link may be one of: (1) a direct C2 communication link; or (2) a network-assisted C2 communication link and the first C2 communication link may be a UTM-navigated C2 communication link.

In certain representative embodiments, the C2 switching condition may be determined in accordance with C2 communication link criteria.

In certain representative embodiments, the C2 switching condition may be determined in accordance with a command received from the C2 control entity.

In certain representative embodiments, C2 communication link criteria may be based on one or more QoS threshold parameters.

In certain representative embodiments, the representative method 2000 may further comprise measuring the QoS associated with the first C2 communication link; and/or determining, based on the measured QoS associated with the first C2 communication link and QoS threshold parameters, whether to switch to the second C2 communication link. For example, the received information indicating the switch to the second C2 communication link may indicate an authorization to switch to the second C2 communication link.

In certain representative embodiments, the notification indicating link information may indicate measured QoS information associated with the first C2 communication link and QoS threshold information.

In certain representative embodiments, the C2 control entity may be associated to a UAE-S 221.

In certain representative embodiments, the WTRU 102 may be included in the UAV.

In certain representative embodiments, the representative method 2000 may further comprise sending, by the WTRU

102 to a C2 management entity, information indicating the switch to the second C2 communication link.

In certain representative embodiments, the C2 management entity may be associated with a UTM 220.

In certain representative embodiments, the representative method 2000 may further comprise disabling the first C2 communication link after the switching.

Each of the contents of the following references is incorporated by reference herein: (1) 3GPP TS 22.125, "Unmanned Aerial System (UAS) support in 3GPP", V17.1.0; (2) 3GPP TR 22.825, "Remote Identification of Unmanned Aerial Systems", V16.0.0; (3) 3GPP TR 22.829, "Study on Enhancement for Unmanned Aerial Vehicles", V1.0.0; (4) 3GPP TS 23.501, "System Architecture for the 5G System", V16.1.0; (5) 3GPP TS 23.502, "Procedures for the 5G System", V16.1.1; (6) 3GPP TR 23.754, "Study on supporting Unmanned Aerial Systems (UAS) connectivity, Identification and tracking", V0.1.0; (7) 3GPP document entitled "Solution for C2 connectivity," published to SA2 email reflector, April, 2020; and (8) 3GPP TR 23.754, "Study on supporting Unmanned Aerial Systems (UAS) connectivity, Identification and tracking (Release 17)", V0.2.0, June 2020.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a vehicle and/or another mobile device remotely. In the later a case, data may be transferred via wireline or wirelessly between the vehicles or other mobile device.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of" a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of switching from a first command and control (C2) communication link between an unmanned aerial vehicle (UAV) and a UAV controller (UAV-C) to a second C2 communication link for C2 communications, implemented by a Wireless Transmit/Receive Unit (WTRU), the method comprising:
   determining to switch C2 communications from the first C2 communication link to the second C2 communication link based on a C2 switching condition;
   sending to a C2 control entity, a notification indicating link information used to determine switching from the first C2 communication link to the second C2 communication link;
   receiving from the C2 control entity, information indicating a switch to the second communication link; and
   switching C2 communications from the first C2 communication link to the second C2 communication link,
   wherein the first C2 communication link is a direct C2 communication link and the second C2 communication link is a network-assisted C2 communication link or wherein the second C2 communication link is a direct C2 communication link and the first C2 communication link is a network-assisted C2 communication link.

2. The method of claim 1, wherein:
   prior to the switching, the C2 communications is routed between the UAV and the UAV-C using the first C2 communication link; and
   after the switching, routing the C2 communications between the UAV and the UAV-C using the second C2 communication link.

3. The method of claim 1, wherein the C2 switching condition is determined in accordance with C2 communication link criteria.

4. The method of claim 3, wherein the C2 communication link criteria are based on one or more quality of service (QOS) threshold parameters.

5. The method of claim 4, further comprising:
measuring QoS associated with the first C2 communication link; and
determining, based on the measured QoS associated with the first C2 communication link and the QoS threshold parameters, whether to switch to the second C2 communication link,
wherein the received information indicating the switch to the second C2 communication link indicates an authorization to switch to the second C2 communication link.

6. The method of claim 5, wherein the notification indicating the link information indicates measured QoS information associated with the first C2 communication link and QoS threshold information.

7. The method of claim 1, further comprising:
sending, by the WTRU to a C2 management entity, information indicating the switch to the second C2 communication link.

8. The method of claim 7, wherein the C2 management entity is associated with an unmanned aerial system (UAS) traffic management.

9. The method of claim 1, further comprising:
disabling the first C2 communication link after the switching.

10. The method of 1, wherein the WTRU is included in the UAV or in the UAV-C.

11. The method according to claim 1, wherein the C2 control entity is associated with a UAS application enabler server (UAE-S).

12. A wireless transmit/receive unit (WTRU) configured for switching from a first command and control (C2) communication link between an unmanned aerial vehicle (UAV) and a UAV controller (UAV-C) to a second C2 communication link for C2 communications, the WTRU comprising:
a processor configured to determine to switch C2 communications from the first C2 communication link to the second C2 communication link based on a C2 switching condition; and
a transmitter/receiver unit configured to:
send, to a C2 control entity, a notification indicating link information used to determine a switch from the first C2 communication link to the second C2 communication link, and
receive, from the C2 control entity, information indicating the switch to the second communication link,
wherein the processor is further configured to switch C2 communications from the first C2 communication link to the second C2 communication link, and
wherein the first C2 communication link is a direct C2 communication link and the second C2 communication link is a network-assisted C2 communication link or wherein the second C2 communication link is a direct C2 communication link and the first C2 communication link is a network-assisted C2 communication link.

13. The WTRU of claim 12, wherein the WTRU is included in the UAV or in the UAV-C.

14. A command and control (C2) control entity configured to for switching communication link between an unmanned aerial vehicle (UAV) and a UAV controller (UAV-C) to a second C2 communication link for C2 communications, the C2 control entity comprising a processor and a transmitter/receiver unit configured to:
receive, from a wireless transmit/receive unit (WTRU), a notification indicating link information associated to a C2 switching condition from the first C2 communication link to the second C2 communication link; and
send, to the WTRU, information indicating a switch to the second communication link,
wherein the first C2 communication link is a direct C2 communication link and the second C2 communication link is a network-assisted C2 communication link or wherein the second C2 communication link is a direct C2 communication link and the first C2 communication link is a network-assisted C2 communication link.

15. The C2 control entity of claim 14, wherein the C2 control entity is associated with a UAS application enabler server (UAE-S) and wherein the WTRU is included in the UAV or in the UAV-C.

16. A method of switching from a first command and control (C2) communication link between an unmanned aerial vehicle (UAV) and a UAV controller (UAV-C) to a second C2 communication link for C2 communications, implemented by a C2 control entity, the method comprising:
receiving, from a wireless transmit/receive unit (WTRU), a notification indicating link information associated to a C2 switching condition from the first C2 communication link to the second C2 communication link; and
sending, to the WTRU, information indicating a switch to the second communication link,
wherein the first C2 communication link is a direct C2 communication link and the second C2 communication link is a network-assisted C2 communication link or wherein the second C2 communication link is a direct C2 communication link and the first C2 communication link is a network-assisted C2 communication link.

17. The method of claim 16, wherein:
prior to the switching, the C2 communications is routed between the UAV and the UAV-C using the first C2 communication link; and
after the switching, routing the C2 communications between the UAV and the UAV-C using the second C2 communication link.

18. The method of claim 16, wherein the received information indicating the switch to the second C2 communication link indicates an authorization to switch to the second C2 communication link.

19. The method of claim 16, wherein the notification indicating the link information indicates measured QoS information associated with the first C2 communication link and QoS threshold information.

20. The method of claim 16, wherein the C2 control entity is associated with a UAS application enabler server (UAE-S).

21. The method of claim 16, wherein the WTRU is included in the UAV or in the UAV-C.

* * * * *